US011391893B2

(12) United States Patent
Takeuchi et al.

(10) Patent No.: US 11,391,893 B2
(45) Date of Patent: Jul. 19, 2022

(54) CONNECTOR ENGAGEMENT SENSING MECHANISM

(71) Applicant: Go!Foton Holdings, Inc., Somerset, NJ (US)

(72) Inventors: Kenichiro Takeuchi, North Brunswick, NJ (US); Haiguang Lu, Los Altos, CA (US); Chi Kong Paul Ng, Princeton, NJ (US)

(73) Assignee: Go!Foton Holdings, Inc., Somerset, NJ (US)

( * ) Notice: Subject to any disclaimer, the term of this patent is extended or adjusted under 35 U.S.C. 154(b) by 0 days.

(21) Appl. No.: 17/073,897

(22) Filed: Oct. 19, 2020

(65) Prior Publication Data
US 2021/0033797 A1 Feb. 4, 2021

Related U.S. Application Data

(60) Division of application No. 16/449,841, filed on Jun. 24, 2019, now Pat. No. 10,845,548, which is a
(Continued)

(51) Int. Cl.
G02B 6/38 (2006.01)
H01R 31/06 (2006.01)
H01R 25/00 (2006.01)

(52) U.S. Cl.
CPC ........... G02B 6/385 (2013.01); G02B 6/3825 (2013.01); G02B 6/3895 (2013.01);
(Continued)

(58) Field of Classification Search
None
See application file for complete search history.

(56) References Cited

U.S. PATENT DOCUMENTS 5,129,024 A * 7/1992 Honma ................ G02B 6/3885
385/76
6,116,101 A * 9/2000 Rader .................. G02B 6/3825
324/699
(Continued)

FOREIGN PATENT DOCUMENTS

CN 1180255 A 4/1998
CN 1393715 A 1/2003
(Continued)

OTHER PUBLICATIONS

International Search Report for Application No. PCT/US2016/040752 dated Nov. 3, 2016.
(Continued)

Primary Examiner — Rhonda S Peace
(74) Attorney, Agent, or Firm — Lerner, David, Littenberg, Krumholz & Mentlik, LLP

(57) ABSTRACT

A connector assembly includes an adapter, a housing device, a ferrule assembly, and a sensor. The housing device is received by the adapter and has a bore, a front end, and a rear end opposite the front end. A ferrule of the ferrule assembly is within the bore of the housing device and has a mating end extending beyond the front end of the housing device. The sensor is mounted on the rear end of the housing, the rear end of the ferrule assembly, or on the adapter confronting and spaced apart from the housing device or the ferrule assembly. The sensor is configured for detecting a force applied by the housing device or the ferrule assembly, respectively. An electrical characteristic of the sensor changes to indicate a predetermined force has been applied by the housing device or the ferrule assembly, respectively.

24 Claims, 24 Drawing Sheets

Related U.S. Application Data continuation of application No. 15/863,331, filed on Jan. 5, 2018, now Pat. No. 10,359,578, which is a continuation-in-part of application No. 15/200,489, filed on Jul. 1, 2016, now Pat. No. 10,690,862.

(60) Provisional application No. 62/473,872, filed on Mar. 20, 2017, provisional application No. 62/453,449, filed on Feb. 1, 2017, provisional application No. 62/338,697, filed on May 19, 2016, provisional application No. 62/271,049, filed on Dec. 22, 2015, provisional application No. 62/220,120, filed on Sep. 17, 2015, provisional application No. 62/208,443, filed on Aug. 21, 2015, provisional application No. 62/187,673, filed on Jul. 1, 2015.

(52) U.S. Cl.
CPC ......... *H01R 25/003* (2013.01); *H01R 31/065* (2013.01); *G02B 6/3821* (2013.01); *G02B 6/3893* (2013.01)

(56) References Cited

U.S. PATENT DOCUMENTS

| | | | |
|---|---|---|---|
| 6,456,768 | B1 | 9/2002 | Boncek et al. |
| 6,511,231 | B2 | 1/2003 | Lampert et al. |
| 6,554,484 | B2 * | 4/2003 | Lampert ............ G02B 6/3895 385/70 |
| 6,559,437 | B1 * | 5/2003 | Pope, Jr ............. G01M 11/086 250/227.14 |
| 6,572,400 | B2 | 6/2003 | Noguchi et al. |
| 6,652,155 | B2 | 11/2003 | Lampert |
| 6,733,186 | B2 | 5/2004 | Pfleger |
| 6,971,895 | B2 | 12/2005 | Sago et al. |
| 7,291,032 | B1 | 11/2007 | Carver et al. |
| 7,435,009 | B1 * | 10/2008 | Riha ...................... H04Q 1/136 385/53 |
| 7,505,662 | B2 | 3/2009 | Bianchi et al. |
| 7,666,026 | B2 | 2/2010 | Takehara |
| 8,172,468 | B2 | 5/2012 | Jones et al. |
| 8,264,366 | B2 | 9/2012 | Chamarti et al. |
| 8,571,376 | B2 | 10/2013 | Cook |
| 8,596,882 | B2 | 12/2013 | Smrha et al. |
| 9,075,205 | B2 | 7/2015 | Pepe et al. |
| 9,453,971 | B2 | 9/2016 | Anderson et al. |
| 10,359,578 | B2 | 7/2019 | Takeuchi et al. |
| 2001/0023528 | A1 | 9/2001 | Hintz et al. |
| 2002/0197018 | A1 | 12/2002 | Lampert |
| 2003/0002808 | A1 | 1/2003 | Lampert et al. |
| 2003/0081905 | A1 | 5/2003 | Bethea et al. |
| 2004/0052471 | A1 | 3/2004 | Colombo et al. |
| 2008/0100456 | A1 * | 5/2008 | Downie ............ G06K 19/0717 340/686.2 |
| 2008/0121047 | A1 | 5/2008 | Bianchi et al. |
| 2009/0081902 | A1 | 3/2009 | Montena et al. |
| 2010/0098381 | A1 | 4/2010 | Larson et al. |
| 2010/0158454 | A1 | 6/2010 | Lapp |
| 2010/0210135 | A1 | 8/2010 | German et al. |
| 2011/0206335 | A1 | 8/2011 | Cook |
| 2011/0293223 | A1 | 12/2011 | Shimazu et al. |
| 2012/0274452 | A1 | 11/2012 | Chamarti et al. |
| 2013/0106611 | A1 | 5/2013 | Fariello et al. |
| 2014/0286610 | A1 | 9/2014 | Anderson et al. |
| 2015/0308863 | A1 * | 10/2015 | Chen ...................... G01D 5/268 385/12 |
| 2016/0004017 | A1 | 1/2016 | Zhao et al. |
| 2016/0091673 | A1 | 3/2016 | Good et al. |
| 2017/0003459 | A1 | 1/2017 | Takeuchi et al. |
| 2017/0315317 | A1 | 11/2017 | Jiang et al. |
| 2018/0136410 | A1 | 5/2018 | Takeuchi et al. |

FOREIGN PATENT DOCUMENTS

| | | |
|---|---|---|
| CN | 101617255 A | 12/2009 |
| CN | 201584569 U | 9/2010 |
| CN | 101919120 A | 12/2010 |
| CN | 102175159 A | 9/2011 |
| CN | 102405430 A | 4/2012 |
| CN | 103562733 A | 2/2014 |
| DE | 102007017965 A1 | 11/2008 |
| EP | 0303235 A2 | 2/1989 |
| EP | 1237024 A1 | 9/2002 |
| JP | H4132180 A | 5/1992 |
| JP | H8222323 A | 8/1996 |
| JP | H09090165 A | 4/1997 |
| JP | 2005266076 A | 9/2005 |

OTHER PUBLICATIONS

Extended European Search Report with attached Written Opinion for EP Application No. 16818909.0, dated Jun. 6, 2018.
Chinese Search Report for Application No. 201680039144.5, dated Jul. 4, 2019, p. 1-3.
Chinese Search Report for Application No. 201680039144.5, dated Apr. 2, 2020, 2 pages.
Chinese Search Report for Application No. 201880018842.6 dated Aug. 3, 2020, 1 page.
Partial European Search Report issued in Appln. No. 21173404.1 dated Jan. 20, 2022 (1 page).

* cited by examiner

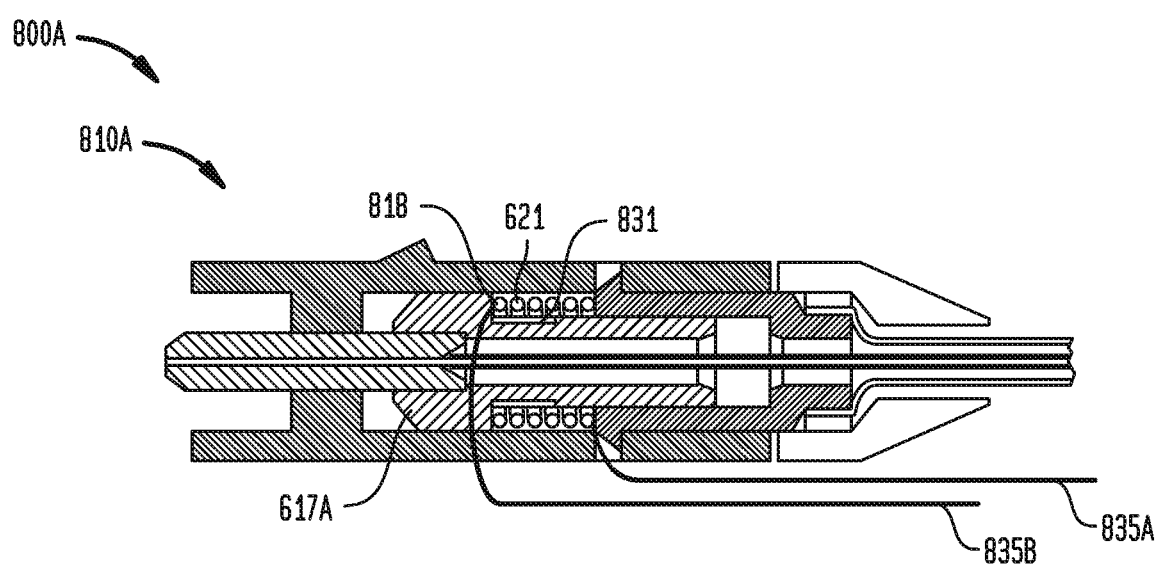

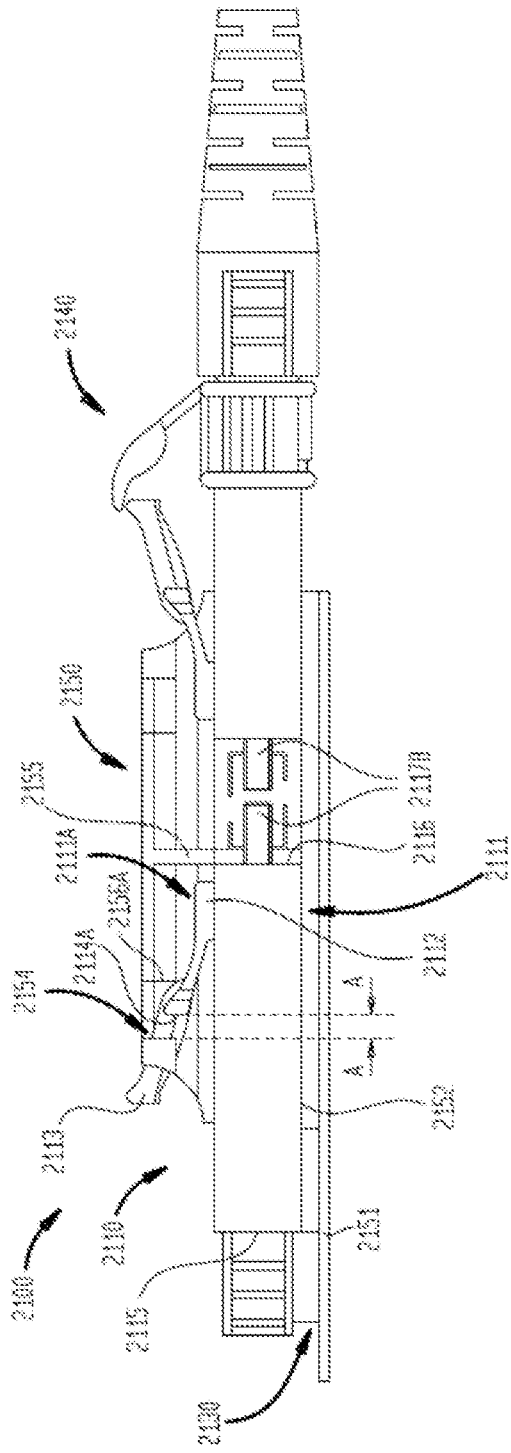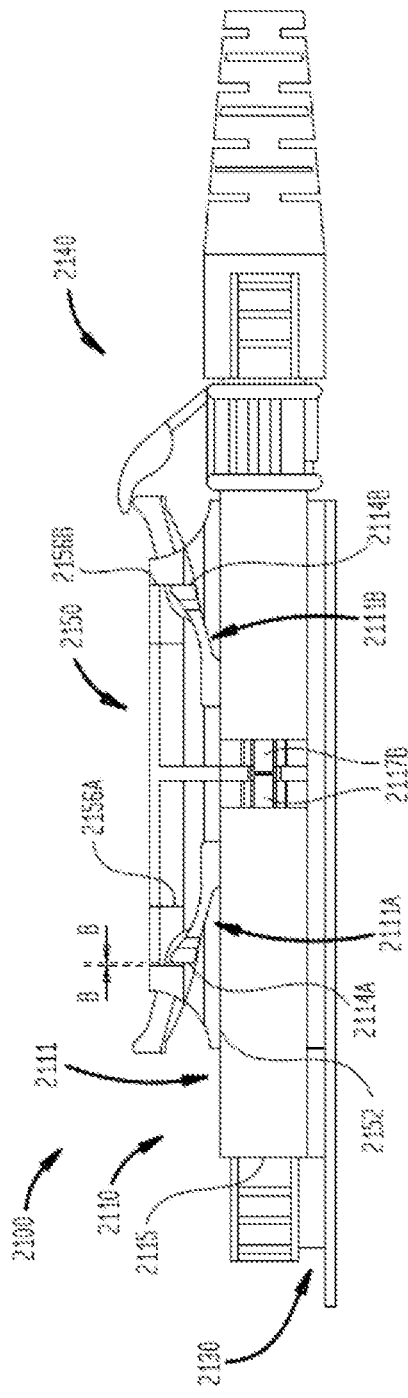

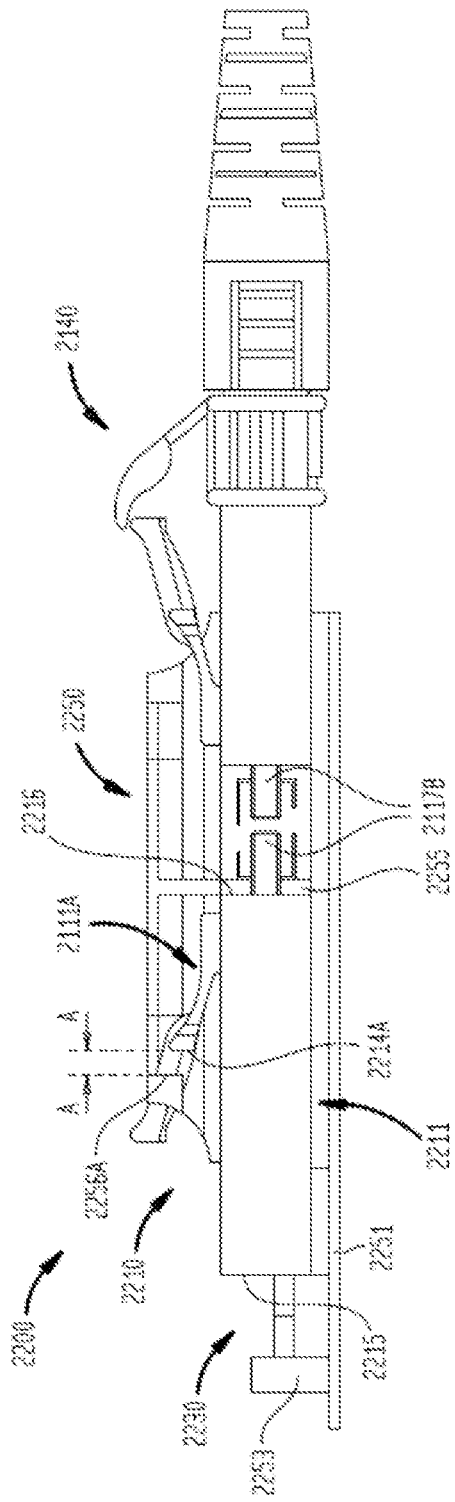

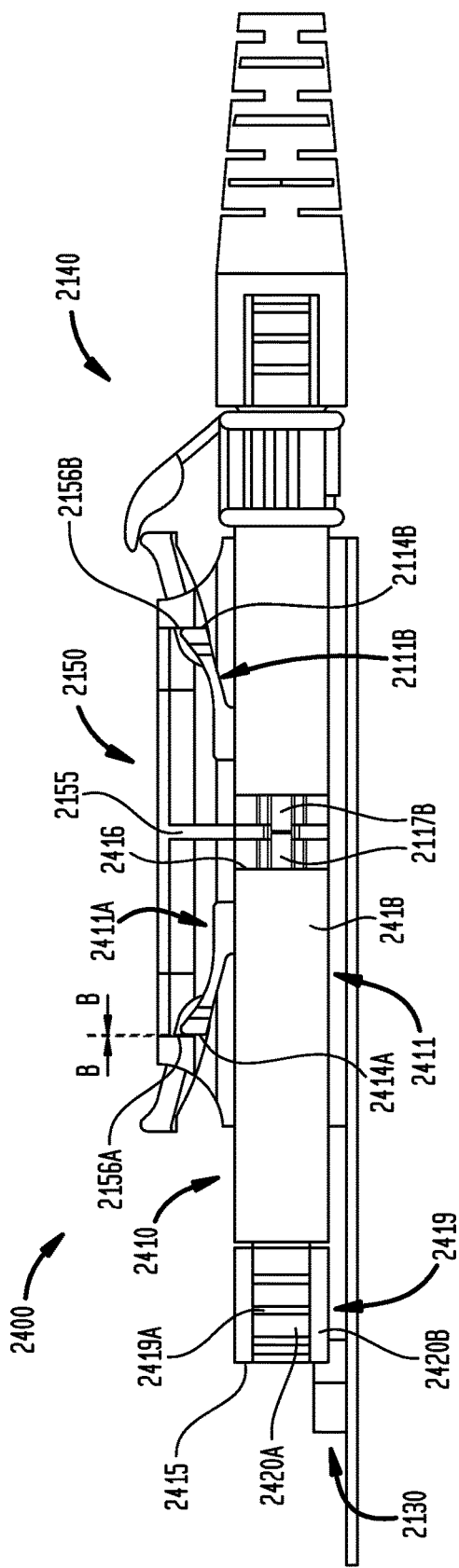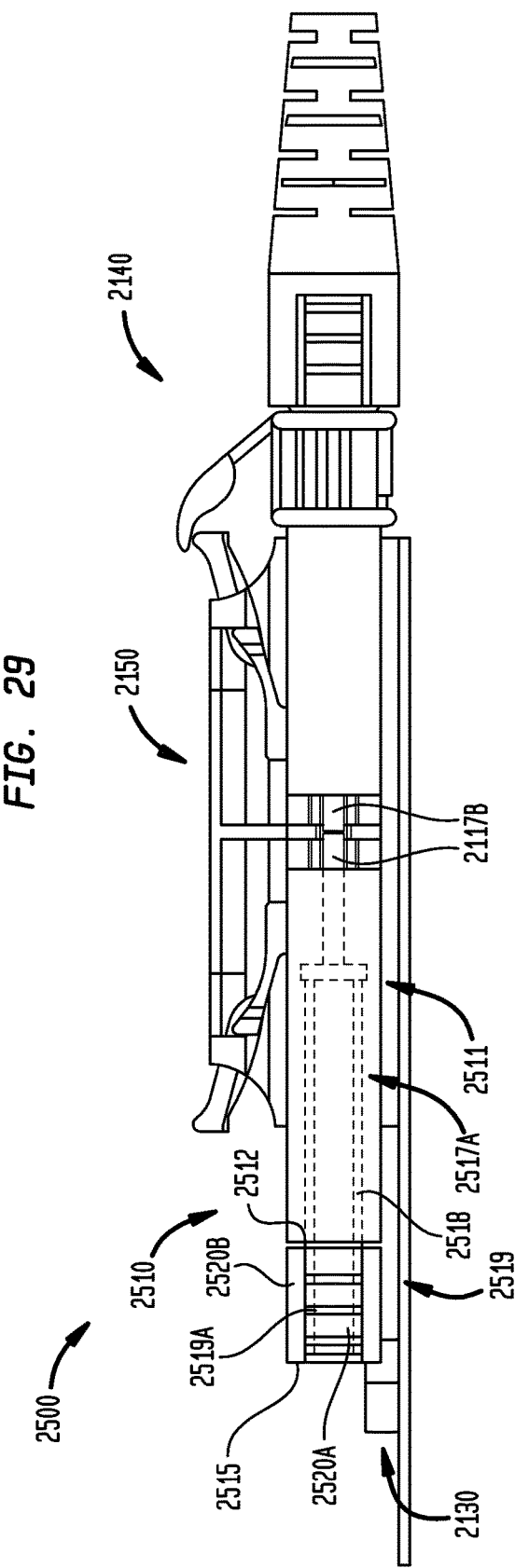

CONNECTOR ENGAGEMENT SENSING MECHANISM

CROSS-REFERENCE TO RELATED APPLICATIONS

The present application is a divisional of U.S. patent application Ser. No. 16/449,841, filed on Jun. 24, 2019, which is a continuation of U.S. patent application Ser. No. 15/863,331, filed Jan. 5, 2018 and issued as U.S. Pat. No. 10,359,578, which claims the benefit of the filing date of U.S. Provisional Patent Application No. 62/473,872, filed Mar. 20, 2017, and U.S. Provisional Patent Application No. 62/453,449, filed Feb. 1, 2017, and is a continuation-in-part of U.S. patent application Ser. No. 15/200,489, filed Jul. 1, 2016 and issued as U.S. Pat. No. 10,690,862, which claims the benefit of the filing date of U.S. Provisional Patent Application No. 62/338,697, filed May 19, 2016, U.S. Provisional Patent Application No. 62/271,049, filed Dec. 22, 2015, U.S. Provisional Patent Application No. 62/220,120, filed Sep. 17, 2015, U.S. Provisional Patent Application No. 62/208,443, filed Aug. 21, 2015, and U.S. Provisional Patent Application No. 62/187,673, filed Jul. 1, 2015, the disclosures of all of which are hereby incorporated herein by reference.

FIELD OF THE TECHNOLOGY

The present technology relates generally to optical and electrical connectors, and in particular relates to the detection of connections of such devices.

BACKGROUND OF THE TECHNOLOGY

Optical fibers and electrical wires are optically or electrically connected to respective opposing optical fibers and electrical wires to transmit signals between the respective connected fibers and wires, which may occur in the operation of data storage and transmission devices. Respective opposing optical fibers and electrical wires are held at their ends by connectors. To establish connections between respective opposing optical fibers and electrical wires, the respective opposing optical fibers and electrical wires are attached to each other or are both attached to adapters.

Connections between respective optical fiber connectors and electrical wire connectors, the electrical wire connectors and wires held thereby often being termed wiring harnesses, are often made using a click-to-lock configuration, as in the case of optical fiber "LC connectors" and "SC connectors." This configuration prevents disconnection of connectors when they are connected to each other or to a corresponding adapter, such as by pullout, and also provides a tactile feedback to alert a user attaching connectors to each other or to a corresponding adapter that a full connection in which unintended disconnection has been prevented has been made.

Sometimes, incomplete connections between connectors or between a connector and an adapter, which may be undetected by users, are made. Additionally, fatigue or other stresses induced through use of the connectors may weaken mechanical connections between connectors or between a connector and an adapter causing connections to be broken or inadequate. Such incomplete or broken connections have caused reduced system performance or even complete system failure.

Therefore, there exists a need for detecting that proper respective optical fiber and electrical wiring connections are made and maintained.

SUMMARY OF THE TECHNOLOGY

In accordance with an aspect of the present technology, a connector may include a receptacle for receiving a mating connector and an electrical switch mounted to the receptacle. The connector and the mating connector may be but are not limited to being mating optical or electrical connectors. When the mating connector is received at a predetermined position within the receptacle, the electrical switch may either generate or stop generating an electrical signal to indicate that the mating connector is received at the predetermined position.

In accordance with another aspect of the present technology, an energy conveying connector assembly may include an energy conveying connector and a mating connector for mating with the energy conveying connector. Such energy conveying connector may include a receptacle which may be dimensioned for receiving the mating connector and an electrical switch which may be mounted to the receptacle. When the mating connector is received at a predetermined position within the receptacle, the electrical switch may either generate or stop generating an electrical signal to indicate that the mating connector is received at the predetermined position.

In some arrangements, the energy conveying connector may be an optical or electrical connector for holding an optical fiber or electrically conductive element. In this manner, in some such arrangements, when the mating connector is received at the predetermined position and is holding the optical fiber or electrically conductive element, the optical fiber or electrically conductive element may be at a predetermined alignment position within the energy conveying connector.

In accordance with another aspect of the present technology, an energy conveying connector may include a receptacle which may be dimensioned for receiving a mating connector for mating with the energy conveying connector and a sensor. The sensor may be mounted to the receptacle. When the mating connector is received at a predetermined position within the receptacle, the sensor may detect the receipt of the mating connector at the predetermined position within the receptacle and either generate or stop generating an electrical signal to indicate that the mating connector is received at the predetermined position.

In some arrangements, the energy conveying connector may be an energy signal conveying connector. In some such arrangements, the energy signal conveying connector may be an optical or electrical signal conveying connector for holding respective optical fibers that convey optical signals corresponding to data or electrically conductive elements that convey electrical signals corresponding to data. Such data may be data transferred to or from network or server equipment, including but not limited to such equipment as may be found in a datacenter.

In some such arrangements, the energy signal conveying connector may be an optical or electrical connector for holding an optical fiber or electrically conductive element. In this manner, in some such arrangements, when the mating connector is received at the predetermined position and is holding the optical fiber or electrically conductive element, the optical fiber or electrically conductive element may be at a predetermined alignment position within the energy conveying connector.

In some arrangements, the sensor may be an electro-optical sensor. The electro-optical sensor may be, but is not limited to being, a position sensor that generates a signal when an object interrupts light transmitted by the position sensor or a photoelectric sensor that at least one of detects the distance that an object is from the photoelectric sensor and detects the absence or presence of an object.

In some arrangements, the sensor may be an electrical switch. In this manner, when the mating connector is received at the predetermined position within the receptacle, the electrical switch may be contacted by the mating connector to cause the electrical switch to either generate or stop generating the electrical signal to indicate that the mating connector is received at the predetermined position.

In accordance with another aspect of the present technology, an energy conveying connector assembly may include an energy conveying connector and a mating connector for mating with the energy conveying connector. Such energy conveying connector may include a receptacle which may be dimensioned for receiving the mating connector and a sensor which may be mounted to the receptacle. When the mating connector is received at a predetermined position within the receptacle, the sensor may detect the receipt of the mating connector at the predetermined position within the receptacle and either generate or stop generating an electrical signal to indicate that the mating connector is received at the predetermined position.

In some arrangements, the energy conveying connector may be an optical or electrical connector for holding an optical fiber or electrically conductive element. In this manner, in some such arrangements, when the mating connector is received at the predetermined position and is holding the optical fiber or electrically conductive element, the optical fiber or electrically conductive element may be at a predetermined alignment position within the energy conveying connector.

In accordance with another aspect of the present technology, an energy conveying connector assembly may include a receptacle dimensioned for receiving a mating connector for mating with the energy conveying connector and a sensor mounted to a frame configured to couple with the receptacle. When the frame is coupled with the receptacle and the mating connector is received at a predetermined position within the receptacle, the sensor may detect the receipt of the mating connector at the predetermined position within the receptacle and may either generate or stop generating an electrical signal to indicate that the mating connector is received at the predetermined position.

In some arrangements, the energy conveying connector may be an optical or electrical connector for holding an optical fiber or electrically conductive element. In this manner, in some such arrangements, when the mating connector is received at the predetermined position and is holding the optical fiber or electrically conductive element, the optical fiber or electrically conductive element may be at a predetermined alignment position within the energy conveying connector.

In some arrangements, the sensor may detect the receipt of the mating connector at the predetermined position within the receptacle through the receptacle.

In accordance with another aspect of the present technology, a connector assembly may include a housing, a ferrule, and a sensor. The housing may have a bore. The ferrule may be translatable within the bore of the housing. The sensor may be mounted in the bore of the housing and may be configured for detecting translation of the ferrule. Upon such detection of the ferrule, an electrical characteristic of the sensor may change to indicate translation of the ferrule to a predetermined position.

In some arrangements, the sensor may include a probe that may be configured for contacting the ferrule during translation of the ferrule. In this manner, the probe may translate with the ferrule during contact with the ferrule and the electrical characteristic of the sensor may change to indicate that the ferrule has translated to the predetermined position as a function of the translation of the probe. Such probe may be a retractable probe that retracts from a rest position.

In some arrangements, the sensor may be a pressure or a displacement sensor.

In some arrangements, the connector assembly may include a resilient element that may be in abutment with the ferrule. In such configurations, the sensor may detect changes in length of the resilient element during translation of the ferrule.

In some arrangements, the connector assembly may include an optical fiber having a portion passing through the ferrule. In such configurations, the ferrule may maintain the position of the portion of the optical fiber passing through the ferrule.

In some arrangements, the connector assembly may include a cable. The cable may include a second sensor that may be positioned along a length of the cable. In such configurations, an electrical characteristic of the second sensor may change when the surface of the cable over which the second sensor lies deforms. In some such arrangements, an alert signal may be generated by a remote electronic device when an electrical signal corresponding to a changed electrical characteristic of the second sensor is conducted to the remote electronic device and has at least a minimum value.

In accordance with another aspect of the present technology, a connector assembly may include a housing, a ferrule, and electrically conductive first and second contacts. The housing may have a bore. The ferrule may be translatable within the bore of the housing. The electrically conductive first contact may be mounted to the housing. The electrically conductive second contact may be mounted to the ferrule. The electrically conductive second contact may be moveable between first and second positions during translation of the ferrule. The electrically conductive second contact may be conductively coupled with the electrically conductive first contact when the ferrule is in the first position of translation, and the electrically conductive second contact may not be conductively coupled with the electrically conductive first contact when the ferrule is in the second position of translation.

In accordance with another aspect of the present technology, a system may include a circuit, a housing, a ferrule, and electrically conductive first and second contacts. The circuit may be configured for providing a control signal to a peripheral component. The housing may have a bore. The ferrule may be translatable within the bore of the housing. The electrically conductive first contact may be mounted to the housing. The electrically conductive second contact may be mounted to the ferrule on an end of the ferrule. The electrically conductive second contact may be moveable between first and second positions during translation of the ferrule. The electrically conductive second contact may be conductively coupled with the electrically conductive first contact when the ferrule is in the first position of translation, and the electrically conductive second contact may not be conductively coupled with the electrically conductive first contact when the ferrule is in the second position of translation.

In some arrangements, the circuit may be a logic circuit, and in some such arrangements, the system may be a logic system.

In some arrangements, when the electrically conductive first and second contacts are conductively coupled, the circuit may not provide the control signal to the peripheral component.

In some arrangements, when the electrically conductive first and second contacts are conductively coupled, the circuit may provide the control signal to the peripheral component.

In accordance with another aspect of the present technology, a connector assembly may include an adapter, a housing, a ferrule, and a sensor. The housing may be received by the adapter and may have a bore. The ferrule may be translatable within the bore of the housing. The sensor may be mounted on the housing or on the adapter. The sensor may be configured for detecting translation of the ferrule. An electrical characteristic of the sensor may change to indicate translation of the ferrule to a predetermined position.

In some arrangements, the sensor may be mounted on an exterior portion of a wall of the housing in which the wall defines the bore of the housing and in which the exterior portion is on an opposite side of the wall from the bore.

In some arrangements, the sensor may include a probe which may be configured for contacting the adapter when the sensor is mounted on the housing or the housing when the sensor is mounted on the adapter. In this manner, the probe may translate or be translated against the adapter when the sensor is mounted on the housing or with the housing when the sensor is mounted on the adapter. Such translation of the probe may be in proportion to the translation of the ferrule during such contact of the probe with the respective adapter or housing. The electrical characteristic of the sensor may change to indicate that the ferrule has translated to the predetermined position as a function of the translation of the probe.

In some arrangements, the sensor may be a displacement sensor. In some other arrangements, the sensor may be a force sensor, e.g., a pressure sensor.

In some arrangements, the connector assembly may further include a projection which may extend from the housing. In some such arrangements, the sensor may be mounted on the projection when the sensor is mounted on the housing or the probe may be configured for contacting the projection when the sensor is mounted on the adapter.

In some arrangements, the housing may include a main body and a projection which may extend from the main body. The sensor may be mounted between the main body and the projection on either of the main body and the projection. The sensor may include a probe which may be configured for contacting the projection when the sensor is mounted on the main body or the main body when the sensor is mounted on the projection. In this manner, the probe may translate or be translated with the projection when the sensor is mounted on the main body or against the main body when the sensor is mounted on the projection. Such translation of the probe may be in proportion to the translation of the ferrule during such contact with the respective projection or main body. The electrical characteristic of the sensor may change to indicate that the ferrule has translated to the predetermined position as a function of the translation of the probe.

In some such arrangements, the projection may be hingedly connected to the main body when the sensor is on the main body. In some other such arrangements, the projection may be integral with the main body.

In some arrangements, the connector assembly may further include a projection that may extend from the housing. The sensor may be mounted on the projection when the sensor is mounted on the housing or the sensor may be configured for contacting the projection when the sensor is mounted on the adapter. During translation of the ferrule a minimum distance, the sensor may be pressed by a force from the adapter when the sensor is mounted on the housing or the projection may be pressed by a force against the sensor when the sensor is mounted on the adapter. The electrical characteristic of the sensor may change to indicate that the ferrule has translated to the predetermined position as a function of the force acting on the sensor.

In some arrangements, the housing may include a main body and a projection extending from the main body. The sensor may be mounted between the main body and the projection on either of the main body and the projection. The sensor may be configured for contacting the main body when the sensor is mounted on the projection or the sensor may be configured for contacting the projection when the sensor is mounted on the main body. During translation of the ferrule a minimum distance, the sensor may be pressed by a force against the main body when the sensor is mounted on the projection or the projection may be pressed by a force against the sensor when the sensor is mounted on the main body. The electrical characteristic of the sensor may change to indicate that the ferrule has translated to the predetermined position as a function of the force acting on the sensor.

In some such arrangements, the projection may be hingedly connected to the main body when the sensor is on the main body. In some other such arrangements, the projection may be integral with the main body.

In accordance with another aspect of the present technology, a connector assembly may include an adapter, a housing device, a ferrule, and a sensor. The housing device may include a housing that may be receivable by the adapter and may have a bore, a front end, and a rear end that is opposite the front end of the housing. The ferrule may be received at least partially within the bore of the housing and may have a mating end that may extend beyond the front end of the housing. The sensor may be mounted on the rear end of the housing device or on the adapter. When the sensor is mounted on the adapter, the sensor may confront and may be spaced apart from the rear end of the housing device. The sensor may be configured for detecting a force applied by the rear end of the housing device, or in some arrangements, other components of the housing device fixed to the housing such that the components translate with the housing. An electrical characteristic of the sensor may change to indicate a predetermined force has been applied by the housing device.

In some arrangements, the adapter may include a first adapter wall and the housing device may include a first housing wall. In this manner, when the first housing wall is received in the adapter and is on an inner side of the first adapter wall in which the first adapter wall faces a first direction, movement of the first housing wall in a second direction opposite the first direction may be limited by the first adapter wall.

In some arrangements, the first housing wall may face in the second direction.

In some arrangements, the mating end of the ferrule may face in the first direction and may be on the inner side of the first adapter wall when the movement of the first housing wall in the second direction is limited by the first adapter wall.

In some arrangements, the mating end of the ferrule may be spaced in the first direction from the first housing wall when the movement of the first housing wall in the second direction is limited by the first adapter wall.

In some arrangements, the first housing wall may be movable when the first housing wall is received in the adapter and is on the inner side of the first adapter wall.

In some arrangements, the adapter may include a second adapter wall opposing the first adapter wall. In some such arrangements, the first housing wall may be between the first and the second adapter walls when the first housing wall is received in the adapter and is on the inner side of the first adapter wall.

In some such arrangements, the housing device may include a second housing wall opposite the first housing wall. When the first housing wall is received in the adapter and is on the inner side of the first adapter wall, the first housing wall may face the first adapter wall to define a first distance between the first housing wall and the first adapter wall and the second housing wall may face the second adapter wall to define a second distance between the second housing wall and the second adapter wall. In this manner, the sum of the first and the second distances may be greater than zero.

In some such arrangements, the first distance may be a first clearance defined by a peak of the first housing wall and a peak of the first adapter wall. The second distance may be a second clearance defined by a peak of the second housing wall and a peak of the second adapter wall. In this manner, the sum of the first and the second clearances may be greater than zero. In some such arrangements, this sum may be at least 0.1 mm. In some such arrangements, the sum of the first and the second clearances may be at least 0.5 mm.

In some arrangements, the first housing wall may be defined by a step of a lever of an LC connector. The first adapter wall may be a portion of a hole extending through or may be a cavity extending within the adapter. In this manner, the step of the lever may be received in the hole or the cavity extending within the adapter when the first housing wall is received in the adapter.

In some arrangements, the housing device may form part of an SC connector. The housing may define a groove and may include a protrusion that may act as a catch, which may be but is not limited to being for interaction with a hook of a flange. The first housing wall may define a portion of the groove. The first adapter wall may define an end of a flange such that the end of the flange is received in the groove of the housing when the first housing wall is received in the adapter.

In some arrangements, the adapter may include a base plate, and the sensor may be mounted on the base plate.

In some arrangements, the sensor may be mounted on the rear end of the housing device. In some such arrangements, the adapter may include a base plate and a post may extend from the base plate such that the sensor is in abutment with the post when the sensor detects the force applied by the rear end of the housing device.

In some arrangements, the sensor may be a force sensor.

In some arrangements, the sensor may a displacement sensor.

In some arrangements, an indication that the predetermined force has been applied by the housing device may indicate that a second predetermined force has been applied to the mating end of the ferrule.

In some arrangements, the housing device further includes an extension device that may extend from a rear end of the housing. In some such arrangements, a rear end of the extension device may define the rear end of the housing device.

In some arrangements, the sensor may be mounted on the rear end of the extension device.

In some arrangements, the extension device may be separable from the housing without fracturing either of the housing and the extension device.

In some arrangements, the extension device may be threaded onto or into the housing.

In some arrangements, the extension device may include an inner extension body and an outer extension body that may be attached to the inner extension body. The inner extension body may be directly attached to the rear end of the housing and the outer extension body may extend radially from the inner extension body such that the force that the sensor is configured to detect is applied by a rear end of the outer extension body.

In some arrangements, the inner and outer extension bodies may be in the form of tubes. In some such arrangements, the outer extension body may circumferentially surround and may be attached to the inner extension body. In some such arrangements, the outer extension body may be threaded onto the inner extension body.

In accordance with another aspect of the present technology, a connector assembly may include an adapter, a housing device, a ferrule, and a sensor. The housing device may include a housing that may be receivable by the adapter and may have a bore, a front end, and a rear end that is opposite the front end of the housing. The ferrule may be within the bore of the housing and may have a mating end that may extend beyond the front end of the housing device. The sensor may be mounted on the rear end of the housing device or on the adapter. When the sensor is mounted on the adapter, the sensor may confront and may be spaced apart from the rear end of the housing device. The sensor may be configured for detecting translation of the housing device. In this manner, an electrical characteristic of the sensor may change to indicate that the housing device has translated to a predetermined position.

In some arrangements, an indication that the housing device has translated to the predetermined position may indicate that the mating end of the ferrule has translated to a second predetermined position.

In some arrangements, the housing device and the ferrule may be translated the same distance.

In some arrangements, the sensor may include a base module and a displaceable probe that may extend from the base module. In this manner, the electrical characteristic of the sensor may change to indicate that the housing device has translated to the predetermined position as a function of the force acting on the probe or of the displacement of the probe.

In some arrangements, the housing device may further include an extension device that may extend from a rear end of the housing. In some such arrangements, a rear end of the extension device may define the rear end of the housing device.

In accordance with another aspect of the technology, a connector assembly may include an adapter; a housing device, a ferrule assembly, and a sensor. The housing device may include a housing that may be receivable by the adapter. The housing may include a bore, a front end, and a rear end opposite the front end of the housing. The bore through the housing may define an opening at the rear end of the housing, which in some arrangements may be the rear end of the housing device. The ferrule assembly may include a ferrule within the bore of the housing and may have a mating end that may extend beyond the front end of the housing. The ferrule assembly may have a front end and a rear end opposite the front end of the ferrule assembly. The sensor may be mounted on the rear end of the ferrule assembly or on the adapter confronting and spaced apart from the rear end of the ferrule assembly. The sensor may be configured for detecting either of or both of (i) a force applied by the rear end of the ferrule assembly and (ii) translation of the ferrule assembly. In this manner, an electrical characteristic of the sensor may change to indicate either of or both of (i) a predetermined force has been applied by the ferrule assembly when the sensor is configured for detecting a force applied by the rear end of the ferrule assembly and (ii) a translation of the ferrule assembly to a predetermined position when the sensor is configured for detecting translation of the ferrule assembly.

In some arrangements, the adapter may include a base plate and the sensor may be mounted on the base plate.

In some arrangements, the sensor may include a base module and a displaceable probe that may extend from the base module. In this manner, the electrical characteristic of the sensor may change to indicate that the housing device has translated to the predetermined position as a function of the force acting on the probe or of the displacement of the probe.

In some arrangements, the sensor may be mounted on the rear end of the ferrule assembly. In some such arrangements, the rear end of the ferrule assembly may be outside of the housing device when the sensor detects either of (i) the force applied by the rear end of the ferrule assembly and (ii) the translation of the ferrule assembly.

In some arrangements, the adapter may include a base plate and a post extending from the base plate such that the sensor is in abutment with the post when the sensor detects either of (i) the force applied by the rear end of the ferrule assembly and (ii) the translation of the ferrule assembly.

In some arrangements, the sensor may be a force sensor. In some arrangements, the sensor may be a displacement sensor.

In some arrangements, an indication that the predetermined force has been applied by the housing device may indicate that a second predetermined force has been applied to the mating end of the ferrule.

In some arrangements, the ferrule assembly may further include an extension device that may extend from a rear end of the ferrule. In some such arrangements, a rear end of the extension device may define the rear end of the ferrule assembly.

In some arrangements, the sensor may be mounted on the rear end of the extension device.

In some arrangements, the extension device may be separable from the housing without fracturing either of the ferrule and the extension device.

In some arrangements, the extension device may be threaded onto or into the ferrule.

In some arrangements, the extension device may include an inner extension body and an outer extension body attached to the inner extension body. In some such arrangements, the inner extension body may be directly attached to the rear end of the ferrule and the outer extension body may extend radially from the inner extension body such that the force that the sensor is configured to detect is applied by a rear end of the outer extension body.

In some arrangements, the inner and outer extension bodies may be in the form of tubes. In some such arrangements, the outer extension body may circumferentially surround and may be attached to the inner extension body. In some such arrangements, the outer extension body may be threaded onto the inner extension body.

In some arrangements, the sensor may include a probe that may extend into the bore of the housing. In some such arrangements, the probe may be aligned with the ferrule assembly such that the ferrule assembly may be in contact with the probe when the sensor detects either of (i) the force applied by the rear end of the ferrule assembly and (ii) translation of the ferrule assembly.

BRIEF DESCRIPTION OF THE DRAWINGS

A more complete appreciation of the subject matter of the present invention and the various advantages thereof can be realized by reference to the following detailed description, in which reference is made to the following accompanying drawings:

FIG. 12C is a cross-sectional side view of a connector assembly for use in an optical assembly in accordance with the present technology;

FIGS. 25A and 25B are cross-sectional side views of optical assemblies, respectively in disconnected and connected states, in accordance with the present technology;

FIGS. 26A and 26B are cross-sectional side views of optical assemblies, respectively in disconnected and connected states, in accordance with the present technology;

FIG. 28 is a partial cross-sectional side view of an optical assembly in accordance with the present technology;

FIGS. 29-31 are partial cross-sectional side views of optical assemblies in accordance with the present technology.

DETAILED DESCRIPTION

Figure 1:
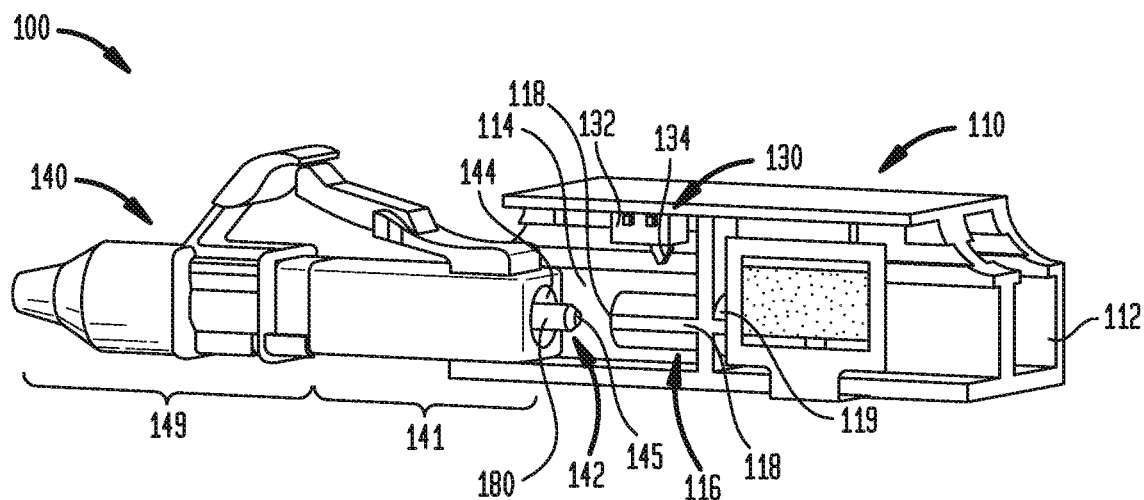
FIG. 1 is a perspective cutaway view of an optical assembly in accordance with the present technology prior to assembly of a male connector and a female connector assembly of the optical assembly.
Figure 2:
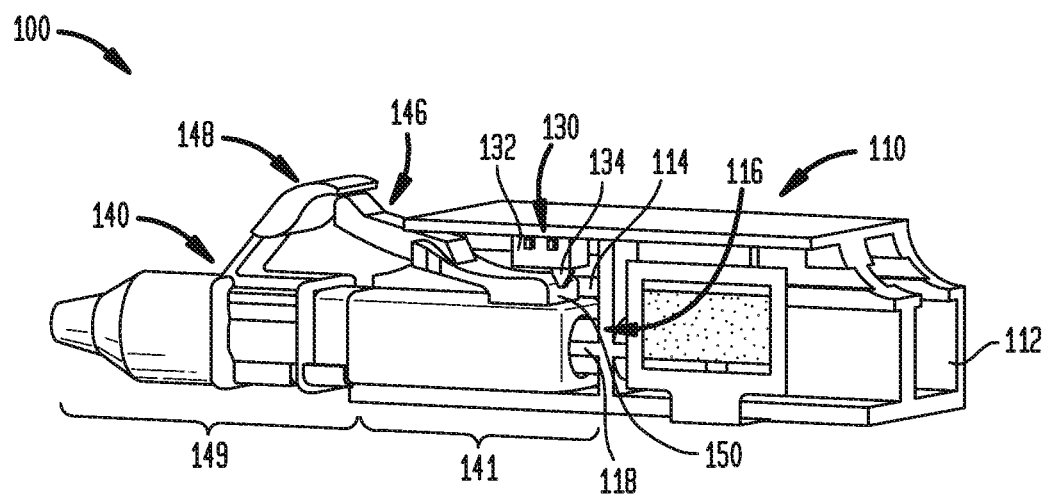
FIG. 2 is a perspective cutaway view of the optical assembly of FIG. 1 after assembly of the male connector and the female connector assembly of the optical assembly.

Referring to FIGS. 1 and 2, optical assembly 100, as an exemplary energy signal conveying assembly for facilitating the conveying of optical signals from one optical fiber to another optical fiber, may include female connector assembly 110 and male connector 140, which as shown may be connectors for alignment of optical fibers such as "LC connectors." Female connector assembly 110 may include first receptacle 112 and second receptacle 114 opposite and sharing a wall with first receptacle 112 in which first receptacle 112 may receive an optical fiber component (not shown) and second receptacle 114 may receive mating end 141 of male connector 140. Female connector assembly 110 may include a plurality of sets of first and second receptacles 112, 114, as in the example shown, to receive a plurality of optical fiber components and male connectors 140.

Female connector assembly 110 further may include switch 130 which, as shown, may be mounted on a surface within second receptacle 114. Switch 130 is shown as a toggle-style switch, having module base 132 and trigger 134. However, other switches, including but not limited to push button switches and magnetically-activated switches or other mechanical contact switches, may be used in place of the toggle-style switch.

Female connector assembly 110 may include female protrusion 116 defining bore 118 for receiving male protrusion 142 extending from mating end 141 of male connector 140 when second receptacle 114 of female connector assembly 110 receives the mating end. As best shown in FIG. 2, when male protrusion 142 is received within female protrusion 116, the female protrusion may be received within recess 144 of male connector 140. Through the interconnection of male protrusion 142 and female protrusion 116, optical fiber 180 extending within bore 145 of male protrusion 142 of male connector 140 may be positioned in female connector assembly 110 to align with an end of an optical fiber within the optical fiber component that may be received within first receptacle 112 described previously herein. As in the example shown, female connector assembly 110 may include second female protrusion 119 defining a bore for receiving a male protrusion extending from a mating end of the optical fiber component through which the optical fiber of the optical fiber component may extend for alignment with optical fiber 180.

Male connector 140 may include lower clip 146 extending from mating end 141 and upper clip 148 extending from front end 149 of male connector 140. Upper clip 148 may act to limit travel of lower clip 146 in a direction away from the rest of the male connector as well as to provide a barrier to protect against undesired bending of the lower clip. Lower clip 146 may include rear surface 150 such that as male connector 140 is received within second receptacle 114 of female connector 110, the rear surface may contact trigger 134 of switch 130 to cause the trigger to move rearwards. As shown, switch 130 may be positioned within second receptacle 114 such that when male connector 140 reaches a predetermined insertion distance, trigger 134 is moved to a position to close a normally open contact, or alternatively to open a normally closed contact. In this manner, switch 130 may generate a signal, such as but not limited to an electrical signal, that may be conveyed to a remote electronic device, such as a light panel (not shown), or generate and transmit a signal for routing to a signal receiver coupled to the electronic device, or in the alternative, may stop generating or transmitting a signal, such as but not limited to an electrical signal, when the switch is open to provide an indication that male connector 140 is properly received within female connector 110. In some arrangements, such a switch may have variable electrical characteristics, such as resistance, capacitance, or inductance that may change when the switch is closed. In such arrangements, the changes in resistance, capacitance, or inductance within the switch may be recognized by a remote receiver that receives an electrical signal corresponding to the changed electrical characteristics and conveyed from the switch, such as over wire or like signal-conveying means.

In some arrangements, switch 130 may be connected to a wire extending into a portion of second receptacle 114 and, in other arrangements, switch 130 may be in contact with a conductive terminal (not shown) adjacent to the switch. In still other arrangements, switch 130 may be electrically connected in other configurations known to those of ordinary skill, such as but not limited to a flex ribbon cable or a flexible circuit board such as that shown in the alternative arrangement in the embodiment of FIGS. 3-6.

Figure 3:
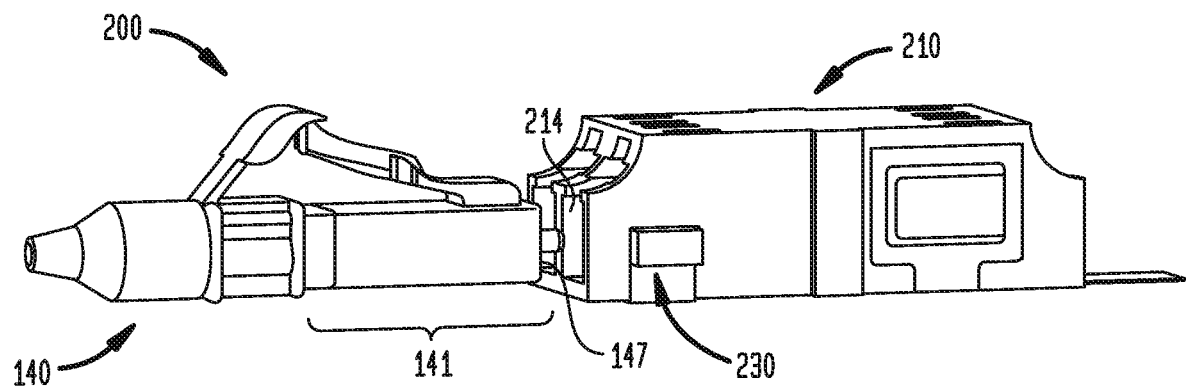
FIG. 3 is a perspective view of an optical assembly in accordance with the present technology prior to assembly of a male connector and a female connector assembly of the optical assembly.
Figure 4:
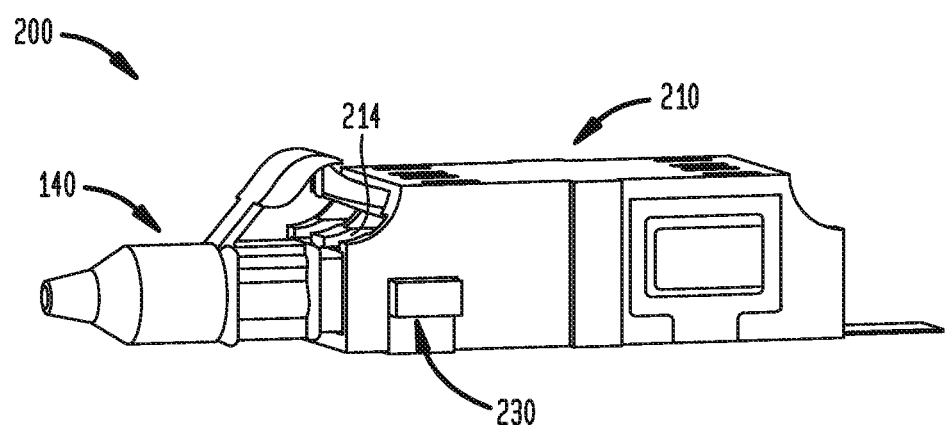
FIG. 4 is a perspective view of the optical assembly of FIG. 3 after assembly of the male connector and the female connector assembly of the optical assembly.
Figure 5:
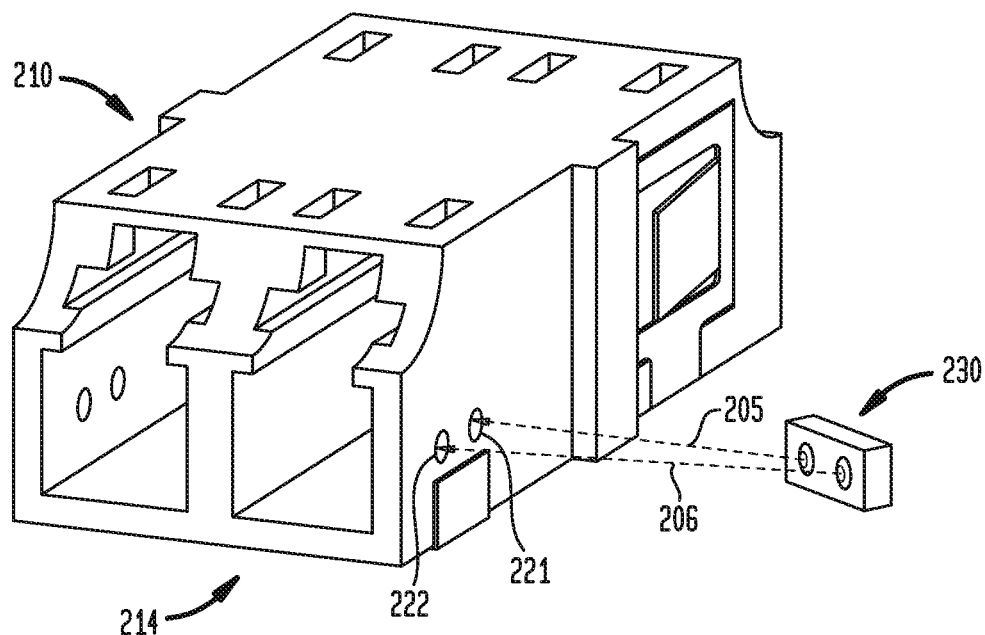
FIG. 5 is a partially exploded view of the female connector assembly shown in FIG. 3.

Referring now to FIGS. 3-6, optical assembly 200 may include female connector assembly 210 and male connector 140. Female connector assembly 210 may be substantially similar to female connector assembly 110 with certain notable exceptions described herein. Female connector assembly 110 may include sensor 230, which may be an electro-optical sensor, in place of, or in addition to switch 130. As best shown in FIG. 5, such an electro-optical sensor may be a position sensor, e.g. any of OSRAM SFH 7741

Proximity Sensor SHARP GP2AP030A00F Proximity Sensor with Ambient Light Sensor, SHARP GP2AP002S00F Proximity Sensor, GP2AP002A00F Proximity Sensor with Integrated Ambient Light Sensor, and VISHAY VCNL4040 Fully Integrated Proximity and Ambient Light Sensor with Infrared Emitter, I²C Interface, and Interrupt Function, that transmits and receives light, designated by arrows 205 and 206 in FIG. 5, as well as generates a signal, such as but not limited to an electrical signal. Such signal may be conveyed to a remote electronic device, such as a light panel (not shown), or a position sensor that generates and transmits a signal for routing to a signal receiver coupled to the electronic device, or in the alternative, stops generating or transmitting a signal, such as but not limited to an electrical signal, when an object interrupts light transmitted by the sensor. In some arrangements, such a position sensor may have variable electrical characteristics, such as resistance, capacitance, or inductance that may change when light is received or stops being received by the sensor. In such arrangements, the changes in resistance, capacitance, or inductance within the sensor may be recognized by a remote receiver that receives an electrical signal corresponding to the changed electrical characteristics and conveyed from the position sensor, such as over a wire or like signal-conveying means.

As in the example shown, sensor 230 may be mounted to an exterior of female connector assembly 210. In this arrangement, female connector assembly 210 may have a pair of holes 221, 222 passing through a sidewall of second receptacle 214. Still referring to FIG. 5, the light transmitted by sensor 230 may pass through hole 221 and the light received by sensor 230 may pass through hole 222.

Figure 6:
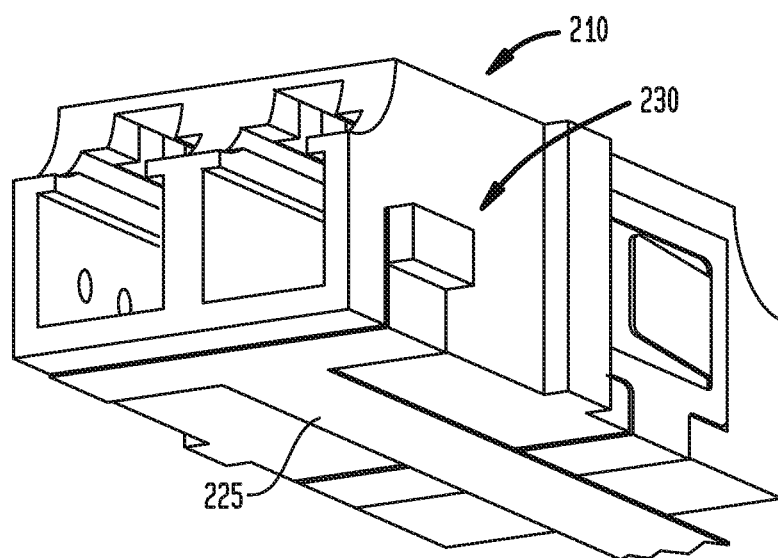
FIG. 6 is a perspective view of the female connector assembly shown in FIG. 3.

As shown in FIG. 6, cable 225, which may be but is not limited to being a flex ribbon cable or as shown a flexible circuit board, may be electrically connected and extend from sensor 230. In this manner, cable 225 may provide electrical power to activate sensor 230 such that the sensor may transmit light, detect received light, and generate or generate and transmit a signal when an object interrupts the light transmitted by the sensor.

Referring to FIGS. 3 and 4, mating end 141 of male connector 140 may include rear edge 147 such that when the rear edge is received to a depth within second receptacle 214 of female connector assembly 210 that aligns with hole 222 of female connector assembly 210, the rear edge may interrupt the light transmitted by sensor 230. In this manner, sensor 230 may detect the presence of male connector 140 in second receptacle 214 of female connector assembly 210. When the presence of male connector 140 is detected, sensor 230 may generate a signal to be carried along cable 225, such as but not limited to an electrical signal, that may be conveyed to a remote electronic device, such as a light panel (not shown), or generate and transmit a signal for routing to a remote signal receiver, or in the alternative, sensor 230 may stop generating or transmitting a signal, such as but not limited to an electrical signal, in a manner similar to switch 130 of optical assembly 100 as described previously herein.

Figure 7:
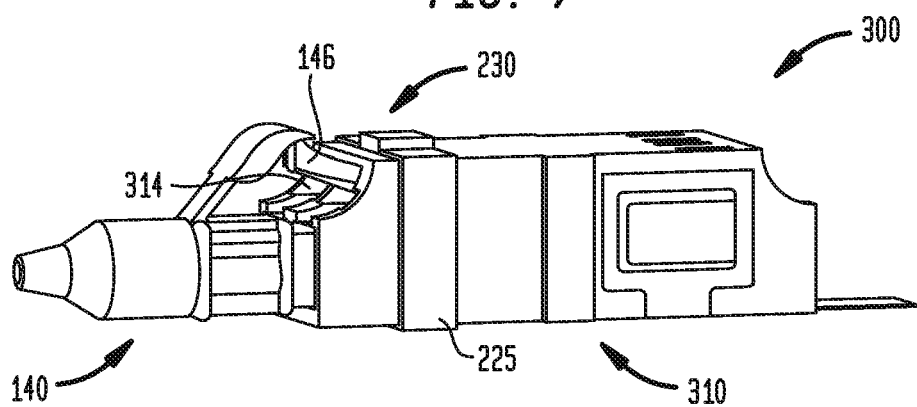
FIG. 7 is a perspective view of an optical assembly in accordance with the present technology.

Referring to FIG. 7, optical assembly 300 may include female connector assembly 310 and male connector 140. Female connector assembly 310 may be substantially similar to female connector assembly 210 with the exception that sensor 230 of female connector assembly may be positioned on an exterior of female connector assembly 310 such that sensor 230 is in alignment with holes extending through a sidewall of second receptacle 314 of female connector assembly 310. In such an arrangement, the hole passing through the sidewall of second receptacle 314 through which sensor 230 detects light may be positioned to align with lower clip 146 when lower clip 146 is in a rest position at full insertion of male connector 140 into female connector assembly 310. As such, the interruption of light transmitted by sensor 230 may be detected by sensor 230 when lower clip 146 is in the rest position and consequently sensor 230 may generate a signal to be carried along cable 225 or stop generating a signal to be carried along cable 225 in the same manner that a signal either is generated by optical assembly 200 or stops being generated by optical assembly 200. As lower clip 146 is in a rest position at full insertion of male connector 140, sensor 230 thus detects presence as well as the full insertion of male connector 140 into female connector assembly 310.

Figure 8:
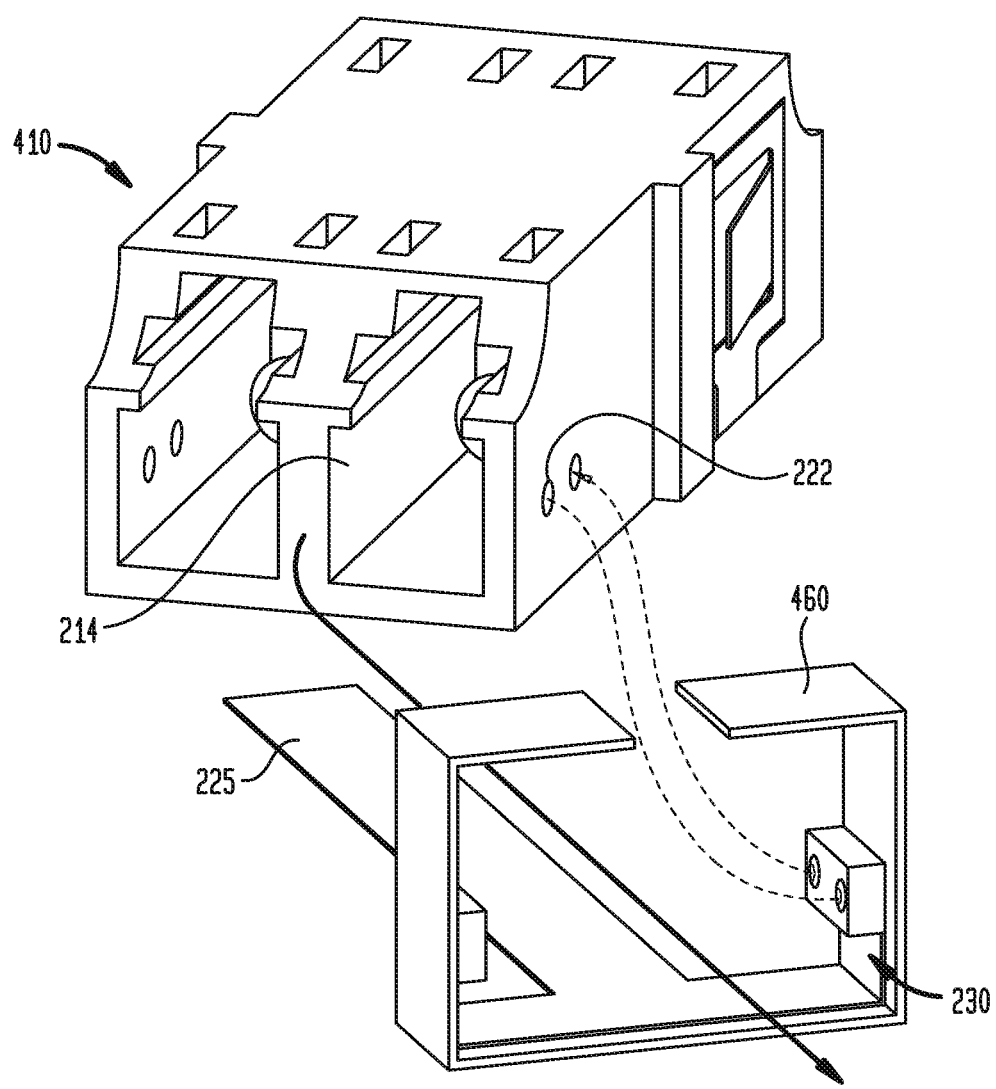
FIG. 8 is an exploded view of a portion of an optical assembly in accordance with the present technology.

Referring to FIG. 8, an optical assembly may include female connector assembly 410 and a male connector, such as male connector 140. Female connector assembly 410 may be substantially similar to female connector assembly 210 with the exception that sensor 230 may be fixed to construct 460, which may be but is not limited to being a frame, that is separable from female connector assembly 410. As shown, cable 225 may be fixed, such as but not limited to by adhesive, to construct 460 to add rigidity to the cable.

Construct 460 may be positioned relative to or even coupled with female connector assembly 410 such that sensor 230 is in alignment with hole 222 extending through a sidewall of second receptacle 214 of female connector assembly 410. In this manner, when rear edge 147 of male connector 140 is received to a depth within second receptacle 214 of female connector assembly 410 that aligns with hole 222 of female connector 210, the rear edge interrupts the light transmitted by sensor 230. In this manner, sensor 230 may detect the presence of male connector 140 in second receptacle 214 of female connector assembly 410. When the presence of male connector 140 is detected, sensor 230 may generate a signal to be carried along cable 225, such as but not limited to an electrical signal, that may be conveyed to a remote electronic device, such as a light panel (not shown), or generate and transmit a signal for routing to a remote signal receiver, or in the alternative, sensor 230 may stop generating or transmitting a signal, such as but not limited to an electrical signal.

In an alternative arrangement (not shown) of optical assemblies 200 and 400, sensor 230 and corresponding holes for alignment with the light transmitted and received by the sensor may be positioned at the exterior of the second receptacle of the female connector assembly such that rear edge 147 of male connector 140 may align with the first hole with which the rear edge may align when male connector 140 is fully inserted into the second receptacle of the female connector. As such, the interruption of light transmitted by sensor 230 may be detected by sensor 230 when male connector 140 is fully inserted into the second receptacle of the female connector and consequently sensor 230 may generate a signal to be carried along cable 225 or stop generating a signal to be carried along cable 225 in the same manner that a signal either may be generated by optical assembly 200 or may stop being generated by optical assembly 200. In such an arrangement, sensor 230 thus detects presence as well as the full insertion of male connector 140 into the female connector assembly.

Figure 9:
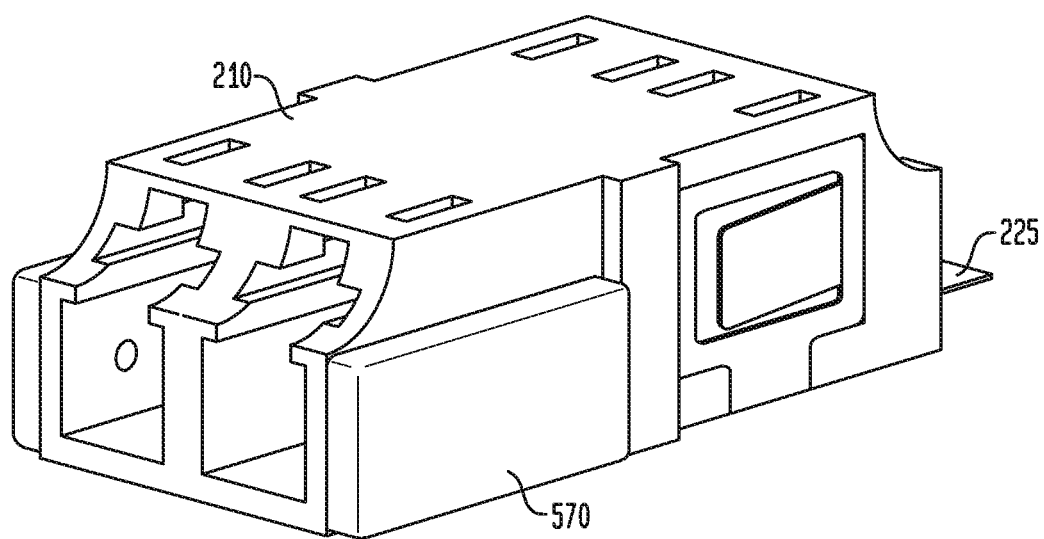
FIG. 9 is a perspective view of a portion of an optical assembly in accordance with the present technology.

Referring now to FIG. 9, cover 570 may be placed over a sensor, such as sensor 230, and attached to a female connector assembly, such as female connector assembly 210 or any of the other female connector assemblies disclosed herein, to cover the connection between the sensor and cable 225. In this manner, cover 570 may prevent contaminants from damaging the circuitry of or interfering with the signal transmission between the sensor and cable 225.

Figure 10A:
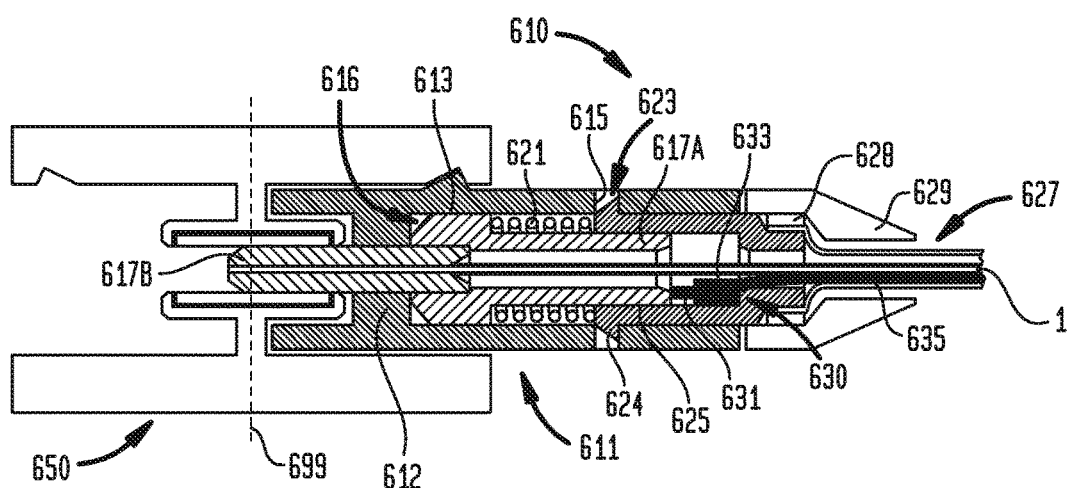
FIGS. 10A and 10B are cross-sectional side views of an optical assembly in accordance with the present technology.
Figure 10B:
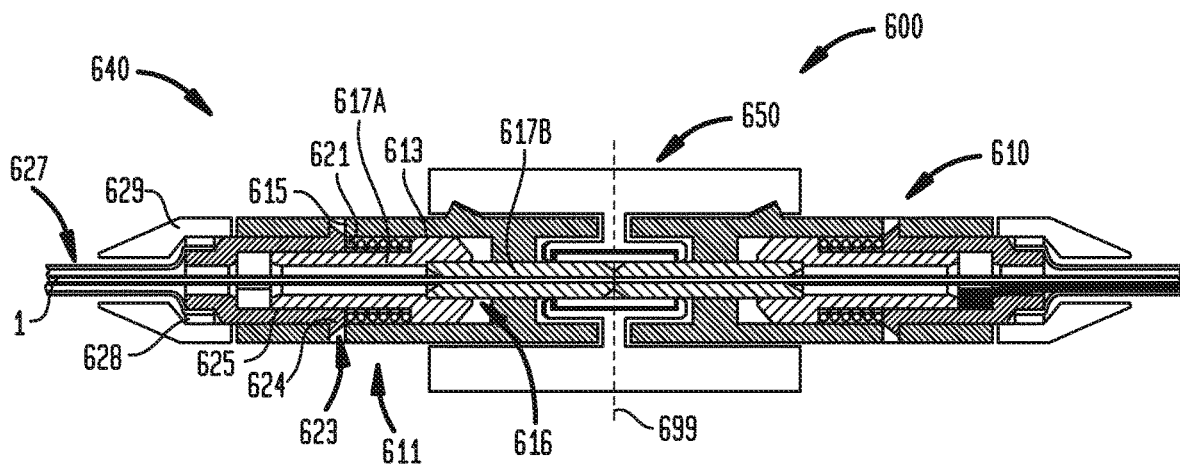

Referring now to FIGS. 10A and 10B, optical assembly 600 may include first connector assembly 610 and second connector assembly 640 in which the first and second connector assemblies may be engageable by way of abutment to each other as well as adapter 650 into which the first and second connector assemblies may be inserted and properly aligned to each other. Each of first and second connector assemblies 610, 640 may include housing 611, fiber and ferrule assembly 616 which may have inner and outer ferrule portions 617A and 617B as well as optical fiber 1 extending through each of the inner and outer ferrule portions and held in position by the outer ferrule portion, resilient element 621 which may be but is not limited to being a coil spring, and resilient element stopper 623. As in the example shown, each of first and second connector assemblies 610, 640 may optionally include buffer tubes and yarn assembly 627, crimp ring 628 which may crimp the buffer tubes and yarn assembly as well as rearward end of resilient element stopper 623, and boot 629 that may cover any or all of the rearward end of resilient stopper 623, buffer tubes and yarn assembly 627, and crimp ring 628.

As shown, housing 611 may include partition 612 across its diameter through which outer ferrule portion 617B of fiber and ferrule assembly 616 may extend. In this manner, partition 612 holds a central portion of outer ferrule portion 617B such that the partition aids in the alignment of the outer ferrule portion and thus fiber 1 of fiber and ferrule assembly 616 along a central axis defined by the housing.

Inner ferrule portion 617A may extend through housing bore 613 of housing 611 on an inner side of partition 612 of housing 611 in which a forward section of inner ferrule portion 617A may have an outer diameter that is the same or substantially the same as the housing bore such that the inner ferrule portion is in sliding engagement, in this example sliding contact, with the housing bore and is fixed in radial and axial positions relative to the housing.

A rearward end of outer ferrule portion 617B, which may be but is not limited to being made of any of ceramic, glass, and stiff plastic, may extend into the forward section of inner ferrule portion 617A. In this manner, inner ferrule portion 617A may hold a central portion of outer ferrule portion 617B such that the inner ferrule portion, in conjunction with partition 612 of housing 611, aids in the alignment of the outer ferrule portion and thus fiber 1 of fiber and ferrule assembly 616 along a central axis defined by the housing.

Resilient element stopper 623 may extend through housing 611 and may have forward flanges 624 that extend radially from a longitudinal axis of the resilient element stopper 623. As shown, forward flanges 624 may be chamfered such that forward ends of the forward flanges of resilient element stopper 623 have a smaller diameter than a rearward end of the forward flanges. Forward flanges 624 may extend into apertures 615 of housing 611 upon assembly of resilient element stopper 623 with housing 611. As further shown, resilient element stopper 623 may have an outer diameter that is the same or substantially the same as housing bore 613 of housing 611. In this manner, resilient element stopper 623 may be inserted into and remain in contact with housing bore 613 through a rearward end of the housing such that the resilient element stopper is fixed in radial and axial positions relative to housing 611.

Resilient element stopper 623 may include stopper bore 625 that may receive a rearward section of inner ferrule portion 617A. The rearward section of inner ferrule portion 617A may have an outer diameter that is the same or substantially the same as stopper bore 625 such that the inner ferrule portion is in sliding engagement, in this example sliding contact, with the stopper bore and is fixed in radial and axial positions relative to resilient element stopper 623.

Still referring to FIGS. 10A and 10B, resilient element 621 may be compressed between the forward section of inner ferrule portion 617A of fiber and ferrule assembly 616 and the forward ends of forward flanges 624 of resilient element stopper 623. As such, opposing ends of resilient element 621 may be held against the forward section of inner ferrule portion 617A and the forward ends of forward flanges 624 of resilient element stopper 623, respectively, when the first and second connector assemblies 610, 640 are assembled. In this manner, as shown, a forward end of inner ferrule portion 617A may abut against partition 612 when no external, i.e., non-gravitational, forces are acting on either of first and second connector assemblies 610, 640.

First and second connector assemblies 610, 640 preferably may be dimensioned such that when these assemblies are in abutment with each other, centers of the forward ends of their opposing optical fibers 1 extending through their respective fiber and ferrule assemblies 616 are axially aligned with the central axes defined by the fiber and ferrule assemblies 616 of the respective first and second connector assemblies 610, 640, and these centers are disposed as close to each other as physically possible, as illustrated in FIG. 10B.

First connector assembly 610, and in some arrangements second connector assembly or both first and second connector assemblies 610, 640, may include sensor 630 that may be positioned within housing bore 613 of housing 611 of the first connector assembly. As in the example shown, sensor 630 may be affixed, such as but not limited to by one or more fasteners or chemical adhesion as known to those skilled in the art, to stopper bore 625. Sensor 630 may include probe 631 which may extend in a forward direction from sensor module 633 of the sensor in a rest position and which may be retractable such that the probe retracts from the rest position to a retracted position in which at least a portion of the probe not received in the sensor module when the probe is in the rest position is received in the sensor module. In such an arrangement, sensor 630 may be a displacement sensor or force sensor, e.g., a pressure sensor.

When sensor 630 is a displacement sensor, such as those known to those of ordinary skill in the art, a linear encoder in sensor module 633 may detect movement of probe 631 within the module. In other arrangements when sensor 630 is a displacement sensor, probe 631 may be made of a material such that the probe may provide variable resistance to a current flowing through the probe as portions of the probe move into and out of sensor module 633. Such changes in resistance may be measured by an electronic device receiving an electrical signal corresponding to the changed resistance in which the electrical signal may be conveyed over a wire or like signal-conveying means. In still other arrangements when sensor 630 is a displacement sensor, probe 631 may be made of dielectric material such that the probe may provide for variable capacitance as portions of the probe move into and out of sensor module 633. Such changes in capacitance may be measured by an electronic device receiving an electrical signal corresponding to the changed capacitance in which the electrical signal may be conveyed over a wire or like signal-conveying means.

In some arrangements when sensor 630 is a force sensor, probe 631 may abut against a pressure-sensing surface which may be but is not limited to being a diaphragm. In some arrangements when sensor 630 is a force sensor, the sensor may not include probe 631 and instead inner ferrule portion 617A of fiber and ferrule assembly 616 may have an extension (not shown) that may abut against a pressure-sensing surface which may be but is not limited to being a diaphragm. In some arrangements when sensor 630 is a force sensor such as those just described, the pressure-sensing surface may be a deflected diaphragm or other cantilever abutted against probe 631 or an extension of inner ferrule portion 617A of fiber and ferrule assembly 616, as the case may be.

In still other arrangements, sensor 630 may not be a pressure or displacement sensor such as those just described. Instead, a micro strain gage may be affixed to a resilient element within sensor module 633 in which the resilient element may be fixedly attached, such as but not limited to by fastening or chemical adhesion, to probe 631. In such arrangements, the strain gage may detect deformation of the surface of the resilient element, for example, in the axial direction, i.e., the direction parallel to the longitudinal axis of probe 631.

As shown, sensor 630 may be positioned within housing bore 611 of housing 610, and in this example within stopper bore 625 of resilient element stopper 623, such that a forward end of retractable probe 631 may contact the rearward end of inner ferrule portion 617A. In this manner, when first connector assembly 610 is not engaged with, in this example not in abutment with, second connector assembly 640, probe 631 of sensor 630 may be extended from sensor module 633 at the rest position. Further in this manner, application of a force in the rearward direction by the forward end of outer ferrule portion 617B of second connector assembly 640 with the forward end of outer ferrule portion 617B of first connector assembly 610 during engagement of first and second connector assemblies 610, 640 may cause probe 631 to retract towards sensor module 633 of sensor 630.

As shown in FIG. 10A, when first connector assembly 610 is fully inserted into adapter 650 of optical assembly 600 without being engaged with, in this example without being in abutment with, second connector assembly 640 and thus such that fiber and ferrule assembly 616 is at a rest position, outer ferrule portion 617B may extend beyond plane 699 dividing the adapter into equal halves. As shown in FIG. 10B, when second connector assembly 640 is fully inserted into adapter 650 of optical assembly 600 following insertion of first connector assembly 610, the forward ends of outer ferrule portions 617B of first and second connector assemblies 610, 640 may push against each other to cause their opposing fiber and ferrule assemblies 616 to remain in contact but tend towards rearward directions away from each other. In this manner, a rear end of fiber and ferrule assembly 616, i.e., the rear end of inner ferrule portion 617A, of first connector assembly 610 may compress retractable probe 631 of sensor 630. When retractable probe 631 is so compressed within a predetermined tolerance range, sensor 630 may generate a signal, such as but not limited to an electrical signal, that may be conveyed to a remote electronic device, such as a light panel (not shown), or generate and transmit a signal for routing to a signal receiver coupled to the electronic device, or in the alternative, may stop generating or transmitting a signal, such as but not limited to an electrical signal, to provide an indication that second connector assembly 640 is inserted into adapter 650 to a predetermined depth. In some arrangements, such a displacement or force sensor may have variable electrical characteristics, such as resistance, capacitance, or inductance that may change when movement or force supplied by the connector assembly occurs or stops occurring. In such arrangements, the changes in resistance, capacitance, or inductance within the sensor may be recognized by a remote receiver that receives an electrical signal corresponding to the changed electrical characteristics and conveyed from the displacement or force sensor, such as over a wire or like signal conducting means.

In this same manner, signals generated or that are stopped from being generated or transmitted in a predetermined tolerance range as a result of the retraction of probe 631 of sensor 630 when second connector assembly 640 is not inserted into adapter 650 or as a result of the over-retraction of probe 631 of sensor 630 when second connector assembly is inserted into adapter 650 may also be used to detect when optical fiber 1 has been pulled rearwards, i.e., in the direction away from adapter 650. Such a pulling effect may be but is not limited to being caused by a human pulling on first connector assembly 610 or by the expansion of cable buffer tubes and yarn assembly 627 in all directions due to environmental elements (temperature, moisture, etc.). As shown in the example of FIGS. 10A and 10B, cable 635 may extend from sensor 630, out of the rearward end of resilient element stopper 623, and through cable buffer tubes and yarn assembly 627.

Figure 11:
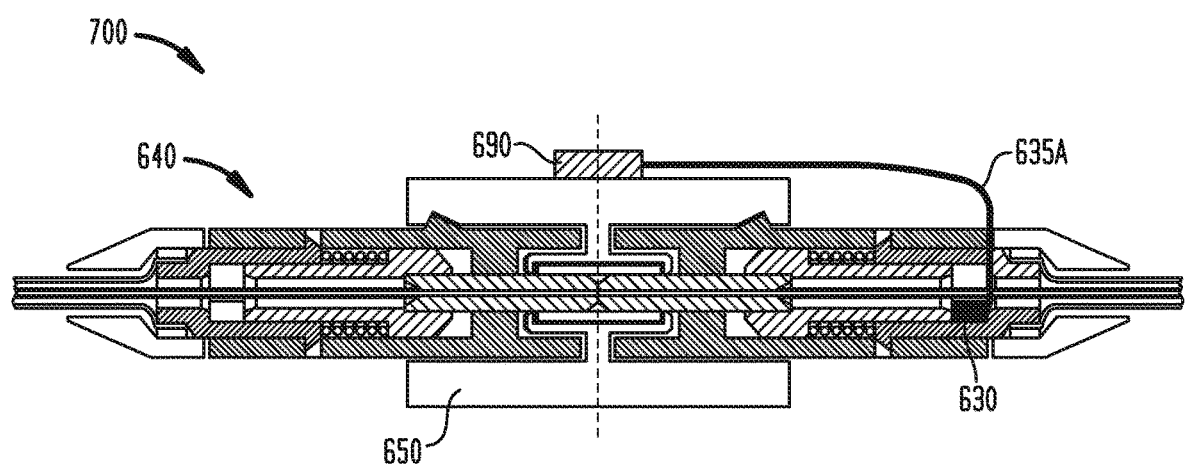
FIG. 11 is a cross-sectional side view of an optical assembly in accordance with the present technology.

As shown in FIG. 11, in an alternative arrangement to optical assembly 600, optical assembly 700 may include any signal conveying cable 635A, such as an electrical or optical cable, that may extend from sensor 630 to indicator 690. As in the example shown, indicator 690 may include a light-emitting diode (LED) display that may be attached to an exterior surface of adapter 650. In this manner, indicator 690 may illuminate upon insertion of second connector assembly 640 to a predetermined depth. As further shown, indicator 690 may further be, but is not limited to being, electrically connected, such as by a wire, to or communicate wirelessly with an external circuit as known to those of ordinary skill. In another alternative arrangement, sensor 630 similarly may communicate wirelessly with indicator 690.

Figure 12A:
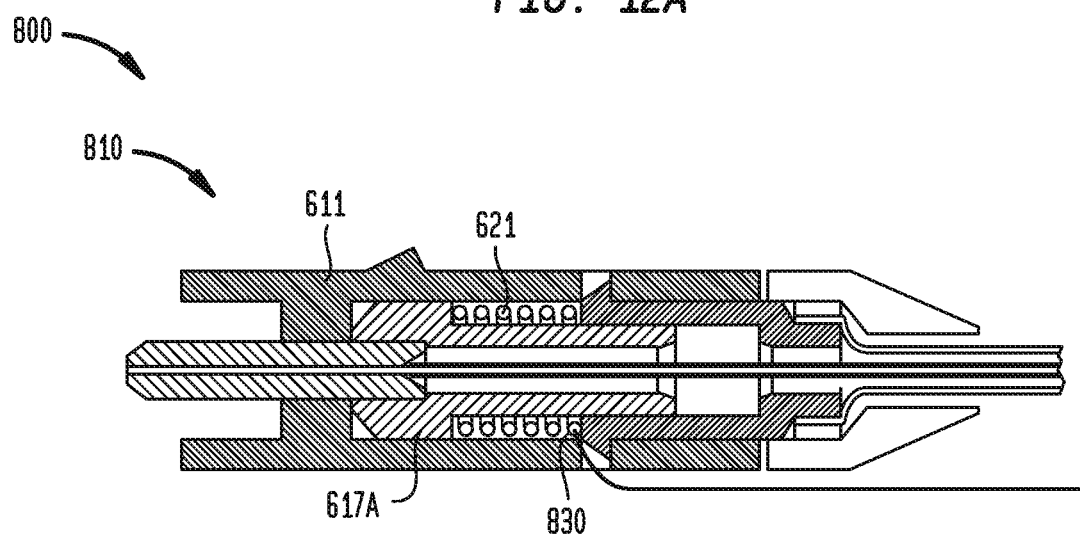
FIGS. 12A and 12B are cross-sectional side views of a connector assembly for use in an optical assembly in accordance with the present technology.
Figure 12B:
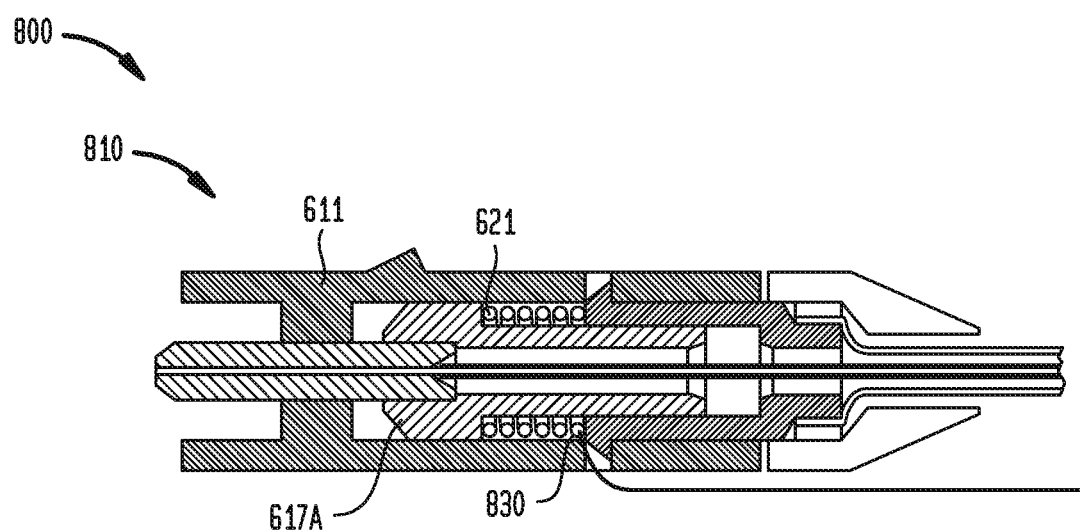

Referring now to FIGS. 12A and 12B, optical assembly 800 may be substantially similar to optical assembly 600 with the notable exception that optical assembly 800 may include first connector assembly 810 having sensor 830 in addition to or, as in the example shown, in place of sensor 630. Sensor 830 may be placed on resilient element 621. Sensor 830 may be a micro strain gage which may be placed along the surface of resilient element 621 to detect changes in distance between two points of a surface of the resilient element. In this configuration, the strain gage may be a variable resistance element in which the resistance is changed when the surface of the resilient element over which the strain gage lies expands or contracts.

In this manner, upon rearward movement or retraction of inner ferrule portion 617A within housing 611, sensor 830 may detect compression and thus movement on the surface of resilient element 621. When sensor 830 does so detect a change in distance between two points of a surface of resilient element 621 within a predetermined tolerance range, sensor 830 may generate a signal, such as but not limited to an electrical signal, that may be conveyed to a remote electronic device, such as a light panel (not shown), or generate and transmit a signal for routing to a remote signal receiver coupled to the electronic device, or in the alternative, may stop generating or transmitting a signal, such as but not limited to an electrical signal, to provide an indication that second connector assembly 640 is inserted into adapter 650 to a predetermined depth.

In arrangements utilizing a strain gage, the strain gage sensor may have variable electrical characteristics, such as resistance, capacitance, or inductance that may change when changes on the surface of the resilient element occur or stop occurring. In such arrangements, the changes in resistance, capacitance, or inductance within the sensor may be recognized by a remote receiver that receives an electrical signal corresponding to the changed electrical characteristics and conveyed from the strain gage sensor, such as over a wire or like signal-conveying means. In another alternative arrangement, sensor 830 may be a piezoelectric material (not shown) placed on or near resilient element 621 that may react to movements of resilient element 621 by transmitting a signal such as those just described with respect to a micro strain gage.

In another alternative arrangement to that shown in the example of FIGS. 12A and 12B as shown in FIG. 12C, optical assembly 800A and its first connector assembly 810A may be the same as optical assembly 800 and first connector assembly 810, respectively, with the exception that resilient element 621 of first connector assembly 810A may be a coiled spring which acts as an inductive element when a current flows through the spring between electrical wires 835A and 835B attached at opposing ends of the coiled spring. In this manner, a compression or expansion of resilient element 621 causes a change in length of the resilient element and thus a change in inductance of the resilient element which can be measured by an electronic device receiving an electrical signal corresponding to a current generated in the resilient element according to the changed inductance, in which the electrical signal is conveyed over a wire or like signal-conveying means. As shown, a magnetic core 831, which may be but is not limited to being made of iron or nickel, may extend around groove 818 of inner ferrule portion 617A of first connector assembly 810A. In this manner, a magnetic flux and thus an inductance generated by resilient element 621 and core 831 may be substantially increased over the inductance generated by the resilient element alone. In this manner, a change in length of the resilient element is easier to detect and an indication that second connector assembly 640 is inserted into adapter 650 to a predetermined depth is more reliable.

In still another alternative arrangement to that shown in the example of FIGS. 12A and 12B (not shown), electrodes, such as but not limited to conductive metal plates, may be attached to the ends of resilient element 621 to form a capacitor. In this manner, a compression or expansion of resilient element 621 causes a change in length of the resilient element and thus a change in capacitance of the capacitor which can be measured by an electronic device receiving an electrical signal corresponding to the changed capacitance, in which the electrical signal is conveyed over a wire or like signal-conveying means.

Figure 13:
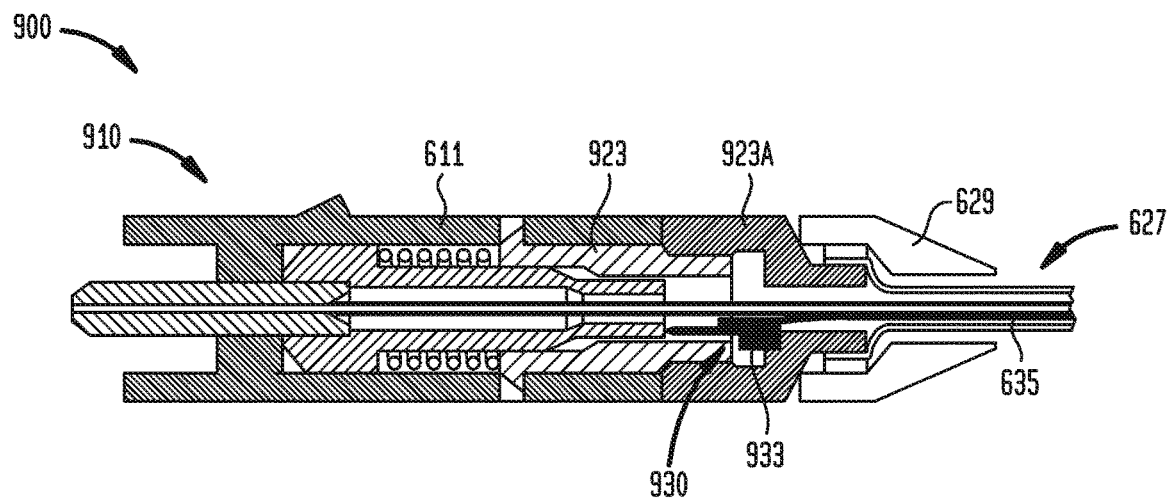
FIGS. 13 and 14 are cross-sectional side views of connector assemblies for use in respective optical assemblies in accordance with the present technology.

Referring now to FIG. 13, optical assembly 900 may be substantially similar to optical assembly 600 with the notable exception that optical assembly 900 may include an alternative arrangement of resilient element stopper 623 and, in some instances as in the example shown, may not include sensor 630. In such an arrangement, connector assembly 910 may include forward stopper 923 which may have an outer diameter at its rearward end that is the same or substantially the same as the inner diameter of rearward stopper 923A, as shown, from which forward stopper 923 and housing 611 may be detachable. Optical assembly 900 may include sensor 930 that may be mounted to rearward stopper 923A which as shown may be crimped to an assembly of buffer tubes and yarn assembly 627, crimp ring 628, and boot 629.

In this manner, connector assembly 910 may be replaced by another connector assembly, such as when the connector assembly becomes defective, while reusing sensor 930 and rearward stopper 923A.

Figure 14:
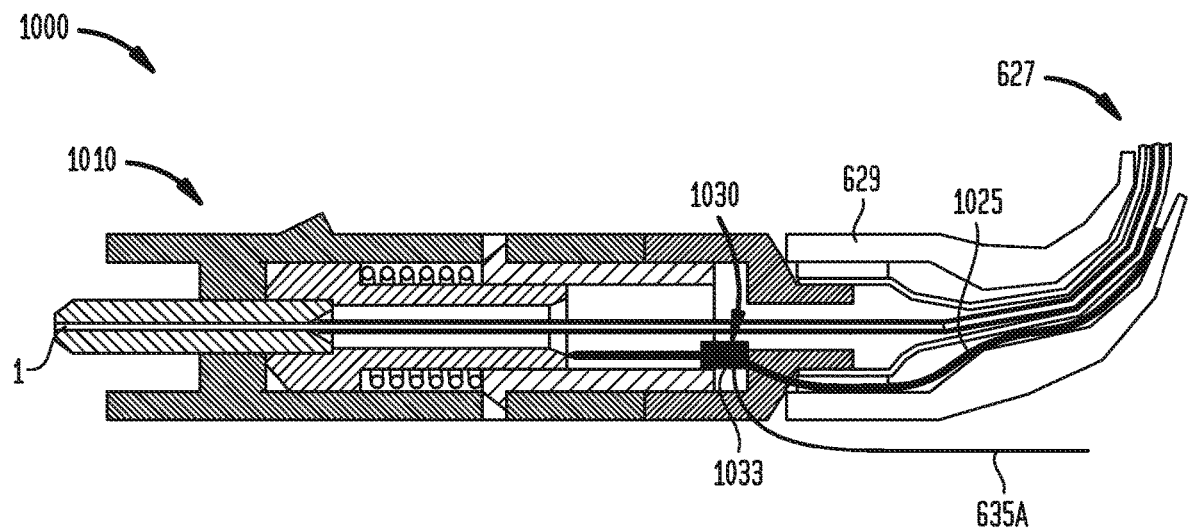

Referring to FIG. 14, optical assembly 1000 may be substantially similar to optical assembly 900 with the notable exception that optical assembly 1000 may include first connector assembly 1010 having sensor 1030 in addition to or in place of sensor 930. Instead of cable 635 extending from sensor module 933 of sensor 930 as shown in FIG. 13, sensor 1030 may include cable 635A as well as cable 1025 extending from sensor module 1033. Cable 635A may carry a signal, such as but not limited to an electrical signal, generated by sensor 1030, that may be conveyed to a remote electronic device, such as a light panel (not shown), or generated and transmitted by sensor 1030 for routing to a signal receiver coupled to the electronic device, or in the alternative, may stop carrying a signal, such as but not limited to an electrical signal, to provide an indication that a second connector assembly, such as connector assembly 640, is inserted into an adapter, such as adapter 650, to a predetermined depth.

Cable 1025 may extend through boot 629 between the boot and buffer tubes and yarn assembly 627 such that the cable runs along substantially the same path as optical fiber 1. Cable 1025 may include one or more sensors (not shown) along its length, which may be micro strain gages as known to those of ordinary skill in the art, which detect changes in length of the cable, or more precisely changes in distance between two points of a surface of the cable, which would most likely be caused by bending or deformation of the cable. In this configuration, the sensors may be a variable resistance element in which the resistance is changed when the surfaces of the cable over which the sensors lie expand or contract. In the example shown, sensor 1030 may receive an electrical signal corresponding to the changed resistance and conveyed from the micro strain gages when changes in the length of the cable occur. Sensor 1030 may be set such that when any such changes of the surface of cable 1025 equal or exceed a threshold value, the sensor may generate a signal, such as but not limited to an electrical signal, that may be conveyed to a remote electronic device, such as a light panel (not shown), or generate and transmit a signal for routing to a signal receiver coupled to the electronic device, or in the alternative, may stop generating or transmitting a signal, such as but not limited to an electrical signal, in order to alert necessary personnel that the cable, and thus likely optical fiber 1, is undesirably bent at a portion thereof, for example, to have less than a minimum bending radius. In the example of FIG. 14, as it is desired for the optical fiber to have a minimum bending radius along its length, detection by the sensor 1030 of any changes along the length of optical fiber 1 that would result in a portion of the cable having less than a minimum bending radius would generally be considered undesirable and cause an alert signal to be generated.

Figure 15:
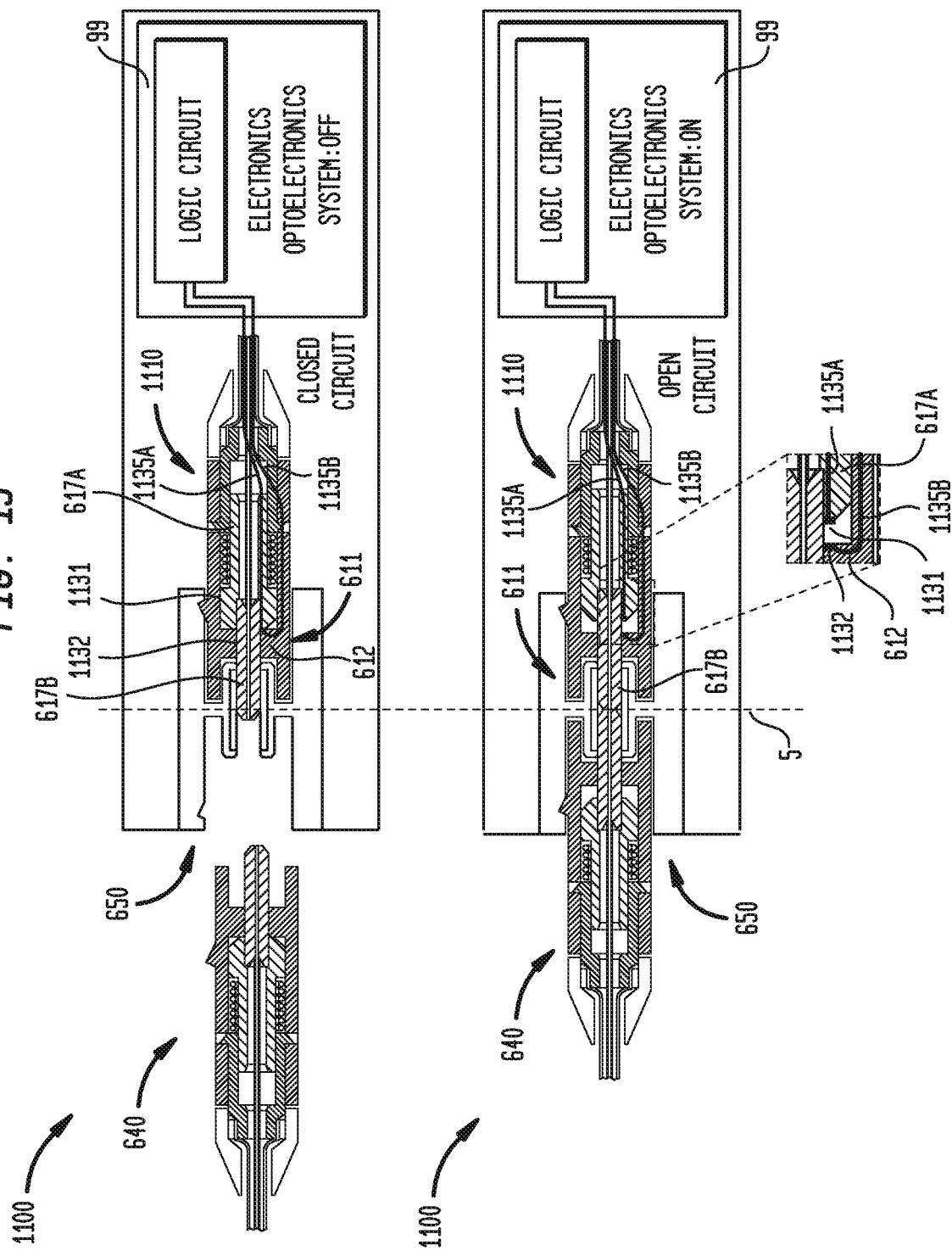
FIGS. 15 and 16 are cross-sectional side views of optical assemblies, respectively in disconnected and connected states, in accordance with the present technology.

Referring to FIG. 15, optical assembly 1100 may be substantially similar to optical assembly 600 with the notable exception that optical assembly 1100 may include first connector assembly 1110 having electrodes 1131, 1132 in addition to or, as in the example shown, in place of sensor 630 to provide an indication that second connector assembly 640 is inserted into adapter 650 due to the displacement of outer ferrule portion 617B of first connector assembly 1110 caused by engagement, in this example contact, of outer ferrule portions 617B of first and second connector assemblies 1110, 640 of optical assembly 1100. Ferrule electrode 1131 may be attached, such as but not limited to by one or more fasteners, attractable magnetic elements, or a chemical adhesive which may be but is not limited to being an epoxy, to a forward end of inner ferrule portion 617A and may be electrically connected to logic circuit 99 by cable 1135A, which may be but is not limited to being a copper wire. Housing electrode 1132 may be attached, such as by one or more fasteners, attractable magnetic elements, or a chemical adhesive which may be but is not limited to being an epoxy, to a rearward-facing side of partition 612 of housing 611 and may be electrically connected to logic circuit 99 by cable 1135B, which may be but is not limited to being a copper wire.

In this manner, when second connector assembly 640 is not inserted into adapter 650 as in the top portion of FIG. 15, the forward end of inner ferrule portion 617A may be in its forward most position against partition 612 of housing 611. In this manner, ferrule electrode 1131 and housing electrode 1132 may be in contact such that a closed circuit is formed by logic circuit 99, cable 1135A, ferrule electrode 1131, housing electrode 1132, and cable 1135B. In contrast, when second connector assembly 640 is inserted into adapter 650 as in the bottom portion of FIG. 15, the forward end of inner ferrule portion 617A may be set away from partition 612 of housing 611. In this manner, ferrule electrode 1131 and housing electrode 1132 may not be in contact such that the normally closed circuit formed by logic circuit 99, cable 1135A, ferrule electrode 1131, housing electrode 1132, and cable 1135B is open. In such a configuration, logic circuit 99 may control a connected electronics or optoelectronics system to be powered off when the circuit is closed and the connected electronics or optoelectronics system to be powered on when the circuit is open. In this manner, light emission through first connector assembly 1110 may be stopped, preventing injury and saving energy. In alternative arrangements, a logic circuit such as logic circuit 99 may not be needed, and cable 1135A, ferrule electrode 1131, housing electrode 1132, and cable 1135B may form part of another circuit that may be open or closed based on the contact between ferrule electrode 1131 and housing electrode 1132.

Figure 16:
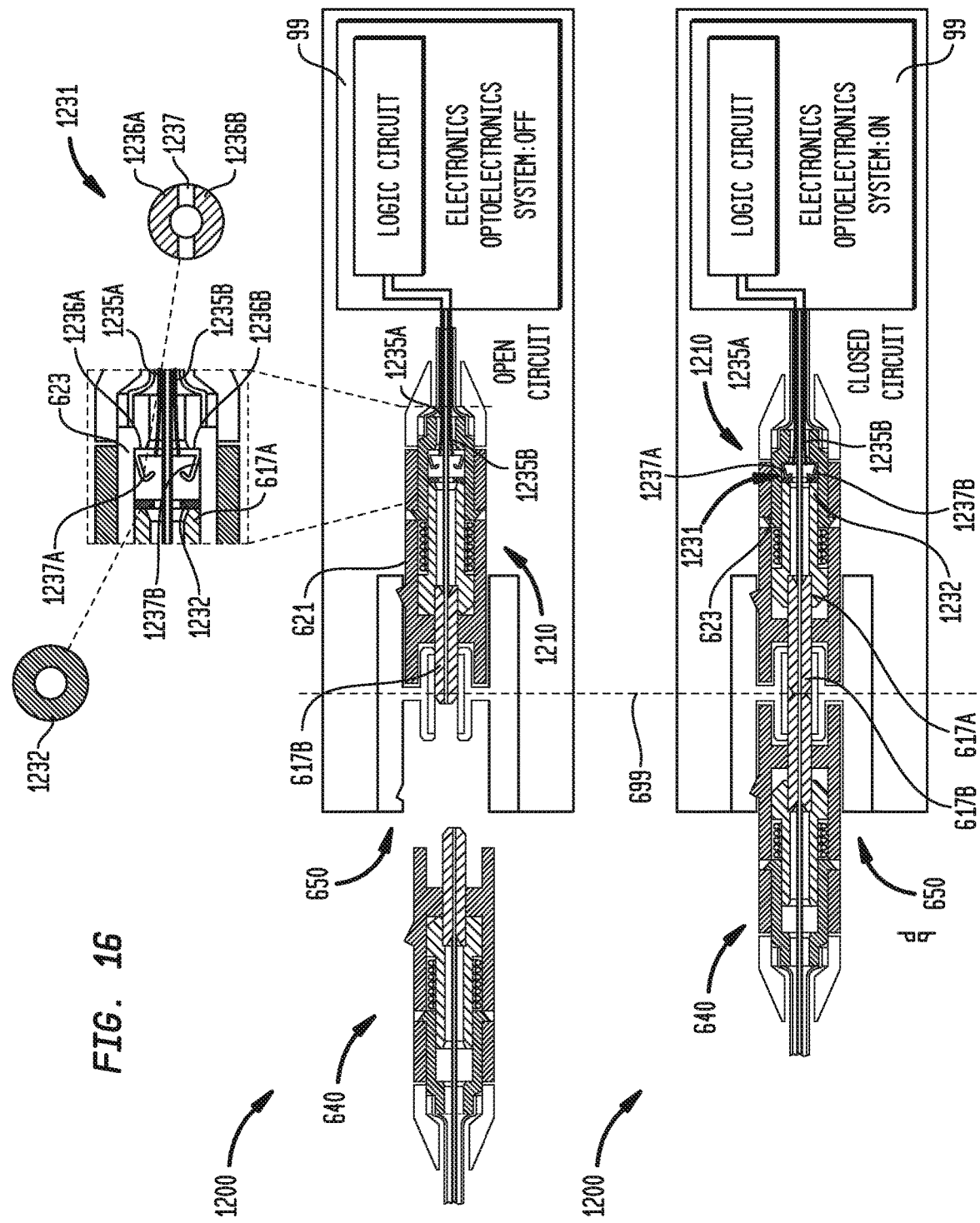

As shown in FIG. 16, optical assembly 1200 may be substantially similar to optical assembly 1100 with the notable exception that optical assembly 1200 may include first connector assembly 1210 having electrodes 1231, 1232 in addition to or, as in the example shown, in place of electrodes 1131, 1132 to provide an indication that second connector assembly 640 is inserted into adapter 650 to a predetermined depth due to the displacement of outer ferrule portion 617B of first connector assembly 1210 caused by engagement of outer ferrule portions 617B of first and second connector assemblies 1210, 640 of optical assembly 1200. Stopper electrode 1231 may be attached, such as but not limited to by one or more fasteners, attractable magnetic elements, or a chemical adhesive which may be but is not limited to being an epoxy, to a forward-facing interior step of resilient stopper element 623. Stopper electrode 1231 may include insulation element 1237 as well as conductive upper base 1236A and conductive lower base 1236B attached to opposite sides of the insulation element. Insulation element 1237 may be made of an insulated or dielectric material, such as but not limited to a plastic or rubber material. In this manner, upper base 1236A and lower base 1236B may not be electrically connected. Upper base 1236A may be electrically connected to logic circuit 99 by cable 1235A and lower base 1236B may be electrically connected to logic circuit 99 by cable 1235B, in which each of the cables may be but are not limited to being a copper wire.

As further shown, upper base 1236A and lower base 1236B may be attached to respective upper and lower prongs 1237A, 1237B extending in a forward direction towards inner ferrule portion 617A. In this manner, upper and lower prongs 1237A, 1237B may allow stopper electrode 1231 to have a lengthwise reach to contact other electrodes, including ferrule electrode 1232 as in the arrangement shown.

Ferrule electrode 1232 may be attached, such as but not limited to by one or more fasteners, attractable magnetic elements, or a chemical adhesive which may be but is not limited to being an epoxy, to a rearward-facing side of inner ferrule portion 617A. As shown, ferrule electrode 1232 may be but is not limited to being in the form of an annulus such that the ferrule electrode contacts the entire circumference of the rearward-facing side of inner ferrule portion 617A.

When second connector assembly 640 is inserted into adapter 650 as in the bottom portion of FIG. 16, ferrule electrode 1232 attached to the rearward end of inner ferrule portion 617A may be placed in contact with upper and lower prongs 1237A, 1237B of stopper electrode 1231 attached to the forward-facing interior step of resilient stopper element 623. In this manner, a closed circuit is formed by logic circuit 99, cable 1235A, stopper electrode 1231, ferrule electrode 1232, and cable 1235B. Due to the length of prongs 1237A, 1237B, it is unnecessary for inner ferrule portion 617A to travel rearward all the way to and thus contact upper and lower bases 1236A, 1236B adjacent to the forward-facing interior step of resilient stopper element 623 in order for electrodes 1231, 1232 to be electrically connected with stopper electrode 1231.

In operation, when second connector assembly 640 is fully inserted into adapter 650, outer ferrule portions 617B of first and second connector assemblies 1210, 640 may be in contact at a relative position (designated by broken line 699) within adapter 650 that may differ depending on the lengths and relative positions of the outer ferrule positions and the inner ferrule portions 617A as well as on the relative forces being supplied by resilient elements 621 of the first and second connector assemblies. Accordingly, as in the example shown, upper and lower prongs 1237A, 1237B may be flexible inwardly such that inner ferrule portion 617A and thus ferrule electrode 1232 may travel further rearward even after an initial electrical coupling between ferrule electrode 1232 and stopper electrode 1231. In this manner, inner ferrule portion 617A, outer ferrule portion 617B, and resilient element 621 of second connector assembly 640 may be sized differently part-to-part but still cause an electrical coupling between stopper electrode 1231 and ferrule electrode 1232 upon insertion of second connector assembly 640 into adapter 650. In one example, when second connector assembly 640 is inserted into adapter 650, the circuit formed by logic circuit 99, cable 1235A, stopper electrode 1231, ferrule electrode 1232, and cable 1235B may be closed as long as inner and outer ferrule portions 617A, 617B of first connector assembly 1210 travel rearward a minimum of 0.25 mm.

Further, upper and lower prongs 1237A, 1237B may cantilever relative to bases 1236A, 1236B to provide a spring action such that inner and outer ferrule portions 617A, 617B may travel rearward a greater distance than 0.25 mm, e.g. 1.0 mm or more, while the circuit formed by logic circuit 99, cable 1235A, stopper electrode 1231, ferrule electrode 1232, and cable 1235B remains closed. In addition to, or as an alternative to, upper and lower prongs 1237A, 1237B, a coiled or leaf spring may be attached to or may be ferrule electrode 1232, such as in the example described in FIG. 17 below, to provide for conductive coupling to be maintained between the stopper and ferrule electrodes at various distances of rearward travel of the inner and outer ferrule portions of the second connector assembly.

In contrast, when second connector assembly 640 is not inserted into adapter 650 as in the top portion of FIG. 16, ferrule electrode 1232 being attached to the rearward end of inner ferrule portion 617A may be in its forward most position furthest away from stopper electrode 1231. In this manner, stopper electrode 1231 and ferrule electrode 1232 may not be in contact such that the normally closed circuit formed by logic circuit 99, cable 1235A, stopper electrode 1231, ferrule electrode 1232, and cable 1235B is open. In such a configuration, logic circuit 99 may control a connected electronics or optoelectronics system to be powered on when the circuit is closed and the connected electronics or optoelectronics system to be powered off when the circuit is open. In this manner, light emission through first connector assembly 1210 may be stopped, preventing injury and saving energy. In alternative arrangements, a logic circuit such as logic circuit 99 may not be needed, and cable 1235A, stopper electrode 1231, ferrule electrode 1232, and cable 1235B may form part of another circuit that may be open or closed based on the contact between stopper electrode 1231 and ferrule electrode 1232.

Figure 17:
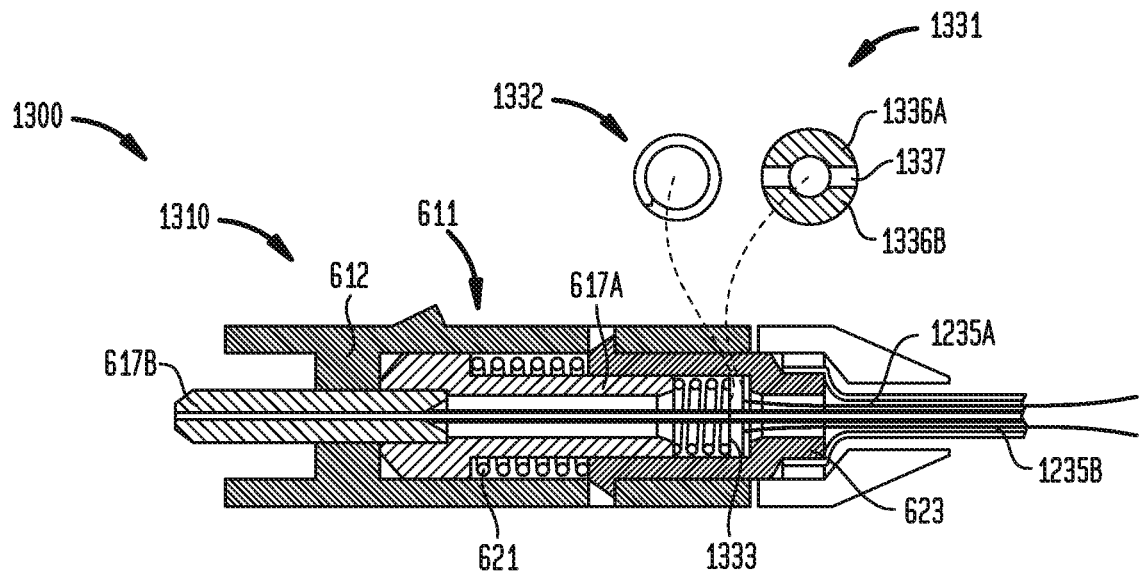
FIG. 17 is a cross-sectional side view of a connector assembly for use in an optical assembly in accordance with the present technology.

Referring now to FIG. 17, optical assembly 1300 may be substantially similar to optical assembly 1200 with the notable exception that optical assembly 1300 may include first connector assembly 1310 having electrodes 1331, 1332 in place of electrodes 1231, 1232 to provide an indication that second connector assembly 640 is inserted into adapter 650 to a predetermined depth. Stopper electrode 1331 may be attached to the forward-facing interior step of resilient stopper element 623 in the same manner as stopper electrode 1231. As shown, stopper electrode 1331 may be but is not limited to being in the form of an annulus such that the stopper electrode contacts the entire circumference of the forward-facing interior step of resilient stopper element 623.

Stopper electrode 1331 may include insulation element 1337 as well as upper base 1336A and lower base 1336B attached to opposite sides of the insulation element. Insulation element 1337 may be the same or very similar to insulation element 1237 of stopper electrode 1231. In this manner, upper base 1336A and lower base 1336B may not be electrically connected to each other. Upper base 1336A may be electrically connected to logic circuit 99 by cable 1235A and lower base 1336B may be electrically connected to logic circuit 99 by cable 1235B.

Ferrule electrode 1332 may be in the form of a coiled spring. Ferrule electrode 1332 may be attached, such as but not limited to by one or more fasteners, attractable magnetic elements, or a chemical adhesive which may be but is not limited to being an epoxy, to a rearward-facing side of inner ferrule portion 617A. As shown, ferrule electrode 1332 may be but is not limited to being substantially in the form of an annulus such that a forward end of the ferrule electrode contacts substantially the entire circumference of the rearward-facing side of inner ferrule portion 617A. A rearward end 1333 of ferrule electrode 1332 may be substantially flat such that the rearward end may simultaneously contact both upper base 1336A and lower base 1336B of stopper electrode 1331 when second connector assembly 640 is inserted into adapter 650 a predetermined depth.

In this manner, a closed circuit is formed by a logic circuit such as logic circuit 99 previously described herein, cable 1235A, stopper electrode 1331, ferrule electrode 1332, and cable 1235B. Due to the compressibility of ferrule electrode 1332, the ferrule electrode may provide for conductive coupling to be maintained between stopper electrode 1331 and ferrule electrode 1332 at various distances of rearward travel of inner and outer ferrule portions 617A, 617B of second connector assembly 1310.

In contrast, when second connector assembly 640 is not inserted into adapter 650, ferrule electrode 1332 may be in its forward most position furthest away from stopper electrode 1331. In this manner, stopper electrode 1331 and ferrule electrode 1332 may not be in contact such that the normally closed circuit formed by the logic circuit, cable 1235A, stopper electrode 1331, ferrule electrode 1332, and cable 1235B is open. In such a configuration, the logic circuit may control a connected electronics or optoelectronics system to be powered on when the circuit is closed and the connected electronics or optoelectronics system to be powered off when the circuit is open. In alternative arrangements, a logic circuit may not be needed, and cable 1235A, stopper electrode 1331, ferrule electrode 1332, and cable 1235B may form part of another circuit that may be open or closed based on the contact between stopper electrode 1331 and ferrule electrode 1332.

Figure 18:
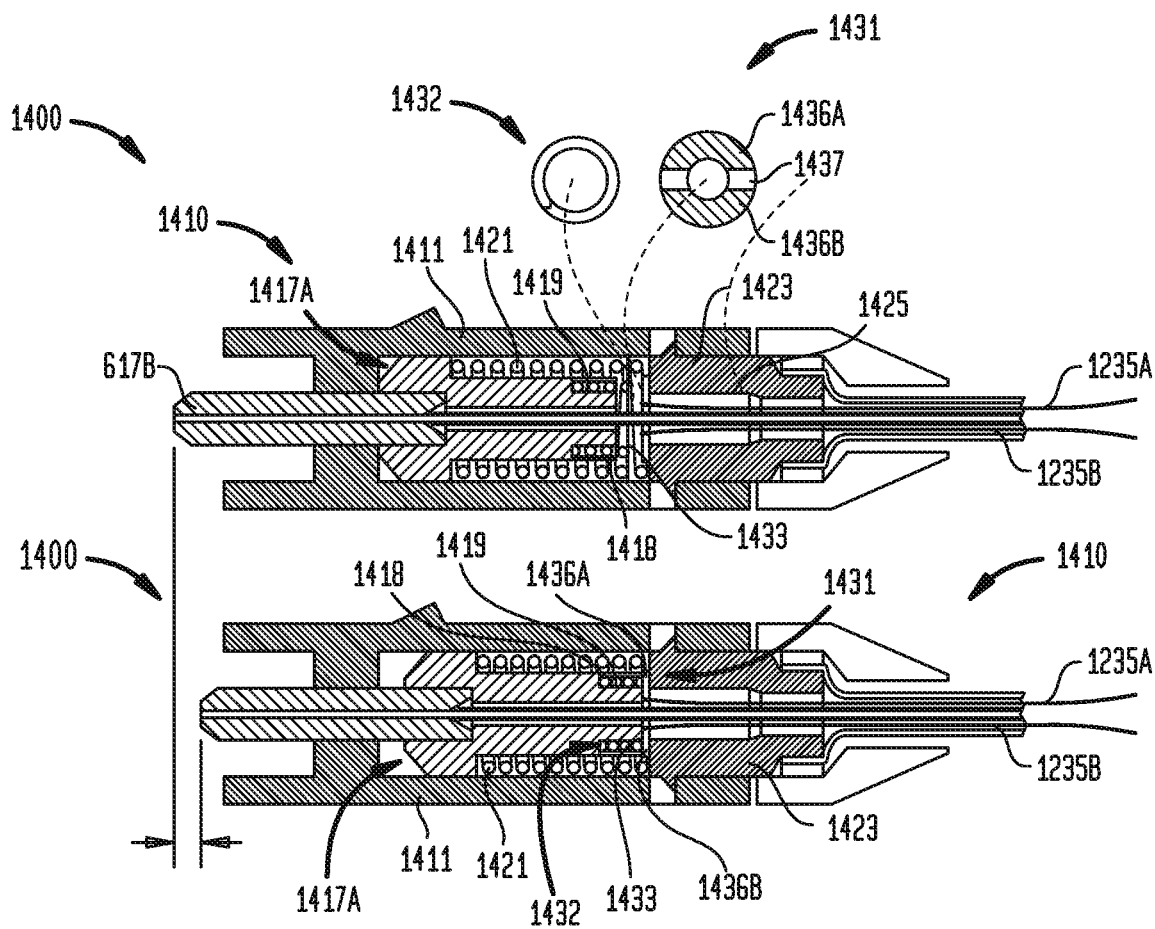
FIG. 18 shows cross-sectional side views of a connector assembly, respectively in disconnected and connected states, for use in an optical assembly in accordance with the present technology.

Referring to FIG. 18, optical assembly 1400 may be substantially similar to optical assembly 1300 with the notable exception that optical assembly 1400 may include first connector assembly 1410 having electrodes 1431, 1432 in place of electrodes 1331, 1332 to provide an indication that second connector assembly 640 is inserted into adapter 650 to a predetermined depth. Additionally, optical assembly 1400 may include inner ferrule assembly 1417A, resilient element 1421, and resilient stopper element 1423 in place of inner ferrule assembly 617A, resilient element 621, and resilient stopper element 623.

Inner ferrule assembly 1417A may include tube 1418 which may extend around groove 1419 defined by the rearward end of inner ferrule assembly 1417A. Tube 1418 may be made of an insulated material such as a plastic. Unlike resilient element 621 of first connector assembly 610, resilient element 1421 may extend beyond the rearward end of inner ferrule assembly 1417A while still abutting against a forward end of resilient stopper element 1423. Resilient stopper element 1423 may have a narrower stopper bore 1425 than stopper element 623 of first connector assembly 610 such that resilient element 1421 does not extend into stopper bore 1425.

In this manner, stopper electrode 1431 may be attached to the forward end of resilient stopper element 1423. As shown, stopper electrode 1431 may be but is not limited to being in the form of an annulus such that the stopper electrode contacts the entire circumference of the forward end of resilient stopper element 1423.

Stopper electrode 1431 may include insulation element 1437 as well as conductive upper base 1436A and conductive lower base 1436B attached to opposite sides of the insulation element. In this manner, upper base 1436A and lower base 1436B may not be electrically connected to each other. Upper base 1436A may be electrically connected to logic circuit 99 by cable 1235A and lower base 1436B may be electrically connected to logic circuit 99 by cable 1235B.

Ferrule electrode 1432 may be in the form of a coiled spring. Ferrule electrode 1432 may be attached, such as but not limited to by one or more fasteners, attractable magnetic elements, or a chemical adhesive which may be but is not limited to being an epoxy, to a rearward-facing step of inner ferrule portion 617A formed along groove 1419 and may extend around the rearward end of the inner ferrule portion.

As such, ferrule electrode 1432 may be positioned within tube 1418 which may separate the ferrule electrode from resilient element 1421.

As shown, ferrule electrode 1432 may be but is not limited to being substantially in the form of an annulus such that a forward end of the ferrule electrode contacts substantially the entire circumference of the rearward-facing step of inner ferrule portion 1417A. A rearward end 1433 of ferrule electrode 1432 may be substantially flat such that the rearward end may simultaneously contact both upper base 1436A and lower base 1436B of stopper electrode 1431 when second connector assembly 640 is inserted into adapter 650 a predetermined depth.

In this manner, a closed circuit is formed by a logic circuit such as logic circuit 99 previously described herein, cable 1235A, stopper electrode 1431, ferrule electrode 1432, and cable 1235B. Due to the compressibility of ferrule electrode 1432, the ferrule electrode may provide for conductive coupling to be maintained between stopper electrode 1431 and ferrule electrode 1432 at various distances of rearward travel of inner and outer ferrule portions 1417A, 617B of second connector assembly 1410. In contrast, when second connector assembly 640 is not inserted into adapter 650, ferrule electrode 1432 may be in its forward most position furthest away from stopper electrode 1431. In this manner, stopper electrode 1431 and ferrule electrode 1432 may not be in contact such that the normally closed circuit formed by the logic circuit, cable 1235A, stopper electrode 1431, ferrule electrode 1432, and cable 1235B is open. In such a configuration, the logic circuit may control a connected electronics or optoelectronics system to be powered on when the circuit is closed and the connected electronics or optoelectronics system to be powered off when the circuit is open. In alternative arrangements, a logic circuit may not be needed, and cable 1235A, stopper electrode 1431, ferrule electrode 1432, and cable 1235B may form part of another circuit that may be open or closed based on the contact between stopper electrode 1431 and ferrule electrode 1432.

Figure 19:
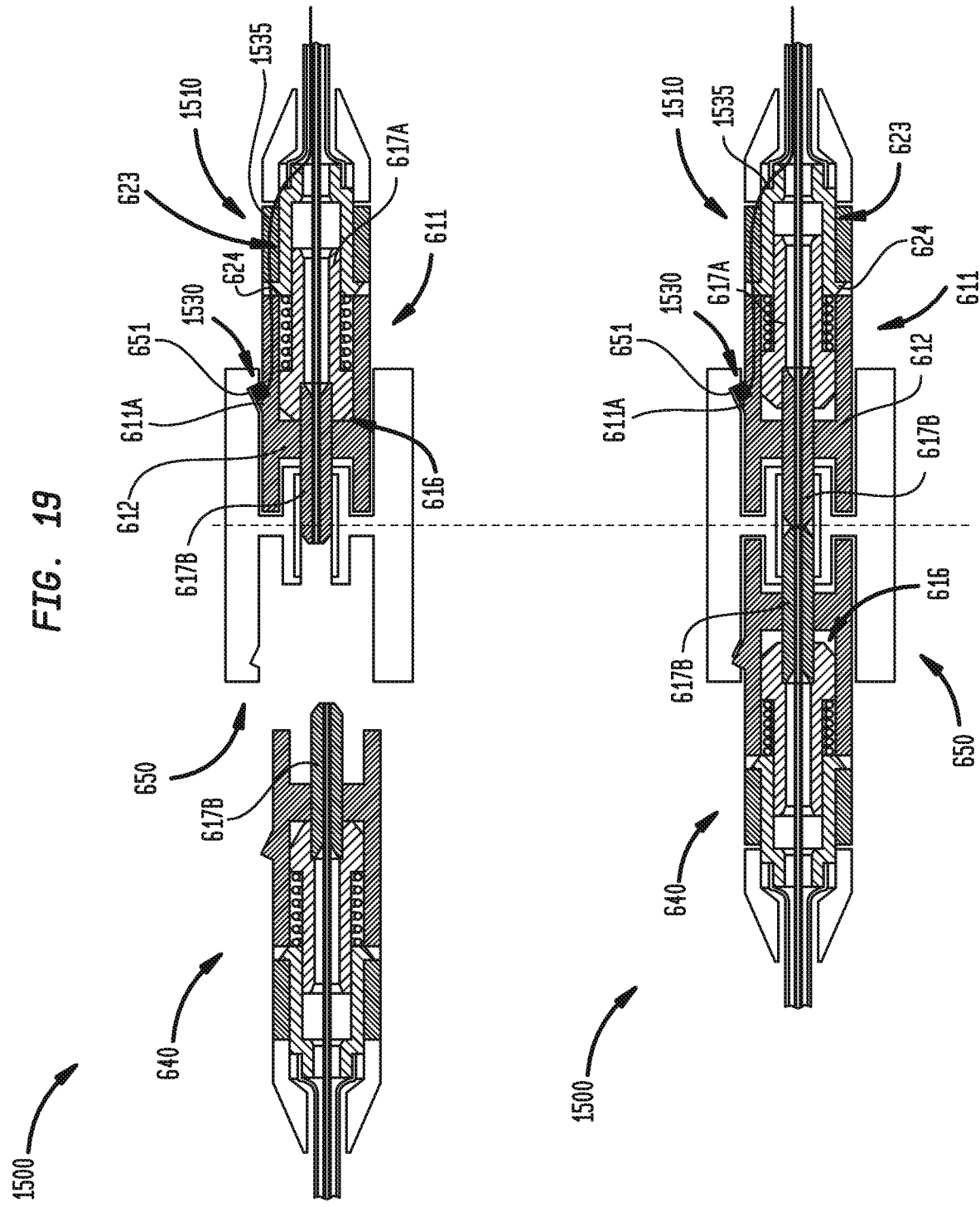
FIGS. 19 and 20 are cross-sectional side views of optical assemblies, respectively in disconnected and connected states, in accordance with the present technology.

Referring to FIG. 19, optical assembly 1500 may be substantially similar to optical assembly 600 with the notable exception that optical assembly 1500 may include first connector assembly 1510 having sensor 1530 in addition to or, as in the example shown, in place of sensor 630 to provide an indication that second connector assembly 640 is inserted into adapter 650 due to the displacement of outer ferrule portion 617B of the first connector assembly caused by engagement of outer ferrule portions 617B of the first and second connector assemblies of the optical assembly. Sensor 1530 may be attached, such as but not limited to by one or more fasteners, attractable magnetic elements, or a chemical adhesive such as but not limited to an epoxy, to a rearward side of projection 611A of housing 611 and may be electrically connected to a logic circuit, such as logic circuit 99, by cable 1535, which may be but is not limited to being a copper wire. Projection 611A may be configured, such as in the form of a triangular prism as shown, to extend into and fit within notch 651 of adapter 650. In this manner, connector assembly 1510 may be attached to adapter 650 such that the rearward side of projection 611A may rest against a forward-facing side of notch 651 to resist pullout of the connector assembly from the adapter.

Sensor 1530 may be the same as or substantially similar to sensor 630 in that sensor 1530 may be, but is not limited to being, a force sensor or a displacement sensor. As a force sensor, sensor 1530 may include a deflectable diaphragm or other known force-sensing means. Like sensor 630, sensor 1530 may include a probe (not shown) which may be extendable from a sensor module of the sensor in a rest position of the sensor and which may be retractable such that the probe retracts from the rest position to a retracted position in which at least a portion of the probe not received in the sensor module in the rest position is received in the sensor module. In the rest position, the sensor (and for a sensor having the probe, the probe of the sensor) may contact or be spaced from the forward-facing side of notch 651 of adapter 650. In other arrangements, again like sensor 630, a micro strain gage may be affixed to a resilient element attached to the probe of a sensor having the probe and may be within the sensor module of the sensor such that the strain gage may detect deformation of the surface of the resilient element during extension and retraction of the probe.

When second connector assembly 640 is not inserted into adapter 650 as in the top portion of FIG. 19, as in the arrangement of optical assembly 600, a forward end of inner ferrule portion 617A may be in its forward most position against partition 612 of housing 611. When second connector assembly 640 is fully inserted into adapter 650 of optical assembly 1500 such that fiber and ferrule assemblies 616 are at a rest position, the forward ends of outer ferrule portions 617B of first and second connector assemblies 1510, 640 may push against each other such that their opposing fiber and ferrule assemblies 616 remain in contact but tend towards rearward directions away from each other. As such, the rear end of fiber and ferrule assembly 616 of first connector assembly 610 may be pushed rearwards such that housing 611 is pushed rearwards by forward flanges 624 of stopper 623. In this manner, sensor 1530 (and for a sensor having the probe, the probe of the sensor) may be pressed against forward-facing side of notch 651 of adapter 650. When sensor 1530 is so pressed by a force within a predetermined tolerance range, sensor 1530 may operate in the same manner as any of the arrangements of sensor 630 to generate or stop generating a signal along cable 1535 providing an indication that second connector assembly 640 has applied sufficient force against first connector assembly 1510 such that the second connector assembly is inserted into adapter 650 to a predetermined depth. When second connector assembly 640 is not at the predetermined depth, light emission through first connector assembly 1510 may be stopped, preventing injury and saving energy.

In an alternative arrangement of optical assembly 1500, sensor 1530 may be attached to the rearward side of the projection of the housing of the second connector assembly instead of the rearward side of projection 611A of first connector assembly 1510. In this manner, sensor 1530 may operate in the same manner as any of the arrangements of sensor 630 to generate or stop generating a signal along cable 1535 providing an indication that the second connector assembly has applied sufficient force against first connector assembly 1510 such that the second connector assembly is inserted into adapter 650 to a predetermined depth.

Figure 20:
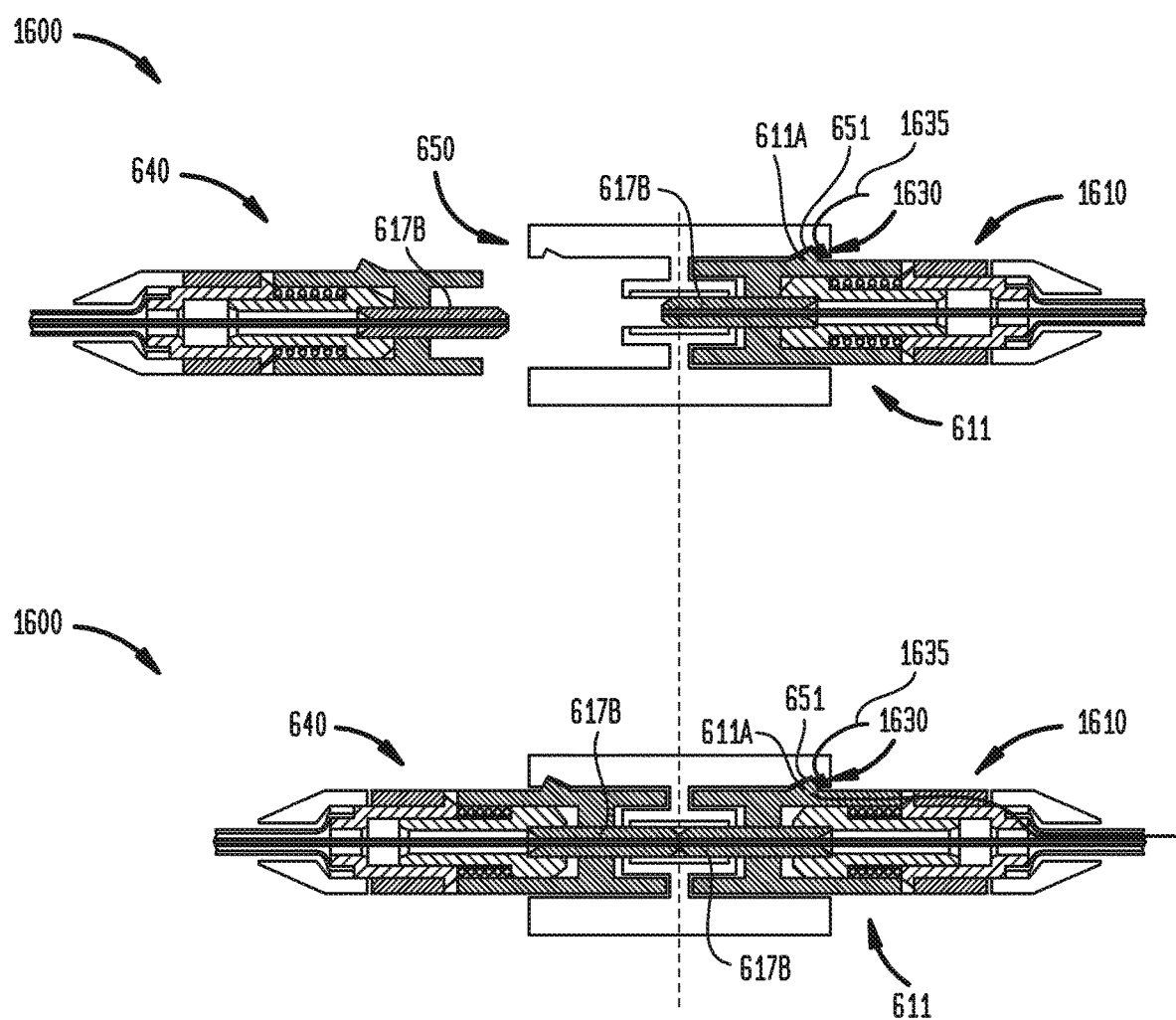

As shown in FIG. 20, optical assembly 1600 may be substantially similar to optical assembly 1500 with the notable exceptions that optical assembly 1600 may include first connector assembly 1610 without sensor 1530 and further include sensor 1630 attached to adapter 650 of the optical assembly to provide an indication that second connector assembly 640 is inserted into adapter 650 due to the displacement of outer ferrule portion 617B of the first connector assembly caused by engagement of outer ferrule portions 617B of the first and second connector assemblies of the optical assembly. Sensor 1630 may be the same as or substantially similar to sensor 1530. Sensor 1630 may be attached, such as but not limited to by one or more fasteners, attractable magnetic elements, or a chemical adhesive such as but not limited to an epoxy, to the forward-facing side of notch 651 of adapter 650 such that the force-sensing means of the sensor faces toward the rearward side of projection 611A of housing 611. In this manner, in a rest position, sensor 1630 may contact or be spaced from the rearward side of projection 611A.

When housing 611 is pushed rearwards due to insertion of second connector assembly 640 into adapter 650 of optical assembly 1600, the rearward side of projection 611A may be pressed against sensor 1630. Sensor 1630 may be electrically connected to a logic circuit, such as logic circuit 99, by cable 1635, which may be but is not limited to being a copper wire. In this manner, when sensor 1630 is pressed by a force within a predetermined tolerance range, sensor 1630 may operate in the same manner as any of the arrangements of either of sensors 630, 1530 to generate or stop generating a signal along cable 1635 providing an indication that second connector assembly 640 has applied sufficient force against first connector assembly 1610 such that the second connector assembly is inserted into adapter 650 to a predetermined depth. When second connector assembly 640 is not at the predetermined depth, light emission through first connector assembly 1610 may be stopped, preventing injury and saving energy.

In an alternative arrangement of optical assembly 1600, sensor 1630 may be attached to the forward-facing side of the notch on a side of the adapter that receives second connector assembly 640 instead of the forward-facing side of notch 651 of adapter 650 that receives first connector assembly 1610. In this manner, sensor 1630 may operate in the same manner as any of the arrangements of sensor 630 to generate or stop generating a signal along cable 1635 providing an indication that second connector assembly 640 has applied sufficient force against first connector assembly 1610 such that the second connector assembly is inserted into the adapter to a predetermined depth.

In another alternative arrangement of optical assembly 1600 in which the sensor has a probe extendable from a sensor module, the sensor module may be attached to an outside of adapter 650 (not shown), such as but not limited to on an end of the adapter, in which the probe is extendable through a hole formed through the adapter. In this manner, the probe of the sensor may be pressed by projection 611A of housing 611 such that the sensor operates in the same manner as any of the arrangements of sensors 630, 1530, 1630 having a probe.

Figure 21:
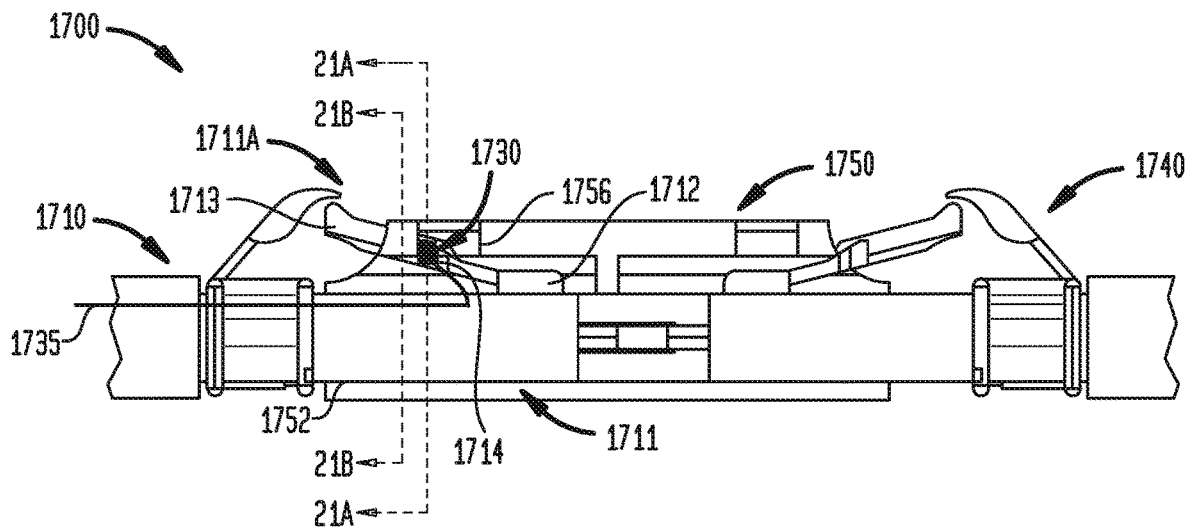
FIG. 21 is a cross-sectional side view of an optical assembly in a disconnected state in accordance with the present technology.
Figure 21A:
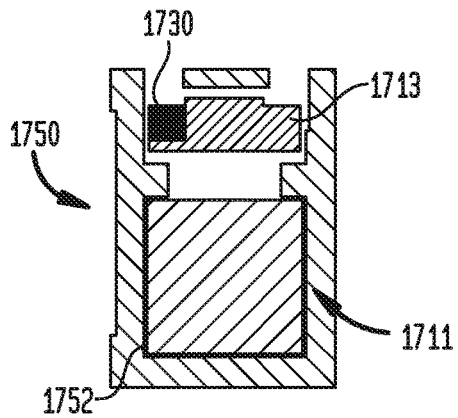
FIGS. 21A and 21B are cross-sectional rearward views of the optical assembly shown in FIG. 21 along lines 21A-21A and 21B-21B in FIG. 21.
Figure 21B:
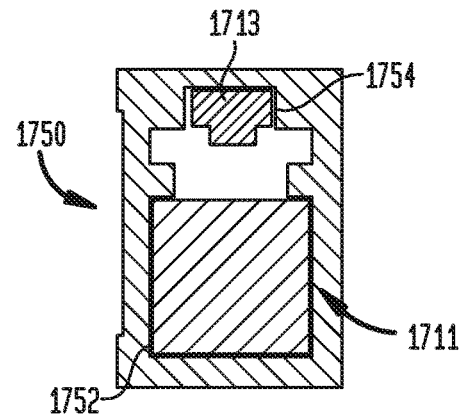

Referring to FIGS. 21, 21A, and 21B, optical assembly 1700 may include adapter 1750 as well as first LC connector assembly 1710 and second LC connector assembly 1740 which may be engageable, such as by contact, with each other by way of their insertion into the adapter and abutment to each other in substantially the same manner that first and second connector assemblies 1510, 640 of optical assembly 1500 may abut to each other. Adapter 1750 may define main aperture 1752 and slot 1754 extending from a top of the main aperture and may further define hole 1756 extending through the slot and intersecting the main aperture from the top of the adapter. In some alternative arrangements, hole 1756 may be a cavity extending only partially through slot 1754. Both first and second LC connector assemblies 1710, 1740 may include housing 1711 and lever 1711A extending from the housing. As shown, lever 1711A may be integrated with housing 1711 such that the lever is inseparable from the housing without fracturing the housing. Lever 1711A may include first shaft portion 1712 and second shaft portion 1713 in which the first shaft portion attaches the second shaft portion to the rest of the lever. First shaft portion 1712 may be wider than second shaft portion 1713. In this manner, first and second shaft portions 1712, 1713 may slide or otherwise move within main aperture 1752 of adapter 1750 but only shaft portion 1713 may slide or otherwise move within slot 1754.

First LC connector assembly 1710 may include sensor 1730 which may be the same as or substantially similar to sensor 1530 to provide an indication that second LC connector assembly 1740 is fully inserted into adapter 1750. Sensor 1730 may be attached, such as but not limited to by one or more fasteners, attractable magnetic elements, or a chemical adhesive such as but not limited to an epoxy, to step 1714 defined by an intersection of first and second shaft portions 1712, 1713 of lever 1711A such that the probe of the sensor faces toward a rearward portion of hole 1756 of adapter 1750. In this manner, in a rest position, the sensor 1730 may contact or be spaced from the rearward portion of hole 1756.

When housing 1711 is pushed rearwards due to insertion of second LC connector assembly 1740 into adapter 1750 of optical assembly 1700, sensor 1730 may be pressed against the rearward portion of hole 1756. Sensor 1730 may be electrically connected to a logic circuit, such as logic circuit 99, by cable 1735, which may be but is not limited to being a copper wire. In this manner, when sensor 1730 is pressed by a force within a predetermined tolerance range, sensor 1730 may operate in the same manner as any of the arrangements of sensors 630, 1530, 1630 to generate or stop generating a signal along cable 1735 providing an indication that second LC connector assembly 1740 has applied sufficient force against first connector assembly 1710 such that the second connector assembly is inserted into adapter 1750 to a predetermined depth. When second LC connector assembly 1740 is not at the predetermined depth, light emission through first LC connector assembly 1710 may be stopped, preventing injury and saving energy.

Figure 22:
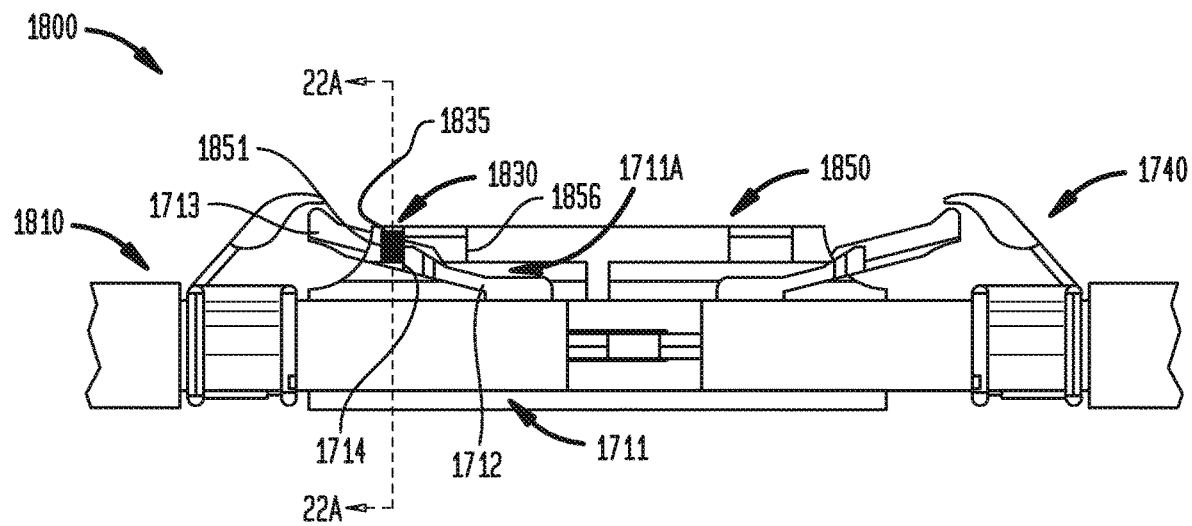
FIG. 22 is a cross-sectional side view of an optical assembly in a disconnected state in accordance with the present technology.
Figure 22A:
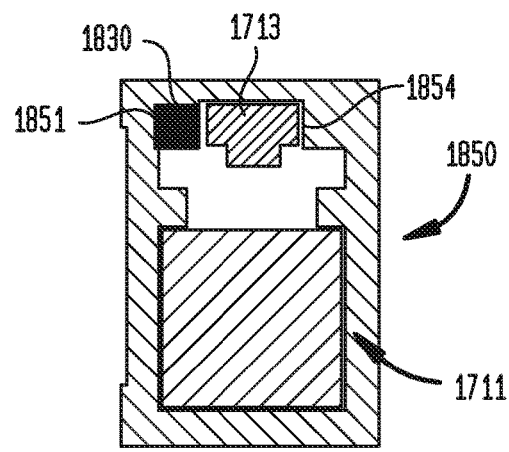
FIG. 22A is a cross-sectional rearward view of the optical assembly shown in FIG. 22 along lines 22A-22A in FIG. 22.

Referring to FIGS. 22 and 22A, optical assembly 1800 may be substantially similar to optical assembly 1700 with the notable exceptions that optical assembly 1800 may include first LC connector assembly 1810 without sensor 1730 and may further include sensor 1830 attached to adapter 1850 of the optical assembly to provide an indication that second LC connector assembly 1740 is inserted into adapter 1850. Adapter 1850 may be substantially the same as adapter 1750 with the exception that the adapter may define notch 1851 extending in a rearward direction, as best shown in FIG. 22, from hole 1856 which is substantially the same as hole 1756 of adapter 1750 and in a lateral direction from slot 1854, as best shown in FIG. 22A. Sensor 1830 may be the same as or substantially similar to sensor 1730. Sensor 1830 may be attached, such as but not limited to by one or more fasteners, attractable magnetic elements, or a chemical adhesive such as but not limited to an epoxy, to adapter 1850 within and to notch 1851 of the adapter such that the force-sensing means of the sensor is at or within hole 1856 of the adapter and faces in a forward direction. In this manner, in a rest position, sensor 1830 may contact or be spaced from step 1714 defined by the intersection of first and second shaft portions 1712, 1713 of lever 1711A.

When housing 1711 is pushed rearwards due to insertion of second LC connector assembly 1740 into adapter 1850 of optical assembly 1800, step 1714 may be pressed against sensor 1830. Sensor 1830 may be electrically connected to a logic circuit, such as logic circuit 99, by cable 1835, which may be but is not limited to being a copper wire. In this manner, when sensor 1830 is pressed by a force within a predetermined tolerance range, sensor 1830 may operate in the same manner as any of the arrangements of either of sensors 630, 1530, 1630, 1730 to generate or stop generating a signal along cable 1835 providing an indication that second LC connector assembly 1740 has applied sufficient force against first connector assembly 1810 such that the second connector assembly is inserted into adapter 1850 to a predetermined depth. When second LC connector assembly 1740 is not at the predetermined depth, light emission through first LC connector assembly 1810 may be stopped, preventing injury and saving energy.

Figure 23:
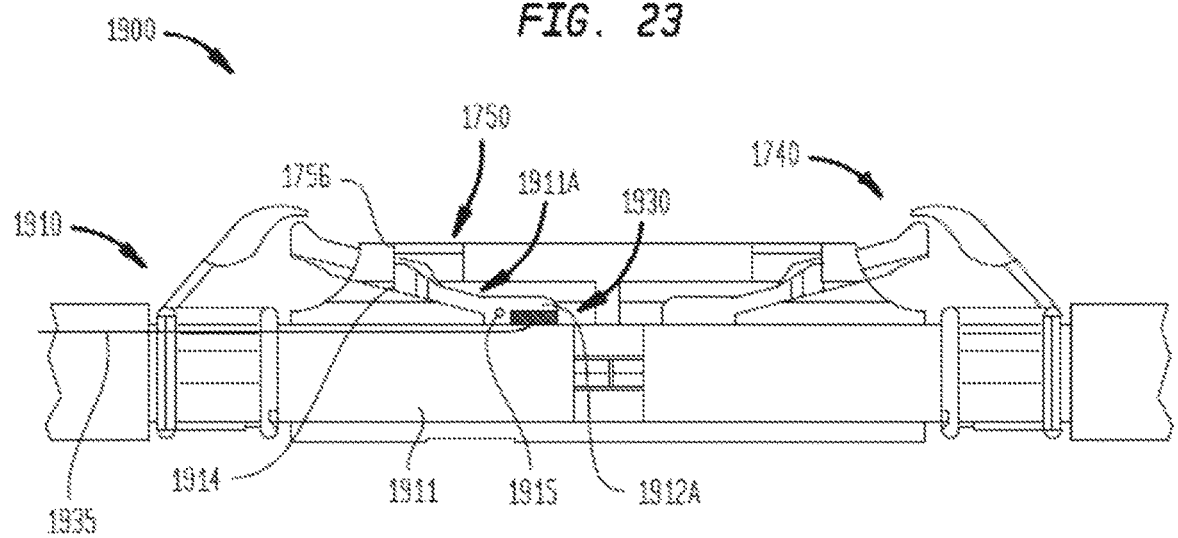
FIGS. 23 and 24 are cross-sectional side views of optical assemblies in a connected state in accordance with the present technology.

Referring to FIG. 23, optical assembly 1900 may be substantially similar to optical assembly 1700 with the notable exceptions that optical assembly 1900 may include first LC connector assembly 1910 having main body 1911 and lever 1911A in place of housing 1711 as well as sensor 1930 attached between main body 1911 and forward end 1912A of lever 1911A. As shown, lever 1911A may be attached to main body 1911 by hinge pin 1915 to allow the lever to rotate about the hinge pin relative to the main body.

Sensor 1930 may be forward of hinge pin 1915 such that when main body 1911 of first LC connector assembly 1910 is pushed rearwards due to insertion of second LC connector assembly 1740 into adapter 1750 of optical assembly 1900, forward end 1912A may be pressed against sensor 1930 due to a force applied by the rearward portion of hole 1756 against step 1914 of lever 1911A to create a torque about the hinge pin. Sensor 1930 may be electrically connected to a logic circuit, such as logic circuit 99, by cable 1935, which may be but is not limited to being a copper wire. In this manner, when sensor 1930 is pressed by a force within a predetermined tolerance range, sensor 1930 may operate in the same manner as any of the arrangements of either of sensors 630, 1530, 1630, 1730, 1830 to generate or stop generating a signal along cable 1935 providing an indication that second LC connector assembly 1740 has applied sufficient force against first connector assembly 1910 such that the second connector assembly is inserted into adapter 1750 to a predetermined depth. When second LC connector assembly 1740 is not at the predetermined depth, light emission through LC first connector assembly 1910 may be stopped, preventing injury and saving energy.

Figure 24:
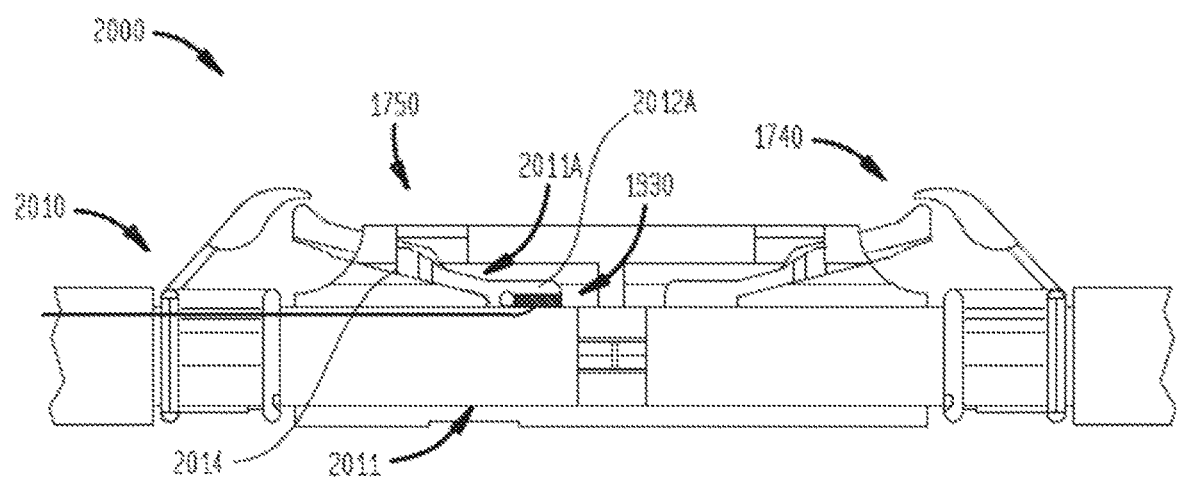

Referring to FIG. 24, optical assembly 2000 may be substantially similar to optical assembly 1900 with the notable exception that lever 2011A may be integrated with main body 2011 of first LC connector assembly 2010 such that the lever is inseparable from the main body without fracturing either of the main body and the lever. In a manner substantially similar to the operation of optical assembly 1900, when main body 2011 of first LC connector assembly 2010 is pushed rearwards due to insertion of second LC connector assembly 1740 into adapter 1750 of optical assembly 2000, forward end 2012A of lever 2011A may be pressed against sensor 1930 due to a force applied by the rearward portion of hole 1756 against step 2014 of lever 2011A about an interface of lever 2011A and main body 2011.

Referring now to FIGS. 25A and 25B, optical assembly 2100 may include adapter 2150 as well as first LC connector assembly 2110 and second LC connector assembly 2140 which may be engageable with each other by way of their insertion into the adapter and abutment to each other in substantially the same manner that first and second connector assemblies 1510, 640 of optical assembly 1500 may abut to each other. Adapter 2150 may define main aperture 2152 and slot 2154 (substantially similar to slot 1754 of adapter 1750) extending from a top of the main aperture, and may further define hole 2156A extending through the slot and intersecting the main aperture from the top of the adapter. In some alternative arrangements, hole 2156A may be a cavity extending only partially through slot 2154. Both first and second LC connector assemblies 2110, 2140 may include housing 2111 and lever 2111A extending from the housing. As shown, lever 2111A may be integrated with housing 2111 such that the lever is inseparable from the housing without fracturing the housing. Lever 2111A may include first shaft portion 2112 and second shaft portion 2113 in which the first shaft portion attaches the second shaft portion to the rest of housing 2111. First shaft portion 2112 may be wider than second shaft portion 2113. In this manner, first and second shaft portions 2112, 2113 may slide or otherwise move within main aperture 2152 of adapter 2150 but only shaft portion 2113 may slide or otherwise move within slot 2154.

Adapter 2150 may include base 2151 that may extend rearwards away from central wall 2155 of the adapter. Sensor 2130, which may be the same as or substantially similar to sensor 1530, may be attached, such as but not limited to by one or more fasteners, attractable magnetic elements, or a chemical adhesive such as but not limited to an epoxy, to base 2151 such that the probe or other force-sensing means of the sensor faces toward rear face 2115 of housing 2111 which faces rearwards. As in the example shown, sensor 2130 may be attached to base 2151 after first LC connector assembly 2110 is inserted into adapter 2150. Advantageously, each of adapter 2150 as well as first and second LC connector assemblies 2110, 2140 may be off-the-shelf components in which the adapter may be retrofitted with sensor 2130.

As shown in FIG. 25A, prior to contact of first and second LC connector assemblies 2110, 2140 with each other, the probe or other force-sensing means of sensor 2130 may be in contact with rear face 2115 such that either a first force is applied to the probe or other force-sensing means for a force sensor, or such that the probe or other force-sensing means is extended to a first length for a displacement sensor. In this manner, sensor 2130 may be preset to a first setting, which in alternative arrangements may be caused by other actions on the sensor. As shown in FIG. 25B, when housing 2111 of first LC connector 2110 receives a rearward directed force due to insertion of second LC connector assembly 2140 into adapter 2150 of optical assembly 2100 and abutment of opposing outer ferrule portions 2117B of first and second LC connector assemblies 2110, 2140, rear face 2115 of the housing may be pressed against the probe or other force-sensing means of sensor 2130 such that, relative to the state of first and second LC connector assemblies 2110, 2140 prior to their contact with each other, the probe or other force-sensing means may be set to a second setting, e.g., by being compressed by a respective second force greater than the first force for a force sensor or by being compressed to a respective second length shorter than the first length for a displacement sensor, as appropriate for the particular arrangement.

Sensor 2130 may be electrically connected to a logic circuit, such as logic circuit 99, by a cable, such as cable 1735 (see FIG. 21), which may be but is not limited to being a copper wire. In this manner, when the probe or other force-sensing means of sensor 2130 is pressed by a force or moved a distance within a predetermined tolerance range, which may be bound by only a respective minimum force or minimum distance, sensor 2130 may operate in the same manner as any of the arrangements of sensors 630, 1530, 1630, 1730 to generate or stop generating a signal along the cable providing an indication that a mating end of outer ferrule portion 2117B of second LC connector assembly 2140 is contacting a mating end of outer ferrule portion 2117B of first LC connector assembly 2110 with a predetermined minimum force. In some arrangements, when second LC connector assembly 2140 has applied a sufficient force against first LC connector assembly 2110, such a signal may indicate that second LC connector assembly 2140 has been inserted a sufficient distance into adapter 2150. When the mating end of outer ferrule portion 2117B of second LC connector assembly 2140 is not contacting the mating end of outer ferrule portion 2117B of first LC connector assembly 2110 at all or with a predetermined minimum force, light emission through first LC connector assembly 2110 may be stopped, preventing injury and saving energy.

As further shown in FIG. 25A, prior to contact of first and second LC connector assemblies 2110, 2140 with each other, first LC connector assembly 2110 may be fully inserted into adapter 2150 such that front face 2116 of housing 2111 abuts central wall 2155 of the adapter. As still further shown, sensor 2130 may be positioned on adapter 2150 such that rear face 2115 of housing 2111 is in contact with the probe or other force-sensing means of sensor 2130 as described previously herein. In this manner, gap A-A may be formed in this initial position between step 2114A of lever 2111A and the rearward portion of hole 2156A of adapter 2150 such that a rearward force exerted by first LC connector assembly 2110 is directed entirely or almost entirely against the probe or other force-sensing means of sensor 2130 and no such rearward force is directed against the rearward portion of hole 2156A. Gap A-A preferably may be at least approximately 0.01 mm, more preferably at least approximately 0.1 mm, and even more preferably approximately 0.5 mm. In some alternative arrangements, first LC connector assembly 2110 may be inserted into adapter 2150 sufficiently to form gap A-A without having front face 2116 of housing 2111 abut central wall 2155 of the adapter.

As further shown in FIG. 25B, when second LC connector assembly 2140 has been fully inserted into adapter 2150, step 2114B of lever 2111B of the second LC connector assembly may push rearwards against a rearward portion of hole 2156B extending through the adapter. As still further shown, sensor 2130 may be positioned on adapter 2150 such that first and second LC connector assemblies 2110, 2140, when at rest in this full insertion position of the second LC connector assembly, are held in position by way of the abutment of first LC connector assembly 2110 with the probe or other force-sensing means of sensor 2130 on one end and abutment of second LC connector assembly 2140 with the rearward portion of hole 2156B of adapter 2150 on the other end. In this manner, gap B-B, which as in this example may be less than gap A-A, may be formed in this rest position between step 2114A of lever 2111A and the rearward portion of hole 2156A of adapter 2150 such that rearward force exerted by first LC connector assembly 2110 is directed entirely or almost entirely against the probe or other force-sensing means of sensor 2130 and no such rearward force is directed against the rearward portion of hole 2156A. Although gap B-B may be zero, gap B-B preferably may be at least approximately 0.01 mm, more preferably at least approximately 0.1 mm, and even more preferably approximately 0.5 mm.

Referring to FIGS. 26A and 26B, optical assembly 2200 may be substantially similar to optical assembly 2100 with the notable exception that optical assembly 2200 may include adapter 2250 without sensor 2130 and may further include sensor 2230 attached to first LC connector assembly 2210 of the optical assembly to provide an indication that mating ends of outer ferrule portions 2117B of the first LC connector assembly and second LC connector assembly 2140 are mated to each other. Adapter 2250 may be substantially the same as adapter 2150 with the exception that post 2253 may extend from base 2251 of adapter 2250. In some arrangements, post 2253 may be integral with adapter 2250 such that the post may be inseparable from the adapter without fracture of either or both of the post and the adapter while in other arrangements the post may be attached, such as but not limited to by one or more fasteners, attractable magnetic elements, or a chemical adhesive such as but not limited to an epoxy, to the adapter.

Sensor 2230 may be the same as or substantially similar to sensor 2130. Sensor 2230 may be attached, such as but not limited to by one or more fasteners, attractable magnetic elements, or a chemical adhesive such as but not limited to an epoxy, to rear face 2215 of housing 2211 of first LC connector assembly 2210 which faces rearwards such that a probe or other force-sensing means of the sensor extends or faces, as the case may be, in a rearward direction. Advantageously, each of adapter 2250 as well as first and second LC connector assemblies 2210, 2140 may be off-the-shelf components in which the adapter may be retrofitted with post 2253 and at least first LC connector assembly 2210 may be retrofitted with sensor 2230.

As shown in FIG. 26A, prior to contact of first and second LC connector assemblies 2210, 2140 with each other, the probe or other force-sensing means of sensor 2230 may be in contact with post 2253 such that either a first force is applied to the probe or other force-sensing means for a force sensor, or such that the probe or other force-sensing means is extended to a first length for a displacement sensor. In this manner, sensor 2230 may be preset to a first setting, which in alternative arrangements may be caused by other actions on the sensor. As shown in FIG. 26B, when housing 2211 receives a rearward force due to insertion of second LC connector assembly 2140 into adapter 2250 of optical assembly 2200 and abutment of opposing outer ferrule portions 2117B of first and second LC connector assemblies 2210, 2140, the probe or other force-sensing means of sensor 2230 may be compressed against post 2253 such that, relative to the state of first and second LC connector assemblies 2210, 2140 prior to their contact with each other, the probe or other force-sensing means may be set to a second setting, e.g., by being compressed by a respective second force greater than the first force for a force sensor or by being compressed to a respective second length shorter than the first length for a displacement sensor, as appropriate for the particular arrangement.

Sensor 2230 may be electrically connected to a logic circuit, such as logic circuit 99, by a cable, such as cable 1735 (see FIG. 21), which may be but is not limited to being a copper wire. In this manner, when the probe or other force-sensing means of sensor 2230 is pressed by a force or moved a distance within a predetermined tolerance range, which may be bound by only a respective minimum force or minimum distance, sensor 2230 may operate in the same manner as any of the arrangements of sensors 630, 1530, 1630, 1730, 2130 to generate or stop generating a signal along the cable providing an indication that a mating end of outer ferrule portion 2117B of second LC connector assembly 2140 is contacting a mating end of outer ferrule portion 2117B of first LC connector assembly 2210 with a predetermined minimum force. In some arrangements, when second LC connector assembly 2140 has applied a sufficient force against first LC connector assembly 2210, such a signal may indicate that second LC connector assembly 2140 has been inserted a sufficient distance into adapter 2250. When the mating end of outer ferrule portion 2117B of second LC connector assembly 2140 is not contacting the mating end of outer ferrule portion 2117B of first LC connector assembly 2210 at all or with a predetermined minimum force, light emission through first LC connector assembly 2210 may be stopped, preventing injury and saving energy.

As further shown in FIG. 26A, prior to contact of first and second LC connector assemblies 2210, 2140 with each other, first LC connector assembly 2210 may be fully inserted into adapter 2250 such that front face 2216 of housing 2211 abuts central wall 2255 of the adapter. As still further shown, post 2253 may be positioned on adapter 2250 such that the probe or other force-sensing means of sensor 2230 is in contact with the post as described previously herein. In this manner, gap A-A may be formed in this initial position between step 2214A of lever 2211A and the rearward portion of hole 2256A of adapter 2250 such that a rearward force exerted by the probe or other force-sensing means of sensor 2230 attached to first LC connector assembly 2210 is directed entirely or almost entirely against post 2253 and no such rearward force is directed against the rearward portion of hole 2256A. Gap A-A preferably may be at least approximately 0.01 mm, more preferably at least approximately 0.1 mm, and even more preferably approximately 0.5 mm. In some alternative arrangements, first LC connector assembly 2210 may be inserted into adapter 2250 sufficiently to form gap A-A without having front face 2216 of housing 2211 abut central wall 2255 of the adapter.

As further shown in FIG. 26B, when second LC connector assembly 2140 has been fully inserted into adapter 2250, step 2114B of lever 2111B of the second LC connector assembly may push rearwards against a rearward portion of hole 2256B extending through the adapter. As still further shown, post 2253 may be positioned on adapter 2250 such that first and second LC connector assemblies 2210, 2140, when at rest in this full insertion position of the second LC connector assembly, are held in position by way of the abutment of the probe or other force-sensing means of sensor 2230 attached to first LC connector assembly 2210 with the post on one end and abutment of second LC connector assembly 2140 with the rearward portion of hole 2256B of adapter 2250 on the other end. In this manner, gap B-B, which as in this example may be less than gap A-A, may be formed in this rest position between step 2214A of lever 2211A and the rearward portion of hole 2256A of adapter 2250 such that a rearward force exerted by the probe or other force-sensing means of sensor 2230 attached to first LC connector assembly 2210 is directed entirely or almost entirely against post 2253 and no such rearward force is directed against the rearward portion of hole 2256A of adapter 2250. Although gap B-B may be zero, gap B-B preferably may be at least approximately 0.01 mm, more preferably at least approximately 0.1 mm, and even more preferably approximately 0.5 mm.

Figure 27:
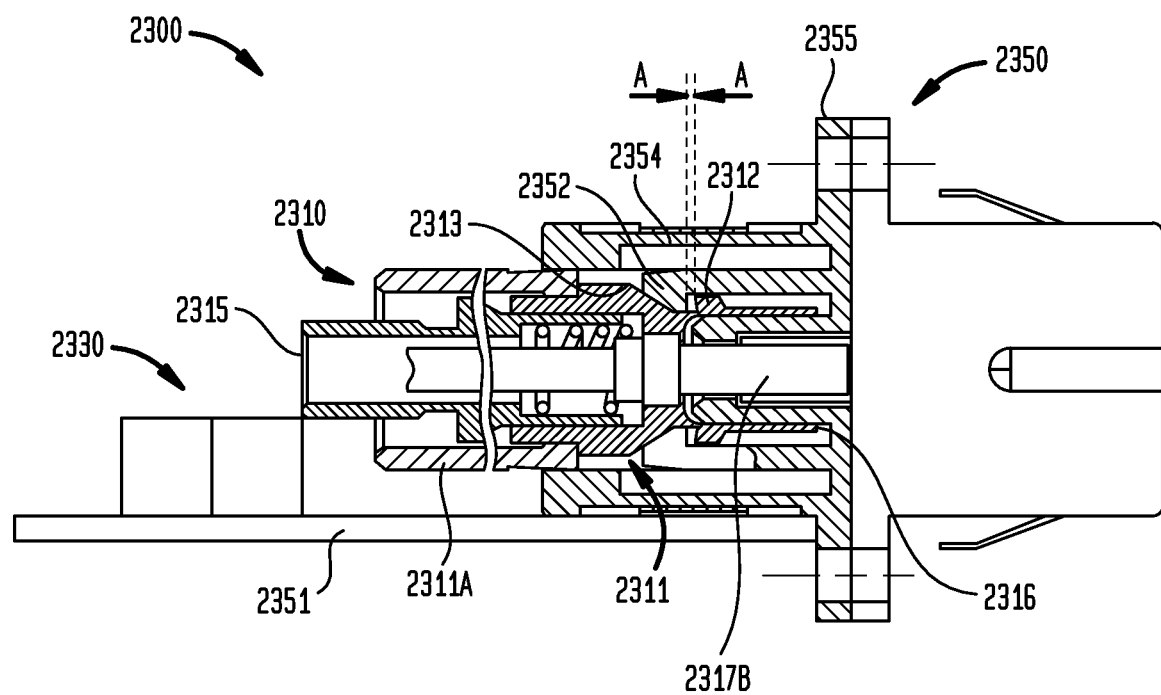
FIG. 27 is a cross-sectional side view of an optical assembly in a disconnected state in accordance with the present technology.

Referring now to FIG. 27, optical assembly 2300 may include adapter 2350 as well as first SC connector assembly 2310 and a second SC connector assembly (not shown but also designated as 2310 hereinafter for reference purposes), which may have an identical configuration as or a different configuration than the first SC connector assembly, in which the assemblies may be engageable with each other by way of their insertion into the adapter and abutment to each other in a similar manner that first and second connector assemblies 1510, 640 of optical assembly 1500 may abut to each other and that first and second connector assemblies 2110, 2140 of optical assembly 2100 may abut to each other. Opposing sides of adapter 2350 may include at least one hooked flange 2352 (in the example shown, two hooked flanges 2352 on each side) and slot 2354 into which the hooked flange cantilevers away from a longitudinal axis of the adapter when first and second SC connector assemblies 2310 are received in their respective sides of the adapter. Both first and second SC connector assemblies 2310 may include housing 2311 having at least one catch 2312 extending away from a longitudinal axis of the housing and defining at least one groove 2313 (in the example shown, two catches 2312 and two grooves 2313 on each of first and second SC connector assemblies 2310) corresponding to each hooked flange 2352 of adapter 2350. In this manner, upon insertion of first connector assembly 2310 into adapter 2350, catch 2312 may slide past respective hooked flanges 2352 of adapter 2350 and ends of the hooked flanges may be received in respective grooves 2313 of housing 2311 of the first SC connector assembly. As shown, housing 2311 may be received within outer housing 2311A which may be slid along housing 2311 away from central wall 2355 of adapter 2350 to cause hooked flanges 2352 to cantilever outwardly away from the longitudinal axis of the adapter and allow housing 2311 to be released, in this example, unhooked, from the adapter. In some alternative arrangements, hooked flanges of the adapter and the catches of the first and second SC connector assemblies may be reversed such that the hooked flanges are closer to the longitudinal axis defined by the adapter than the catches, i.e., such that the hooked flanges are inside of the catches. In such an arrangement, the prongs of the hooked flanges would extend away from the longitudinal axis defined by the adapter and the prongs of the catches would extend in toward the longitudinal axis, i.e., such prongs would extend in opposite directions to those shown for hooked flanges 2352 and catches 2312 shown in FIG. 27.

Adapter 2350 may include base 2351 that may extend rearwards away from central wall 2355 of the adapter. Sensor 2330, which may be the same as or substantially similar to sensor 2130, may be attached, such as but not limited to by one or more fasteners, attractable magnetic elements, or a chemical adhesive such as but not limited to an epoxy, to base 2351 such that the probe or other force-sensing means of the sensor faces toward rear face 2315 of housing 2311 which faces rearwards. As in the example shown, sensor 2330 may be attached to base 2351 after first SC connector assembly 2310 is inserted into adapter 2350. Advantageously, each of adapter 2350 as well as first and second SC connector assemblies 2310 may be off-the-shelf components in which the adapter may be retrofitted with sensor 2330.

As further shown in FIG. 27, prior to contact of first and second SC connector assemblies 2310 with each other, housing 2311 may be positioned relative to adapter 2350 to form gap A-A between an end of hooked flange 2352 and catch 2312 in a direction parallel to the longitudinal axes of adapter 2350 and first SC connector assembly 2310 and the probe or other force-sensing means of sensor 2330 may be in contact with rear face 2315 of housing 2311. In this manner, either a first force is applied to the probe or other force-sensing means for a force sensor, or the probe or other force-sensing means is extended to a first length for a displacement sensor, depending on the type of sensor used. In this manner, sensor 2330 may be preset to a first setting, which in alternative arrangements may be caused by other actions on the sensor. In some alternative arrangements, although not in the example shown, housing 2311 may be positioned relative to adapter 2350 such that front face 2316 of the housing is in abutment with central wall 2355 of adapter 2350.

In a similar manner to the operation of optical assembly 2100, when housing 2311 of first SC connector assembly 2310 of optical assembly 2300 receives a rearwards force due to insertion of second SC connector assembly 2310 into adapter 2350 of optical assembly 2300 and abutment of opposing outer ferrule portions 2317B of first and second SC connector assemblies 2310, rear face 2315 of the housing may be pressed against the probe or other force-sensing means of sensor 2330 such that, relative to the state of first and second SC connector assemblies 2310 prior to their contact with each other, the probe or other force-sensing means may be set to a second setting, e.g., by being compressed by a respective second force greater than the first force for a force sensor or by being compressed to a second length shorter than the first length for a displacement sensor, as appropriate for the particular arrangement.

Sensor 2330 may be electrically connected to a logic circuit, such as logic circuit 99, by a cable, such as cable 1735 (see FIG. 21), which may be but is not limited to being a copper wire. In this manner, when the probe or other force-sensing means of sensor 2330 is pressed by a force or moved a distance within a predetermined tolerance range, which may be bound by only a respective minimum force or minimum distance, sensor 2330 may operate in the same manner as any of the arrangements of sensors 630, 1530, 1630, 1730, 2130 to generate or stop generating a signal along the cable providing an indication that a mating end of outer ferrule portion 2317B of second SC connector assembly 2310 is contacting a mating end of outer ferrule portion 2317B of first SC connector assembly 2310 with a predetermined minimum force. In some arrangements, when second SC connector assembly 2310 has applied a sufficient force against first SC connector assembly 2310, such a signal may indicate that the second SC connector assembly is inserted into adapter 2350 to at least a predetermined depth or an indication that second SC connector assembly 2310 has been inserted a sufficient distance into adapter 2350, respectively. When the mating end of outer ferrule portion 2317B of second SC connector assembly 2310 is not contacting the mating end of outer ferrule portion 2317B of first SC connector assembly 2310 at all or with a predetermined minimum force, light emission through first SC connector assembly 2310 may be stopped, preventing injury and saving energy.

With reference to FIG. 27, prior to contact of the first and second SC connector assemblies 2310 with each other, first SC connector assembly 2310 may be inserted into adapter 2350 and then sensor 2330 may be positioned on adapter 2350 such that rear face 2315 of housing 2311 is in contact with the probe or other force-sensing means of sensor 2330 as described previously herein. In this manner, gap A-A may be formed in this initial position in a space defined between the end of hooked flange 2352 of adapter 2350 and catch 2312 of housing 2311. In this manner, a rearward force exerted by first SC connector assembly 2310 is directed entirely or almost entirely against the probe or other force-sensing means of sensor 2330 and no such rearward force is directed against hooked flange 2352. Gap A-A preferably may be at least approximately 0.01 mm, more preferably at least approximately 0.1 mm, and even more preferably approximately 0.5 mm.

When second SC connector assembly 2310 has been fully inserted into adapter 2350 and first and second SC connector assemblies 2310 are at rest in this full insertion position of the second SC connector assembly, sensor 2330 may be positioned on adapter 2350 such that the first and second SC connector assemblies are held in position by way of the abutment of the first SC connector assembly with the probe or other force-sensing means of sensor 2330 on one end and abutment of the second SC connector assembly with at least one hooked flange 2352 of adapter 2350 on the side of the adapter into which the second SC connector assembly has been inserted. In this manner, clearance defined by gap A-A may be reduced in this rest position between hooked flange 2352 of adapter 2350 on the side of the adapter into which first SC connector assembly 2310 is inserted and catch 2312 such that a rearward force exerted by the first SC connector assembly is directed entirely or almost entirely against the probe or other force-sensing means of sensor 2330 and no such rearward force is directed against the hooked flange of the first SC connector assembly. Although this reduced clearance may be zero, the reduced clearance preferably may be at least approximately 0.01 mm, more preferably at least approximately 0.1 mm, and even more preferably approximately 0.5 mm.

In some alternative arrangements, an optical assembly may be the same as optical assembly 2300 with the exception that a sensor may be attached, such as but not limited to by one or more fasteners, attractable magnetic elements, or a chemical adhesive such as but not limited to an epoxy, to a rear face of the housing of the first SC connector assembly, such as rear face 2315 of housing 2311 of first connector assembly 2310, and a post instead of a sensor may be attached to a base of the adapter in a manner substantially similar to the attachment of post 2253 to base 2251 of adapter 2250 of optical assembly 2200. In operation, the sensor on the rear face of the housing may interact with the post in substantially the same manner as post 2253 may interact with sensor 2230. As in previous examples, each of the adapter as well as the first and second LC connector assemblies may be off-the-shelf components in which the adapter may be retrofitted with the post and at least the first LC connector assembly may be retrofitted with the sensor.

Referring to FIG. 28, optical assembly 2400 may be substantially similar to optical assembly 2100 with the notable exception that optical assembly 2400 may include first LC connector assembly 2410 in place of first LC connector assembly 2110. First LC connector assembly 2410 may be substantially similar to first LC connector assembly 2110 with the notable exception that first LC connector assembly 2410 may include housing device 2411 in place of housing 2111. Housing device 2411 may include housing 2418 and extension device 2419, which as shown may include inner extension body 2420A substantially in the form of a tube, extending from a rear end of the housing. As shown, in some arrangements, inner extension body 2420A may be integral with housing 2111 such that the inner extension body is inseparable from the housing without fracturing either or both of the inner extension body and the housing while in other arrangements, the inner extension body and the housing may be separate components. Inner extension body 2420A of extension device 2419 may include ribs or shoulders 2419A, or alternatively internal threads for engagement with outer extension body 2420B of extension device 2419. In some arrangements, outer extension body 2420B may include cavities for receiving the corresponding ribs or shoulders 2419A or external threads corresponding to the alternative internal threads of inner extension body 2420A. In some alternative arrangements, the outer extension body may include ribs or shoulders and the inner extension body may include corresponding cavities for receiving the corresponding ribs or shoulders. In some alternative arrangements, the inner extension body and the outer extension body may be attached by way of a Morse taper or other interference fit.

Similar to other examples described previously herein, prior to contact of first and second LC connector assemblies 2410, 2140 with each other, the probe or other force-sensing means of sensor 2130 may be in contact with rear face 2415 of outer extension body 2420B of extension device 2419 such that either a first force is applied to the probe or other force-sensing means for a force sensor, or such that the probe or other force-sensing means is extended to a first length for a displacement sensor. In this manner, sensor 2130 may be preset to a first setting, which in alternative arrangements may be caused by other actions on the sensor. In alternative arrangements, prior to contact of the first and second LC connector assemblies 2410, 2140 with each other, the probe or other force-sensing means of sensor 2130 may be in contact with a rear face of inner extension body 2420A of extension device 2419, with or without outer extension body 2420B, such that either a first force is applied to the probe or other force-sensing means for a force sensor, or such that the probe or other force-sensing means is extended to a first length for a displacement sensor.

As further shown in FIG. 28, when housing device 2411 receives a rearward directed force due to insertion of second LC connector assembly 2140 into adapter 2150 of optical assembly 2400 and abutment of opposing outer ferrule portions 2117B of first and second LC connector assemblies 2410, 2140, rear face 2415 of housing device 2411 may be pressed against the probe or other force-sensing means of sensor 2130 such that, relative to the state of first and second LC connector assemblies 2410, 2140 prior to their contact with each other, the probe or other force-sensing means may be set to a second setting, e.g., by being compressed by a respective second force greater than the first force for a force sensor or by being compressed to a respective second length shorter than the first length for a displacement sensor, as appropriate for the particular arrangement.

Sensor 2130 may be electrically connected to a logic circuit, such as logic circuit 99, by a cable, such as cable 1735 (see FIG. 21), which may be but is not limited to being a copper wire. In this manner, when the probe or other force-sensing means of sensor 2130 is pressed by a force or moved a distance within a predetermined tolerance range, which may be bound by only a respective minimum force or minimum distance, sensor 2130 may operate in the same manner as any of the arrangements of sensors 630, 1530, 1630, 1730 to generate or stop generating a signal along the cable providing an indication that a mating end of outer ferrule portion 2117B of second LC connector assembly 2140 is contacting a mating end of outer ferrule portion 2117B of first LC connector assembly 2410 with a predetermined minimum force. In some arrangements, when second LC connector assembly 2140 has applied a sufficient force against first LC connector assembly 2410, such a signal may indicate that second LC connector assembly 2140 has been inserted a sufficient distance into adapter 2150. When the mating end of outer ferrule portion 2117B of second LC connector assembly 2140 is not contacting the mating end of outer ferrule portion 2117B of first LC connector assembly 2410 at all or with a predetermined minimum force, light emission through first LC connector assembly 2410 may be stopped, preventing injury and saving energy.

Prior to contact of first and second LC connector assemblies 2410, 2140 with each other, first LC connector assembly 2410 may be fully inserted into adapter 2150 such that front face 2416 of housing device 2411 abuts central wall 2155 of the adapter. As still further shown, sensor 2130 may be positioned on adapter 2150 such that rear face 2415 of housing device 2411 is in contact with the probe or other force-sensing means of sensor 2130 as described previously herein. In this manner, gap A-A (see FIG. 25A, for example) may be formed in this initial position between step 2414A of lever 2411A and the rearward portion of hole 2156A of adapter 2150 such that a rearward force exerted by first LC connector assembly 2410 is directed entirely or almost entirely against the probe or other force-sensing means of sensor 2130 and no such rearward force is directed against the rearward portion of hole 2156A. Gap A-A preferably may be at least approximately 0.01 mm, more preferably at least approximately 0.1 mm, and even more preferably approximately 0.5 mm. In some alternative arrangements, first LC connector assembly 2410 may be inserted into adapter 2150 sufficiently to form gap A-A without having front face 2416 of housing 2411 abut central wall 2155 of the adapter.

As further shown in FIG. 28, when second LC connector assembly 2140 has been fully inserted into adapter 2150, step 2114B of lever 2111B of the second LC connector assembly may push rearwards against a rearward portion of hole 2156B extending through the adapter. As still further shown, sensor 2130 may be positioned on adapter 2150 such that first and second LC connector assemblies 2410, 2140, when at rest in this full insertion position of the second LC connector assembly, are held in position by way of the abutment of first LC connector assembly 2410 with the probe or other force-sensing means of sensor 2130 on one end and abutment of second LC connector assembly 2140 with the rearward portion of hole 2156B of adapter 2150 on the other end. In this manner, gap B-B, which as in this example may be less than gap A-A, may be formed in this rest position between step 2414A of lever 2411A and the rearward portion of hole 2156A of adapter 2150 such that rearward force exerted by first LC connector assembly 2410 is directed entirely or almost entirely against the probe or other force-sensing means of sensor 2130 and no such rearward force is directed against the rearward portion of hole 2156A. Although gap B-B may be zero, gap B-B preferably may be at least approximately 0.01 mm, more preferably at least approximately 0.1 mm, and even more preferably approximately 0.5 mm.

Referring now to FIG. 29, optical assembly 2500 may be substantially similar to optical assembly 2100 with the notable exception that optical assembly 2500 may include first LC connector assembly 2510 in place of first LC connector assembly 2110. First LC connector assembly 2510 may be substantially similar to first LC connector assembly 2110 with the notable exception that first LC connector assembly 2510 may include housing device 2511 in place of housing 2111 and an inner ferrule portion 2517A that circumferentially surrounds a portion of outer ferrule portion 2117B to form portions of a ferrule assembly and extends rearwards through and beyond opening 2512 defined by a rear face of housing device 2511. Inner ferrule portion 2517A may include main section 2518 and extension device 2519, which as shown may include inner extension body 2520A substantially in the form of a tube, extending from a rear end of the main section. As shown, in some arrangements, inner extension body 2520A may be integral with main section 2518 of inner ferrule portion 2517A such that the inner extension body is inseparable from the main section without fracturing either or both of the inner extension body and the main section while in other arrangements, the inner extension body and the main section may be separate components. Inner extension body 2520A of extension device 2519 of inner ferrule portion 2517A may include ribs or shoulders 2519A, or alternatively internal threads for engagement with outer extension body 2520B of extension device 2519. In some arrangements, outer extension body 2520B may include cavities for receiving the corresponding ribs or shoulders 2519A or external threads corresponding to the alternative internal threads of inner extension body 2520A. In some alternative arrangements, the outer extension body may include ribs or shoulders and the inner extension body may include corresponding cavities for receiving the corresponding ribs or shoulders. In some alternative arrangements, the inner extension body and the outer extension body may be attached by way of a Morse taper or other interference fit.

Figure 30:
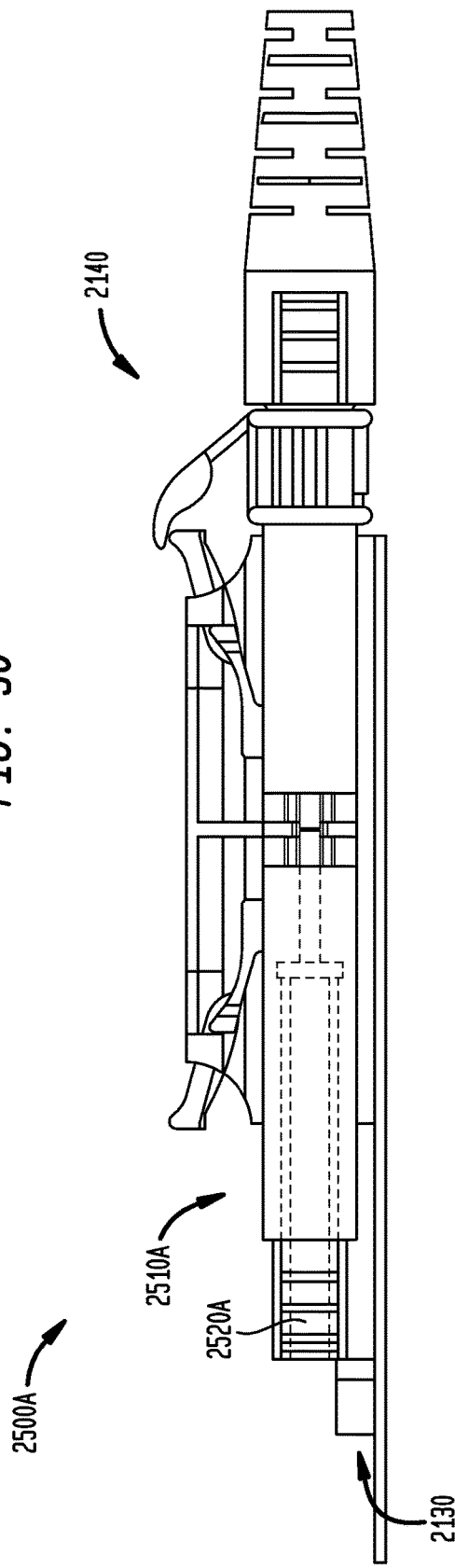

Similar to other examples described previously herein, prior to contact of first and second LC connector assemblies 2510, 2140 with each other, the probe or other force-sensing means of sensor 2130 may be in contact with rear face 2515 of outer extension body 2520B of extension device 2519 such that either a first force is applied to the probe or other force-sensing means for a force sensor, or such that the probe or other force-sensing means is extended to a first length for a displacement sensor. In this manner, sensor 2130 may be preset to a first setting, which in alternative arrangements may be caused by other actions on the sensor. In alternative arrangements, such as in the example of FIG. 30, prior to contact of the first and second LC connector assemblies 2510A, 2140 of optical assembly 2500A with each other, the probe or other force-sensing means of sensor 2130 may be in contact with a rear face of inner extension body 2520A of the extension device, with or as shown in FIG. 30 without outer extension body 2520B, such that either a first force is applied to the probe or other force-sensing means for a force sensor, or such that the probe or other force-sensing means is extended to a first length for a displacement sensor.

Referring again to FIG. 29, when inner ferrule portion 2517A receives a rearward directed force due to insertion of second LC connector assembly 2140 into adapter 2150 of optical assembly 2500 and abutment of opposing outer ferrule portions 2117B of first and second LC connector assemblies 2510, 2140, rear face 2515 of outer extension body 2520B of extension device 2519 may be pressed against the probe or other force-sensing means of sensor 2130 such that, relative to the state of first and second LC connector assemblies 2510, 2140 prior to their contact with each other, the probe or other force-sensing means may be set to a second setting, e.g., by being compressed by a respective second force greater than the first force for a force sensor or by being compressed to a respective second length shorter than the first length for a displacement sensor, as appropriate for the particular arrangement.

Sensor 2130 may be electrically connected to a logic circuit, such as logic circuit 99, by a cable, such as cable 1735 (see FIG. 21), which may be but is not limited to being a copper wire. In this manner, when the probe or other force-sensing means of sensor 2130 is pressed by a force or moved a distance within a predetermined tolerance range, which may be bound by only a respective minimum force or minimum distance, sensor 2130 may operate in the same manner as any of the arrangements of sensors 630, 1530, 1630, 1730 to generate or stop generating a signal along the cable providing an indication that a mating end of outer ferrule portion 2117B of second LC connector assembly 2140 is contacting a mating end of outer ferrule portion 2117B of first LC connector assembly 2510 with a predetermined minimum force. In some arrangements, when second LC connector assembly 2140 has applied a sufficient force against first LC connector assembly 2510, such a signal may indicate that second LC connector assembly 2140 has been inserted a sufficient distance into adapter 2150. When the mating end of outer ferrule portion 2117B of second LC connector assembly 2140 is not contacting the mating end of outer ferrule portion 2117B of first LC connector assembly 2510 at all or with a predetermined minimum force, light emission through first LC connector assembly 2510 may be stopped, preventing injury and saving energy.

Figure 31:
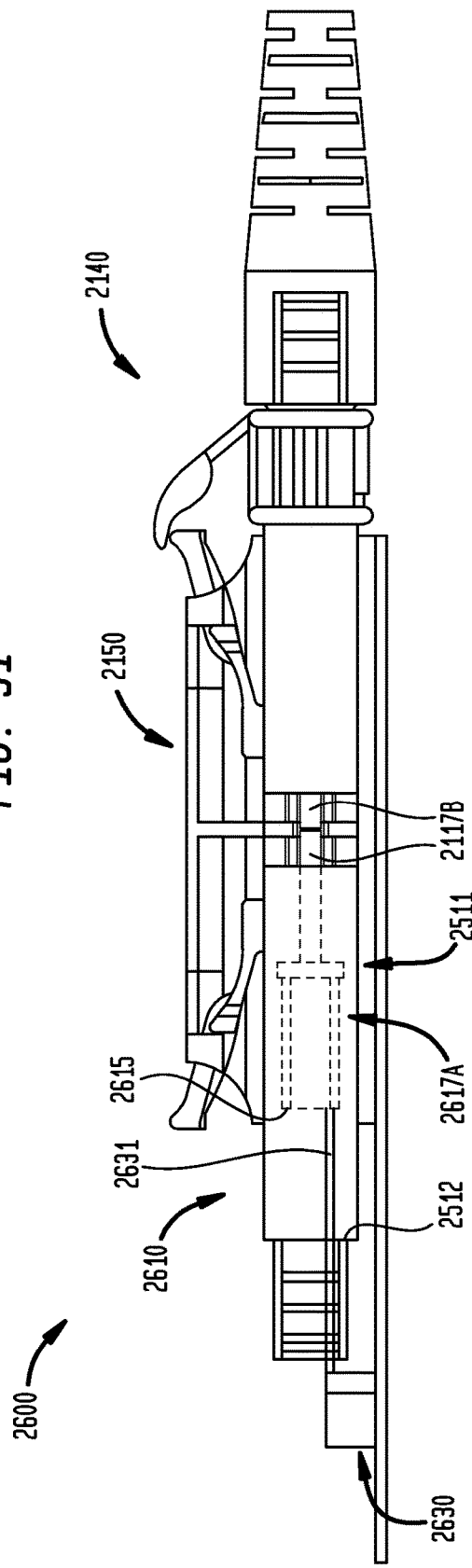

Referring now to FIG. 31, optical assembly 2600 may be substantially similar to optical assembly 2500 with the notable exception that optical assembly 2500 may include first LC connector assembly 2610 in place of first LC connector assembly 2510 and sensor 2630 in place of sensor 2130. First LC connector assembly 2610 may be substantially similar to first LC connector assembly 2510 with the notable exception that first LC connector assembly 2610 may include inner ferrule portion 2617A in place of inner ferrule portion 2517A that circumferentially surrounds a portion of outer ferrule portion 2117B to form portions of a ferrule assembly and extends rearwards without extending beyond opening 2512 defined by a rear face of housing device 2511. Sensor 2630 may be substantially similar to sensor 2130 with the notable exception that sensor 2630 may include extension device 2631, which may be a probe arm, that extends to a rear face 2615 of inner ferrule portion 2617A.

Similar to other examples described previously herein, prior to contact of first and second LC connector assemblies 2610, 2140 with each other, extension device 2631 of sensor 2630 may be contacted by rear face 2615 of inner ferrule portion 2617A such that either a first force is applied by extension device 2631 to a force-sensing means for a force sensor, or such that the force-sensing means of the sensor is extended to a first length for a displacement sensor. In this manner, sensor 2630 may be preset to a first setting, which in alternative arrangements may be caused by other actions on the sensor. Alternatively, the first setting of sensor 2630 may be defined without initial contact between extension device 2631 and inner ferrule portion 2617A.

Still referring to FIG. 31, when inner ferrule portion 2617A receives a rearward directed force due to insertion of second LC connector assembly 2140 into adapter 2150 of optical assembly 2600 and abutment of opposing outer ferrule portions 2117B of first and second LC connector assemblies 2610, 2140, rear face 2615 of inner ferrule portion 2617A may be pressed against extension device 2631 of sensor 2630 such that, relative to the state of first and second LC connector assemblies 2610, 2140 prior to their contact with each other, the probe or other force-sensing means of the sensor may be set to a second setting, e.g., by being compressed by a respective second force greater than the first force for a force sensor or by being compressed to a respective second length shorter than the first length for a displacement sensor, as appropriate for the particular arrangement.

Sensor 2630 may be electrically connected to a logic circuit, such as logic circuit 99, by a cable, such as cable 1735 (see FIG. 21), which may be but is not limited to being a copper wire. In this manner, when the probe or other force-sensing means of sensor 2630 is pressed by a force or moved a distance within a predetermined tolerance range, which may be bound by only a respective minimum force or minimum distance, sensor 2630 may operate in the same manner as any of the arrangements of sensors 630, 1530, 1630, 1730 to generate or stop generating a signal along the cable providing an indication that a mating end of outer ferrule portion 2117B of second LC connector assembly 2140 is contacting a mating end of outer ferrule portion 2117B of first LC connector assembly 2610 with a predetermined minimum force. In some arrangements, when second LC connector assembly 2140 has applied a sufficient force against first LC connector assembly 2610, such a signal may indicate that second LC connector assembly 2140 has been inserted a sufficient distance into adapter 2150. When the mating end of outer ferrule portion 2117B of second LC connector assembly 2140 is not contacting the mating end of outer ferrule portion 2117B of first LC connector assembly 2610 at all or with a predetermined minimum force, light emission through first LC connector assembly 2610 may be stopped, preventing injury and saving energy.

Figure 32:
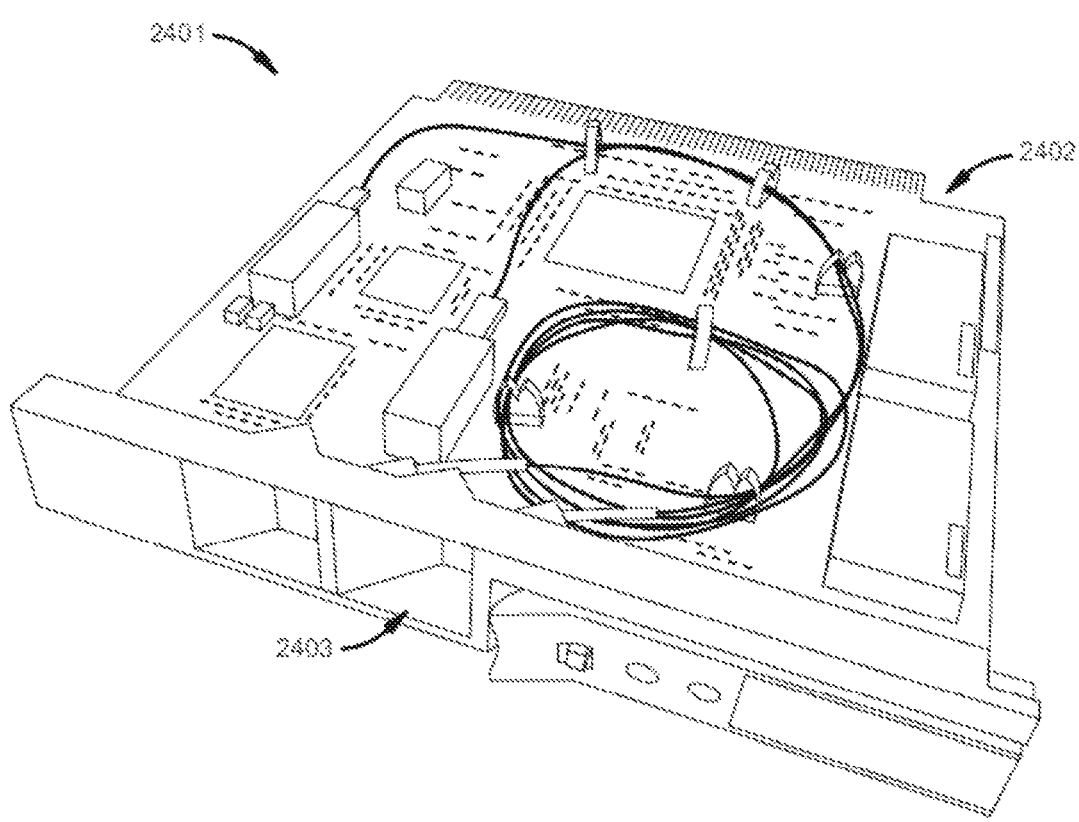
FIG. 32 is a perspective view of a network component having a connector assembly to which the present technology may be adapted.

With reference to FIG. 32, the detection systems disclosed herein, whether by activation of a switch or sensor or by conductive contact such as between two electrodes, may be utilized in conjunction with network or server equipment, such as linecard 2401 including printed circuit board 2402 having connector interfaces, e.g., connector assembly 2403. In this example, linecard 2401 may include any of a switch, sensor, or conductive contacts on connector assembly 2403 that may detect the presence of a corresponding external connector inserted into the connector assembly. In this manner, connector assembly 2403 may stop emitting, or in an alternative arrangement actively emit, light when the external connector is not inserted into the connector assembly.

In some alternative arrangements of the optical assemblies described herein, such as but not limited to optical assemblies 1500, 1600, 1700, 1800, 1900, 2000, 2100, 2200, 2300, 2400, 2500, 2500A, 2600, the ferrule portion or portions of the connector assembly first received by the corresponding adapter may not translate relative to the housing such that translation of the ferrule portion or portions of such connector assembly is the same as the translation of the housing. In some alternative arrangements of the optical assemblies described herein, such as but not limited to optical assemblies 1500, 1600, 1700, 1800, 1900, 2000, 2100, 2200, 2300, 2400, 2500, 2500A, 2600, the connector assembly received second by the corresponding adapter may be held in position in the adapter by an external force as well as a force applied by the connector assembly first received by the adapter. In this manner, the adapter may not supply a force to limit translational movement of the connector assembly received second by the corresponding adapter in a direction along longitudinal axes of the connector assembly received second by the adapter and of the adapter.

It is to be understood that the technology disclosed herein may be employed into several types of energy conveying connectors including but not limited to optical or electrical signal conveying connectors for holding respective optical fibers that convey optical signals corresponding to data or electrically conductive elements that convey electrical signals corresponding to data. Optical signal conveying connectors may be but are not limited to being LC, SC, MPO, MTP, FC, ST, and MU connectors. As a general example, the technology may be used on connectors which include a fiber ferrule and ferrule holder such as the outer and inner ferrule portions described previously herein, a spring or other resilient element such as the resilient element described previously herein, a housing such as the housing described previously herein, and a spring stopper such as the resilient stopper element described previously herein.

It is to be further understood that the disclosure set forth herein includes any possible combinations of the particular features set forth above, whether specifically disclosed herein or not. For example, where a particular feature is disclosed in the context of a particular aspect, arrangement, configuration, or embodiment, that feature can also be used, to the extent possible, in combination with and/or in the context of other particular aspects, arrangements, configurations, and embodiments of the technology, and in the technology generally.

Furthermore, although the technology herein has been described with reference to particular features, it is to be understood that these features are merely illustrative of the principles and applications of the present technology. It is therefore to be understood that numerous modifications, including changes in the sizes of the various features described herein, may be made to the illustrative embodiments and that other arrangements may be devised without departing from the spirit and scope of the present technology. In this regard, the present technology encompasses numerous additional features in addition to those specific features set forth in the claims below. Moreover, the foregoing disclosure should be taken by way of illustration rather than by way of limitation as the present technology is defined by the claims set forth below.

The invention claimed is:

1. A connector assembly comprising:
   a housing having a bore and a rearward-facing surface;
   a ferrule translatable in forward and rearward directions within the bore of the housing and having a forward-facing surface; and
   a sensor, at least a first sensor portion of the sensor mounted in the bore of the housing and attached to the forward-facing surface of the ferrule or the rearward-facing surface of the housing, the sensor being configured for detecting translation of the ferrule between i) a default position of the ferrule in which the forward-facing surface of the ferrule is at a first position and ii) a rearward position of the ferrule in which the forward-facing surface of the ferrule is at a second position spaced rearwardly from the first position, wherein an electrical characteristic of the sensor changes to indicate the translation of the ferrule to the rearward position,
   wherein either the first sensor portion is attached to the forward-facing surface of the ferrule and is confronting the rearward-facing surface of the housing or the first sensor portion is attached to the rearward-facing surface of the housing and is confronting the forward-facing surface of the ferrule during translation of the ferrule.

2. The connector assembly of claim 1, wherein the sensor is a pressure or displacement sensor.

3. The connector assembly of claim 1, further comprising an optical fiber having a portion passing through the ferrule, wherein the ferrule maintains the position of the portion of the optical fiber passing therethrough.

4. The connector assembly of claim 1, further comprising a cable including a second sensor positioned along a length of the cable, wherein an electrical characteristic of the second sensor changes when the surface of the cable over which the second sensor lies deforms.

5. The connector assembly of claim 4, wherein an alert signal is generated by a remote electronic device when an electrical signal corresponding to a changed electrical characteristic of the second sensor is conducted to the remote electronic device and has at least a minimum value.

6. The connector assembly of claim 1, wherein the sensor comprises:
an electrically conductive first contact mounted to the housing; and
an electrically conductive second contact mounted to the ferrule, the second contact forming at least part of the first sensor portion of the sensor,
wherein the second contact is conductively coupled with the first contact when the ferrule is in the default position of translation, and the electrically conductive second contact is not conductively coupled with the first contact when the ferrule is in the rearward position of translation.

7. The connector assembly of claim 6, wherein the first contact and the second contact are both inside the housing.

8. The connector assembly of claim 1, wherein the ferrule is configured to extend beyond a front end of the housing when the ferrule is in the default position.

9. The connector assembly of claim 1, wherein the forward-facing surface of the ferrule is in abutment with the housing when the ferrule is in the default position.

10. The connector assembly of claim 1, wherein a rear end of the ferrule opposite the forward-facing surface of the ferrule is held within the bore of the housing.

11. A system comprising:
the connector assembly of claim 1; and
an adapter, a portion of the housing and a portion of the ferrule being received by the adapter.

12. The connector assembly of claim 11, wherein the sensor is a displacement sensor or a pressure sensor.

13. A system comprising:
a circuit configured for providing a control signal to a peripheral component; and
the connector assembly of claim 1, wherein the circuit stops providing or provides the control signal to the peripheral component when the ferrule is in the default position and the circuit, respectively, provides or stops providing the control signal to the peripheral component when the ferrule is in the rearward position.

14. A system comprising:
a circuit configured for providing a control signal to a peripheral component; and
the connector assembly of claim 6, wherein the second contact is mounted on an end of the ferrule such that when the first and the second contacts are conductively coupled, the circuit stops providing the control signal to the peripheral component.

15. A system comprising:
a circuit configured for providing a control signal to a peripheral component; and
the connector assembly of claim 6, wherein the second contact is mounted on an end of the ferrule such that when the first and second contacts are conductively coupled, the circuit provides the control signal to the peripheral component.

16. A connector assembly comprising:
a housing having a bore;
a resilient element within the bore of the housing;
a ferrule translatable within the bore of the housing; and
a sensor comprising:
an electrically conductive first contact mounted to the housing; and
an electrically conductive second contact mounted to the ferrule,
wherein the second contact is conductively coupled with the first contact when the ferrule is in a first position of translation, and the second contact is not conductively coupled with the first contact when the ferrule is in a second position of translation, and
wherein the resilient element biases the ferrule towards an end of the bore of the housing.

17. The connector assembly of claim 16, wherein the first contact and the second contact are both inside the housing.

18. The connector assembly of claim 16, wherein the first contact is an electrode-attached to the housing by one or more fasteners, attractable magnetic elements, or a chemical adhesive.

19. The connector assembly of claim 16, wherein the second contact is an electrode-attached to the ferrule by one or more fasteners, attractable magnetic elements, or a chemical adhesive.

20. The connector assembly of claim 16, wherein the resilient element is a spring.

21. A connector assembly comprising:
a housing having a bore and a rearward-facing surface;
a resilient element within the bore of the housing;
a ferrule translatable in forward and rearward directions within the bore of the housing and having a forward-facing surface, the ferrule further being biased towards the rearward-facing surface of the housing by the resilient element; and
a sensor, at least a first sensor portion of the sensor mounted in the bore of the housing and attached to the forward-facing surface of the ferrule or the rearward-facing surface of the housing, the sensor being configured for detecting translation of the ferrule between i) a default position of the ferrule in which the forward-facing surface of the ferrule is at a first position and ii) a rearward position of the ferrule in which the forward-facing surface of the ferrule is at a second position spaced rearwardly from the first position, wherein an electrical characteristic of the sensor changes to indicate the translation of the ferrule to the rearward position.

22. The connector assembly of claim 21, wherein either the first sensor portion is attached to the forward-facing surface of the ferrule and is confronting the rearward-facing surface of the housing or the first sensor portion is attached to the rearward-facing surface of the housing and is confronting the forward-facing surface of the ferrule during translation of the ferrule.

23. The connector assembly of claim 21, wherein the resilient element is a spring.

24. The connector assembly of claim 21, wherein a rear end of the ferrule opposite the forward-facing surface of the ferrule is held within the bore of the housing.

* * * * *